United States Patent
Lee et al.

(10) Patent No.: US 10,236,722 B2
(45) Date of Patent: Mar. 19, 2019

(54) WIRELESS POWER RECEIVER AND METHOD FOR CONTROLLING SAME

(71) Applicant: Samsung Electronics Co., Ltd., Gyeonggi-do (KR)

(72) Inventors: Hee-Dong Lee, Gyeongsangbuk-do (KR); Min-Soo Kim, Gyeongsangbuk-do (KR); Jae-Hwan Kim, Gyeognsangbuk-do (KR); Man-Ki Choi, Daegu (KR); Chul-Hyung Yang, Gyeongsangbuk-do (KR); Ji-Woo Lee, Gyeongsangbuk-do (KR)

(73) Assignee: Samsung Electronics Co., Ltd (KR)

( * ) Notice: Subject to any disclaimer, the term of this patent is extended or adjusted under 35 U.S.C. 154(b) by 158 days.

(21) Appl. No.: 15/338,947

(22) Filed: Oct. 31, 2016

(65) Prior Publication Data
US 2017/0126070 A1     May 4, 2017

(30) Foreign Application Priority Data
Oct. 30, 2015  (KR) .......................... 10-2015-0152467

(51) Int. Cl.
*H02J 50/12* (2016.01)
*H02J 50/80* (2016.01)
(Continued)

(52) U.S. Cl.
CPC .............. *H02J 50/12* (2016.02); *H02J 7/025* (2013.01); *H02J 50/40* (2016.02); *H02J 50/80* (2016.02); *H02J 50/90* (2016.02)

(58) Field of Classification Search
CPC ...................................................... H02J 50/12
(Continued)

(56) References Cited

U.S. PATENT DOCUMENTS

| 2014/0104133 A1 | 4/2014 | Finn et al. |
| 2014/0111019 A1 | 4/2014 | Roy et al. |

(Continued)

FOREIGN PATENT DOCUMENTS

| EP | 2 696 467 | 2/2014 |
| JP | 2004-235884 | 8/2004 |

(Continued)

OTHER PUBLICATIONS

European Search Report dated Feb. 28, 2017 issued in counterpart application No. 16189115.5-1804, 7pages.

(Continued)

*Primary Examiner* — Joseph Chang
(74) *Attorney, Agent, or Firm* — The Farrell Law Firm, P.C.

(57) ABSTRACT

An electronic device and a method of operating the electronic device are provided. The electronic device includes a communication circuit; a battery; a first conductive pattern electrically connected to the battery and configured to wirelessly receive power; a second conductive pattern electrically connected to the communication circuit; a processor; and a memory that stores instructions, which when executed, instruct the processor to receive power from an external device through the first conductive pattern, to detect a voltage or a current of a signal output from the second conductive pattern while receiving the power, and to provide an output that is at least partially based on the detected voltage or current of the signal output from the second conductive pattern.

34 Claims, 43 Drawing Sheets

(51) Int. Cl.
*H02J 50/90* (2016.01)
*H02J 50/40* (2016.01)
*H02J 7/02* (2016.01)

(58) Field of Classification Search
USPC ........................................................ 307/104
See application file for complete search history.

(56) References Cited

U.S. PATENT DOCUMENTS

| | | | |
|---|---|---|---|
| 2014/0339907 A1 | 11/2014 | Omae et al. | |
| 2015/0054455 A1* | 2/2015 | Kim ........................ | H02J 17/00 320/108 |
| 2015/0115728 A1 | 4/2015 | Yamamoto et al. | |
| 2015/0381239 A1* | 12/2015 | Shostak ............... | H04B 5/0037 455/41.1 |
| 2016/0211702 A1* | 7/2016 | Muratov ................. | H01F 38/14 |
| 2016/0318413 A1 | 11/2016 | Roehrl et al. | |
| 2017/0005399 A1 | 1/2017 | Ito et al. | |
| 2017/0063128 A1* | 3/2017 | Van Bosch ............. | H02J 7/025 |

FOREIGN PATENT DOCUMENTS

| | | |
|---|---|---|
| JP | 2015-111996 | 6/2015 |
| KR | 101257676 | 5/2013 |
| KR | 1020140060110 | 5/2014 |
| KR | 1020140090045 | 7/2014 |
| WO | WO 2015/096997 | 7/2015 |
| WO | WO 2015/147133 | 10/2015 |

OTHER PUBLICATIONS

European Search Report dated Oct. 30, 2018 issued in counterpart application No. 16189115.5-1202, 8 pages.
European Search Report dated Mar. 21, 2018 issued in counterpart application No. 16189115.5-1202, 5 pages.

* cited by examiner

WPC

| mm | -12 | -10 | -8 | -6 | -4 | -2 | 0 | 2 | 4 | 6 | 8 | 10 | 12 | 14 |
|---|---|---|---|---|---|---|---|---|---|---|---|---|---|---|
| 10 | | | | | | | 5.38 | 5.35 | 5.04 | | | | | |
| 8 | | | 5.32 | 5.36 | 5.31 | 5.37 | 5.34 | 5.34 | 5.28 | 4.71 | | | | |
| 6 | | | 5.38 | 5.36 | 5.37 | 5.38 | 5.39 | 5.37 | 5.35 | 5.36 | 5.35 | 4.48 | | |
| 4 | | 4.79 | 5.35 | 5.33 | 5.38 | 5.41 | 5.39 | 5.38 | 5.39 | 5.38 | 5.33 | 5.34 | 4.88 | |
| 2 | | 5.36 | 5.42 | 5.4 | 5.42 | 5.39 | 5.42 | 5.38 | 5.42 | 5.38 | 5.4 | 5.34 | 5.33 | 5.34 |
| 0 | 5.45 | 5.44 | 5.41 | 5.46 | 5.41 | 5.4 | 5.43 | 5.39 | 5.38 | 5.39 | 5.35 | 5.34 | 5.33 | 5.34 |
| -2 | | 5.44 | 5.44 | 5.45 | 5.42 | 5.46 | 5.38 | 5.4 | 5.39 | 5.58 | 5.41 | 5.41 | 5.37 | 5.41 |
| -4 | | 5.02 | 5.24 | 5.43 | 5.4 | 5.39 | 5.43 | 5.65 | 5.45 | 5.27 | 5.43 | 5.39 | 5.37 | |
| -6 | | | 5.42 | 5.43 | 5.44 | 5.39 | 5.45 | 5.38 | 5.45 | 5.65 | 5.37 | 5.37 | 4.97 | |
| -8 | | | 5.23 | 5.46 | 5.46 | 5.51 | 5.4 | 5.41 | 5.39 | 5.42 | 5.42 | 5.43 | | |
| -10 | | | | 5.46 | 5.46 | 5.7 | 5.46 | 5.4 | 5.41 | 5.4 | 5.4 | | | |
| -12 | | | | | 5.44 | 5.39 | 5.42 | 5.44 | 5.43 | 5.46 | 5.44 | | | |

MST

| mm | -12 | -10 | -8 | -6 | -4 | -2 | 0 | 2 | 4 | 6 | 8 | 10 | 12 | 14 |
|---|---|---|---|---|---|---|---|---|---|---|---|---|---|---|
| 10 | | | | | | | 6.37 | 7.65 | 9.55 | | | | | |
| 8 | | | 7.64 | 7.26 | 5.45 | 5.93 | 5.94 | 7.82 | 8.64 | 9.8 | | | | |
| 6 | | | 6.83 | 6.4 | 6.74 | 6.15 | 5.88 | 5.73 | 5.7 | 7.46 | 8.81 | 7.59 | | |
| 4 | | 5.33 | 5.38 | 4.86 | 6.34 | 5.66 | 5.57 | 4.84 | 5.01 | 4.99 | 8.54 | 8.83 | 9.26 | |
| 2 | | 4.98 | 5.95 | 4.66 | 4.66 | 4.19 | 4.97 | 5.38 | 5.42 | 5.38 | 6.89 | 8.37 | 8.9 | 8.79 |
| 0 | 6.18 | 5.7 | 5.42 | 5.04 | 4.6 | 4.86 | 4.64 | 5.39 | 5.38 | 5.39 | 4.71 | 6.33 | 7.45 | 8.37 |
| -2 | | 5.3 | 4.75 | 4.68 | 4.42 | 4.38 | 4.11 | 4.26 | 4.31 | 4.42 | 5.41 | 5.8 | 7.46 | 9.02 |
| -4 | | 4.68 | 4.58 | 4.74 | 5.03 | 4.97 | 4.26 | 4.73 | 4.73 | 5.13 | 5.82 | 6.06 | 7.49 | |
| -6 | | | 4.76 | 5.86 | 5.45 | 5.64 | 4.22 | 4.42 | 4.35 | 5.21 | 5.56 | 5.89 | 7.69 | |
| -8 | | | 5.68 | 6.38 | 5.22 | 6.24 | 5.28 | 5.96 | 5.92 | 5.86 | 5.96 | 7.1 | | |
| -10 | | | | 7.34 | 6.59 | 5.7 | 5.67 | 5.83 | 5.45 | 5.4 | 7.87 | | | |
| -12 | | | | | 8.01 | 8.01 | 8.04 | 6.92 | 6.95 | 8.07 | 8.53 | | | |

MSTxNFC

| mm | -12 | -10 | -8 | -6 | -4 | -2 | 0 | 2 | 4 | 6 | 8 | 10 | 12 | 14 |
|---|---|---|---|---|---|---|---|---|---|---|---|---|---|---|
| 10 | | | | | | 7.84 | 11.4 | 11 | | | | | | |
| 8 | | | 18 | 14.4 | 10.8 | 6.76 | 8.38 | 8.29 | 9.68 | 14.2 | | | | |
| 6 | | 14.5 | 10.8 | 10.3 | 9.16 | 6.82 | 7.33 | 6.7 | 8.28 | 11.7 | 13.8 | | | |
| 4 | | 11.5 | 11.3 | 9.53 | 7.8 | 7.81 | 7.02 | 6.05 | 6.11 | 6.44 | 10.9 | 11.7 | 12.9 | |
| 2 | | 10.7 | 10.1 | 7.88 | 6.34 | REFERENCE 6.0 | REFERENCE 6.0 | REFERENCE 6.0 | 6.13 | 6.41 | 9.37 | 10.8 | 12.3 | 12 |
| 0 | 14.5 | 11.5 | 8.51 | 7.71 | 6.26 | REFERENCE 6.0 | REFERENCE 6.0 | REFERENCE 6.0 | 6.75 | 6.12 | 7.44 | 8.9 | 9.91 | 11.7 |
| -2 | | 8.75 | 6.37 | 6.98 | 6.67 | REFERENCE 6.0 | REFERENCE 6.0 | REFERENCE 6.0 | 6.02 | 6.04 | 7.84 | 7.54 | 11 | 13.8 |
| -4 | | 9.27 | 8.15 | 8.53 | 8.05 | 7.11 | 6.34 | 6.23 | 6.68 | 6.57 | 7.33 | 9.27 | 10.9 | |
| -6 | | 9.09 | 9.55 | 8.12 | 8.07 | 6.25 | 6.64 | 6.48 | 6.41 | 8.4 | 10.8 | 14.4 | | |
| -8 | | 11.7 | 10.8 | 6.26 | 8.36 | 6.65 | 6.38 | 6.57 | 7.56 | 9.95 | 9.02 | | | |
| -10 | | | 17.2 | 10.3 | 8.55 | 6.8 | 7.58 | 7.14 | 9.94 | 8.5 | | | | |
| -12 | | | | 12.7 | 12.4 | 8.52 | 7.2 | 8.97 | 7.83 | 7.59 | | | | |

MSTxNFC

| mm | -12 | -10 | -8 | -6 | -4 | -2 | 0 | 2 | 4 | 6 | 8 | 10 | 12 | 14 |
|---|---|---|---|---|---|---|---|---|---|---|---|---|---|---|
| 10 | | | | | | 7.6 | 9.34 | 10.7 | | | | | | |
| 8 | | | | 9.99 | 9.24 | 7.44 | 7.07 | 7.35 | 8.29 | 9.76 | 11.3 | | | |
| 6 | | | 8.96 | 8.08 | 8.27 | 7.64 | 7.04 | 7.01 | 6.7 | 8.57 | 10.1 | 9.41 | | |
| 4 | | 7.49 | 7.48 | 6.82 | 6.8 | 7.04 | 6.83 | 6.09 | 6.03 | 6.08 | 9.82 | 10.2 | 10.7 | |
| 2 | | 7.13 | 7.65 | 6.35 | 6.02 | REFERENCE 6.0 | REFERENCE 6.0 | REFERENCE 6.0 | 6.15 | 6.16 | 8.25 | 9.66 | 10.3 | 10.2 |
| 0 | 8.53 | 7.71 | 6.99 | 6.57 | 6.23 | REFERENCE 6.0 | REFERENCE 6.0 | REFERENCE 6.0 | 6.05 | 6.23 | 6.29 | 7 | 8.78 | 9.77 |
| -2 | | 6.95 | 6.09 | 6.12 | 6.11 | REFERENCE 6.0 | REFERENCE 6.0 | REFERENCE 6.0 | 6.42 | 6.12 | 6.86 | 7.1 | 8.94 | 10.6 |
| -4 | | 6.66 | 6.36 | 6.23 | 6.63 | 6.4 | 6.58 | 6.1 | 6.23 | 6.41 | 7.08 | 7.59 | 8.95 | |
| -6 | | 6.67 | 7.49 | 6.94 | 7.07 | 6.61 | 6.47 | 6.38 | 6.44 | 7.07 | 7.73 | 9.56 | | |
| -8 | | | 7.74 | 8.08 | 6.42 | 7.58 | 6.54 | 7.03 | 7.03 | 7.15 | 7.63 | 8.37 | | |
| -10 | | | 9.68 | 8.16 | 7.2 | 6.87 | 7.13 | 6.76 | 7.81 | 8.95 | | | | |
| -12 | | | | 9.6 | 9.56 | 9.1 | 7.96 | 8.24 | 9.04 | 9.42 | | | | |

FIG.18B

WPC-MST

| mm | -12 | -10 | -8 | -6 | -4 | -2 | 0 | 2 | 4 | 6 | 8 | 10 | 12 | 14 |
|---|---|---|---|---|---|---|---|---|---|---|---|---|---|---|
| 10 |  |  |  |  |  | -1 | -2.3 | -4.5 |  |  |  |  |  |  |
| 8 |  |  |  | -2.3 | -1.9 | -0.1 | -0.6 | -0.6 | -.25 | -3.4 | -5.1 |  |  |  |
| 6 |  |  | -1.5 | -1 | -1.4 | -0.8 | -0.5 | -0.4 | -0.4 | -2.1 | -3.5 | -3.1 |  |  |
| 4 |  | -0.5 | -0 | 0.47 | 0.04 | -0.3 | -0.2 | 0.54 | 0.38 | 0.39 | -3.2 | -3.5 | -4.4 |  |
| 2 |  | 0.38 | -0.5 | 0.44 | 0.46 | REFERENCE 0.5 |  | | 0.53 | 0.28 | -1.5 | -3 | -3.6 | -3.5 |
| 0 | -0.7 | -0.3 | -0 | 0.42 | 0.49 |  |  | | 0.51 | 0.35 | 0.64 | 0.01 | -2.1 | -3 |
| -2 |  | 0.14 | 0.49 | 0.57 | 0.54 |  |  | | 0.67 | 0.67 | 0 | -0.4 | -2.1 | -3.6 |
| -4 |  | 0.34 | 0.46 | 0.49 | 0.37 | 0.42 | 0.49 | -0.9 | 0.62 | 0.14 | -0.4 | -0.7 | -2.1 |  |
| -6 |  |  | 0.46 | -0.4 | -0 | -0.3 | 0.23 | -1 | 0.49 | 0.44 | -0.2 | -0.5 | -2.7 |  |
| -8 |  |  | -0.4 | -0.9 | 0.24 | -0.7 | 0.12 | -0.6 | -0.5 | -0.4 | -0.5 | -1.7 |  |  |
| -10 |  |  |  | -1.9 | -1.1 | 0 | -0.2 | -0.4 | -0 | -0.8 | -2.5 |  |  |  |
| -12 |  |  |  |  | -2.6 | -2.6 | -2.6 | -1.5 | -1.5 | -2.6 | -3.1 |  |  |  |

FIG.19B

WPC

| mm  | -12 | -10  | -8   | -6   | -4   | -2   | 0    | 2    | 4    | 6    | 8    | 10   | 12 | 14 |
|-----|-----|------|------|------|------|------|------|------|------|------|------|------|----|----|
| 14  |     |      |      |      |      |      | 5.29 |      |      |      |      |      |    |    |
| 12  |     |      |      |      | 4.64 | 5.37 | 5.39 | 5.04 | 5    |      |      |      |    |    |
| 10  |     |      |      |      | 5.42 | 5.36 | 5.41 | 5.49 | 5.04 | 4.59 |      |      |    |    |
| 8   |     |      |      | 5.41 | 5.46 | 5.42 | 5.41 | 5.52 | 5.39 | 5.36 |      |      |    |    |
| 6   |     |      | 5.25 | 5.43 | 5.46 | 5.44 | 5.44 | 5.55 | 5.4  | 5.38 | 5.06 |      |    |    |
| 4   |     |      | 5.5  | 5.43 | 5.45 | 5.46 | 5.46 | 5.46 | 5.43 | 5.39 | 5.39 |      |    |    |
| 2   |     | 5.5  | 5.46 | 5.49 | 5.46 |      | WR   |      | 5.43 | 5.41 | 5.39 | 4.75 |    |    |
| 0   |     | 6.46 | 5.47 | 5.46 | 6.26 |      |      |      | 5.44 | 5.43 | 5.39 | 5.1  |    |    |
| -2  |     | 5.51 | 5.55 | 6.53 | 5.47 |      |      |      | 5.44 | 5.51 | 5.39 | 4.83 |    |    |
| -4  |     |      | 5.54 | 5.47 | 5.42 | 5.46 | 5.46 | 5.44 | 5.44 | 5.41 | 6.29 |      |    |    |
| -6  |     |      | 4.97 | 5.5  | 5.47 | 5.47 | 5.46 | 5.43 | 5.44 | 5.42 | 5.06 |      |    |    |
| -8  |     |      |      | 5.07 | 5.49 | 5.48 | 5.47 | 5.43 | 5.44 | 5.22 |      |      |    |    |
| -10 |     |      |      |      | 5.53 | 5.48 | 5.47 | 5.42 | 5.45 |      |      |      |    |    |
| -12 |     |      |      |      | 4.77 | 5.29 | 5.55 | 5.45 |      |      |      |      |    |    |
| -14 |     |      |      | 1.01 |      |      | 5.57 |      |      |      |      |      |    |    |

MST

| mm  | -12 | -10  | -8   | -6   | -4   | -2   | 0    | 2    | 4    | 6    | 8    | 10   | 12 | 14 |
|-----|-----|------|------|------|------|------|------|------|------|------|------|------|----|----|
| 14  |     |      |      |      |      |      | 2.21 |      |      |      |      |      |    |    |
| 12  |     |      |      |      | 0.93 | 0.96 | 1.27 | 2.03 | 2.39 |      |      |      |    |    |
| 10  |     |      |      |      | 0.99 | 1.13 | 1.13 | 1.36 | 2.04 | 2.21 |      |      |    |    |
| 8   |     |      |      | 0.98 | 0.95 | 1.01 | 1.01 | 0.99 | 1.45 | 1.5  |      |      |    |    |
| 6   |     |      | 1.01 | 1.02 | 0.95 | 0.97 | 1.01 | 0.89 | 1.45 | 1.12 | 1.26 |      |    |    |
| 4   |     |      | 1    | 1.01 | 0.92 | 0.96 | 1    | 1    | 0.95 | 0.92 | 0.83 |      |    |    |
| 2   |     | 0.86 | 0.99 | 1.03 | 0.95 |      | Mr   |      | 1    | 0.99 | 0.95 | 1.05 |    |    |
| 0   |     | 0.94 | 1.05 | 1.02 | 0.95 |      |      |      | 0.98 | 1.01 | 1    | 1.04 |    |    |
| -2  |     | 1    | 0.93 | 0.97 | 0.87 |      |      |      | 0.95 | 0.95 | 1.03 | 1.02 |    |    |
| -4  |     |      | 1.04 | 0.86 | 1.15 | 0.98 | 0.98 | 0.99 | 1.05 | 1.08 | 1.02 |      |    |    |
| -6  |     |      | 0.99 | 0.99 | 1.18 | 1.03 | 1.09 | 1.03 | 1.16 | 1.19 | 1.04 |      |    |    |
| -8  |     |      |      | 1.18 | 1.04 | 1.14 | 1.06 | 1.11 | 1.51 | 1.84 |      |      |    |    |
| -10 |     |      |      |      | 1.26 | 1.61 | 1.39 | 1.01 | 2.17 |      |      |      |    |    |
| -12 |     |      |      |      | 1.35 | 2.36 | 1.61 | 1.35 |      |      |      |      |    |    |
| -14 |     |      |      |      |      |      | 2.13 |      |      |      |      |      |    |    |

NFC

| mm  | -12 | -10  | -8   | -6   | -4   | -2   | 0    | 2    | 4    | 6    | 8    | 10   | 12 | 14 |
|-----|-----|------|------|------|------|------|------|------|------|------|------|------|----|----|
| 14  |     |      |      |      |      |      | 1.47 |      |      |      |      |      |    |    |
| 12  |     |      |      |      | 1.36 | 1.4  | 1.4  | 1.5  | 1.55 |      |      |      |    |    |
| 10  |     |      |      |      | 1.36 | 1.39 | 1.37 | 1.46 | 1.51 | 1.55 |      |      |    |    |
| 8   |     |      |      | 1.4  | 1.32 | 1.36 | 1.32 | 1.41 | 1.44 | 1.52 |      |      |    |    |
| 6   |     |      | 1.33 | 1.32 | 1.28 | 1.28 | 1.29 | 1.33 | 1.4  | 1.44 | 1.49 |      |    |    |
| 4   |     |      | 1.31 | 1.26 | 1.26 | 1.26 | 1.28 | 1.29 | 1.33 | 1.38 | 1.44 |      |    |    |
| 2   |     | 1.28 | 1.28 | 1.28 | 1.24 |      | Nr   |      | 1.31 | 1.34 | 1.39 | 1.39 |    |    |
| 0   |     | 1.28 | 1.28 | 1.26 | 1.24 |      |      |      | 1.3  | 1.3  | 1.35 | 1.37 |    |    |
| -2  |     | 1.23 | 1.24 | 1.25 | 1.24 |      |      |      | 1.31 | 1.31 | 1.36 | 1.32 |    |    |
| -4  |     |      | 1.21 | 1.24 | 1.2  | 1.23 | 1.24 | 1.27 | 1.31 | 1.33 | 1.36 |      |    |    |
| -6  |     |      | 1.26 | 1.23 | 1.21 | 1.24 | 1.24 | 1.31 | 1.32 | 1.36 | 1.37 |      |    |    |
| -8  |     |      |      | 1.2  | 1.24 | 1.24 | 1.31 | 1.32 | 1.36 | 1.43 |      |      |    |    |
| -10 |     |      |      |      | 1.25 | 1.29 | 1.35 | 1.29 | 1.43 |      |      |      |    |    |
| -12 |     |      |      |      | 1.2  | 1.32 | 1.36 | 1.38 |      |      |      |      |    |    |
| -14 |     |      |      |      |      |      | 1.38 |      |      |      |      |      |    |    |

WIRELESS POWER RECEIVER AND METHOD FOR CONTROLLING SAME

PRIORITY

This application claims priority under 35 U.S.C. § 119(a) to Korean Patent Application Serial No. 10-2015-0152467, which was filed in the Korean Intellectual Property Office on Oct. 30, 2015, the entire content of which is incorporated herein by reference.

BACKGROUND

1. Field of the Disclosure

The present disclosure relates to a wireless power receiver and a method of controlling the same and, more particularly, to a wireless power receiver for wirelessly receiving power from a wireless power transmitter and a method of controlling the same.

2. Description of the Related Art

Mobile terminals such as mobile phones, Personal Digital Assistants (PDAs), etc., are generally powered by rechargeable batteries, and the rechargeable batteries of the mobile terminals are generally charged with electric energy received through separate charging devices. Typically, a charging device and a battery each have separate contact terminals at an exterior thereof, and are electrically connected to each other by contacting the contact terminals.

Wireless charging or non-contact charging technologies are also currently used for some electronic devices.

The wireless charging technology uses wireless power transmission and reception, for example, in a system in which a battery is automatically charged if a mobile phone including the battery is simply placed on a charging pad, without physically connecting the mobile phone to a separate charging connector.

Wireless charging technology generally includes an electromagnetic induction scheme using a coil, a resonance scheme using resonance, and a radio frequency (RF)/microwave radiation scheme converting electrical energy to a microwave and then transmitting the microwave.

Wireless charging technology can improve a waterproof function of an electronic device because the electronic device can be better sealed when it does not have to connect to a separate charging connector. Also, wireless charging technology can improve the portability of an electronic device because it does not require a user to also carry a wired charger.

However, wireless charging efficiency is relatively lower than wired charging efficiency. In order to increase wireless charging efficiency, proper alignment of a wireless power receiver and a wireless power transmitter is important.

A conventional wireless power receiver has a configuration in which an attractor or the like is included within a coil in order to determine the alignment of the wireless power transmitter. However, due to the additional hardware, the wireless power receiver has problems in that a mounting area is reduced and product thickness and weight are increased.

SUMMARY

The present disclosure is made to address the aforementioned problem or other problems, and to provide at least the advantages described below.

An aspect of the present disclosure is to provide a wireless power receiver that determines an alignment state of a wireless power transmitter, and a method of controlling the same.

Another aspect of the present disclosure is to provide an electronic device and a method of that determine an alignment state by using a signal output from a pattern generally used for another purpose, thereby determining the alignment state without additional hardware.

In accordance with an aspect of the present disclosure, an electronic device is provided. The electronic device includes a communication circuit; a battery; a first conductive pattern electrically connected to the battery and configured to wirelessly receive power; a second conductive pattern electrically connected to the communication circuit; a processor; and a memory that stores instructions, which when executed, instruct the processor to receive power from an external device through the first conductive pattern, to detect a voltage or a current of a signal output from the second conductive pattern while receiving the power, and to provide an output that is at least partially based on the detected voltage or current of the signal output from the second conductive pattern.

In accordance with another aspect of the present disclosure, an electronic device is provided. The electronic device includes a first conductive pattern configured to wirelessly receive power transmitted from an external electronic device; a second conductive pattern including a first part and a second part, wherein different voltages are applied to each of the first part and the second part by the power transmitted from the external electronic device; a processor; and a memory configured to store instructions, which when executed, instruct the processor to receive a signal output from the second conductive pattern while receiving the power from the external electronic device through the first conductive pattern, and to determine whether the first conductive pattern is aligned with the external electronic device.

In accordance with another aspect of the present disclosure, a method of operating an electronic device is provided. The method includes wirelessly receiving, by the electronic device, power from an external electronic device through a first conductive pattern connected to a communication circuit; detecting a signal output from a second conductive pattern of the electronic device, while receiving the power; and providing an output, at least partially based on the detected signal output from the second conductive pattern.

In accordance with another aspect of the present disclosure, a method of operating an electronic device is provided. The method includes wirelessly receiving, by the electronic device, power transmitted from an external electronic device through a first conductive pattern; detecting a signal output from a second conductive pattern including a first part and a second part to which different voltages are applied by the power transmitted from the external electronic device; and determining whether the first conductive pattern is aligned with the external electronic device, based on the detected signal output from the second conductive pattern.

In accordance with another aspect of the present disclosure, a method of operating an electronic device is provided. The method includes wirelessly receiving, by the electronic device, power from an external electronic device through a first conductive pattern connected to a communication circuit; detecting a first voltage or current of a first signal output from a second conductive pattern of the electronic device, while receiving the power; detecting a second voltage or current of a second signal output from a third conductive pattern connected to another communication circuit; and providing an output, at least partially based on at least one of the first voltage or current of the first signal output from the second conductive pattern and the second voltage or current of the second signal output from the third conductive pattern.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 18B illustrates tables according to an embodiment of the present disclosure;

FIG. 19B illustrates a table according to an embodiment of the present disclosure;

FIGS. 20B and 20C illustrate tables according to an embodiment of the present disclosure;

DETAILED DESCRIPTION

Figure 1:
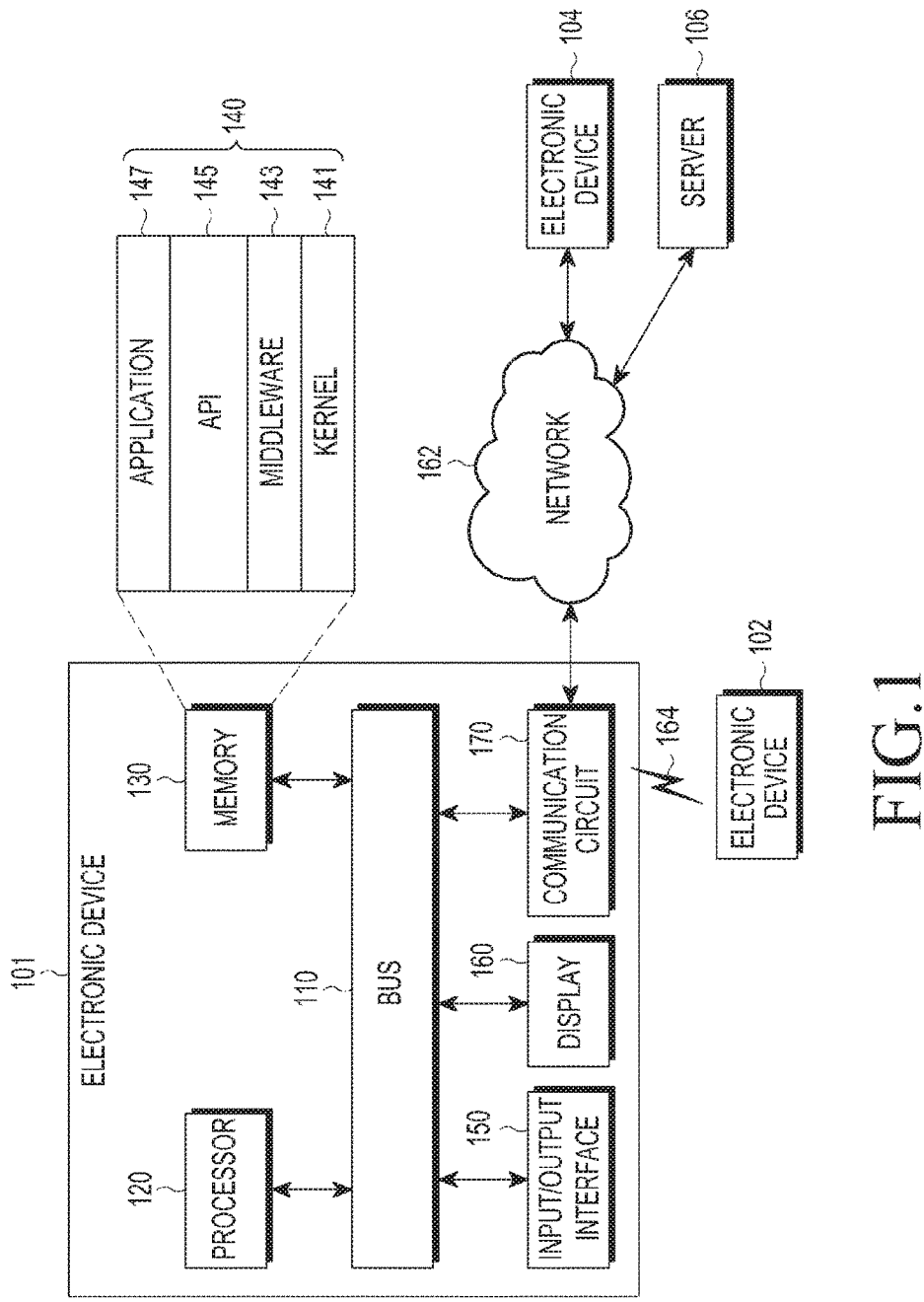
FIG. 1 illustrates an electronic device and a network according to an embodiment of the present disclosure.

Hereinafter, various embodiments of the present disclosure will be described with reference to the accompanying drawings. However, there is no intent to limit the present disclosure to the particular forms disclosed herein; rather, the present disclosure should be construed to cover various modifications, equivalents, and/or alternatives of embodiments of the present disclosure.

In describing the drawings, similar reference numerals may be used to designate similar constituent elements.

The terms used herein are merely for the purpose of describing particular embodiments and are not intended to limit the scope of other embodiments. Unless defined otherwise, all terms used herein, including technical and scientific terms, have the same meanings as those commonly understood by a person skilled in the art to which the present disclosure pertains. Terms that are defined in a dictionary may be interpreted to have the same meanings as the terms would have in the relevant field of art, and are not to be interpreted to have ideal or excessively formal meanings unless clearly defined as such herein. In some cases, even a term defined in the present disclosure should not be interpreted to exclude embodiments of the present disclosure.

Singular forms may include plural forms as well unless the context clearly indicates otherwise.

Herein, a wireless power receiver may be referred to as "an electronic device" and a wireless power transmitter may be referred to as "an external electronic device". The aforementioned terms may be used from the viewpoint that the wireless power transmitter is physically separated from a viewpoint of the wireless power receiver.

Herein, the term "preset" may mean "preset" before a particular operation starts or "set as a part of design or tuning" when an electronic device is manufactured. The term "preset" may also be used to mean "dynamically selected" as an operation or "continuously and simultaneously selected (on the fly)". The term "selected range" should be understood as including at least one or all cases of the embodiments herein.

The term "module" as used herein may mean a unit including one of hardware, software, and firmware or a combination of two or more of them. The term "module" may be interchangeably used with "unit", "logic", "logical block", "component", or "circuit". The term "module" may indicate a minimum unit of an integrated component element or a part thereof, or a minimum unit for performing one or more functions or a part thereof.

A module may be mechanically or electronically implemented. For example, a module may include at least one of an Application-Specific Integrated Circuit (ASIC) chip, a Field-Programmable Gate Arrays (FPGA), and a programmable-logic device for performing operations as described below.

Herein, the terms "have", "may have", "include", and "may include" refer to the existence of a corresponding feature (e.g., numeral, function, operation, or constituent element such as component), and do not exclude one or more additional features.

The expressions "A or B", "at least one of A or/and B", and "one or more of A or/and B" may include all possible combinations of the items listed. For example, "A or B", "at least one of A and B", or "at least one of A or B" refer to (1) including at least one A, (2) including at least one B, or (3) including all of at least one A and at least one B.

The terms "a first", "a second", "the first", and "the second" may modify various components regardless of an order and/or importance, but do not limit the corresponding components. For example, a first user device and a second user device indicate different user devices although both of them are user devices. For example, a first element may be referred to as a second element, and similarly, a second element may be referred to as a first element, without departing from the scope of the present disclosure.

When an element (e.g., a first element) is referred to as being (operatively or communicatively) "connected," or "coupled," to another element (e.g., a second element), the first element may be directly connected or coupled directly to the second element or another element (e.g., a third element) may be interposed therebetween. However, when the first element is referred to as being "directly connected," or "directly coupled" to the second element, there is no element interposed therebetween.

The term "configured to" used in the present disclosure may be used interchangeably with, for example, "suitable for", "having the capacity to", "designed to", "adapted to", "made to", or "capable of" according to context. The term "configured to" may not necessarily imply "specifically designed to" in hardware. Alternatively, in some situations, the term "device configured to" may mean that the device, together with other devices or components, "is able to". For example, "a processor adapted (or configured) to perform A, B, and C" may mean a dedicated processor (e.g., an embedded processor) only for performing the corresponding operations or a generic-purpose processor (e.g., a central processing unit (CPU) or an application processor (AP)) that can perform the corresponding operations by executing one or more software programs stored in a memory device.

An electronic device according to an embodiment of the present disclosure may be a smart phone, a tablet Personal Computer (PC), a mobile phone, a video phone, an electronic book reader (e-book reader), a desktop PC, a laptop PC, a netbook computer, a workstation, a server, a PDA, a Portable Multimedia Player (PMP), a MPEG-1 audio layer-3 (MP3) player, a mobile medical device, a camera, and a wearable device. For example, the wearable device may be an accessory type (e.g., a watch, a ring, a bracelet, an anklet, a necklace, a glasses, a contact lens, or a Head-Mounted Device (HMD)), a fabric or clothing integrated type (e.g., electronic clothing), a body-mounted type (e.g., a skin pad or a tattoo), and a bio-implantable type (e.g., an implantable circuit). The electronic device may wirelessly receive power from a wireless power transmitter, and thus, may be referred to as a wireless power receiver.

The electronic device may also be a home appliance, such as a television (TV), a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® and PlayStation®), an electronic dictionary, an electronic key, a camcorder, and an electronic photo frame.

The electronic device may also be a medical device (e.g., a portable medical measuring device such as a blood glucose monitoring device, a heart rate monitoring device, a blood pressure measuring device, a body temperature measuring device, etc., a Magnetic Resonance Angiography (MRA) device, a Magnetic Resonance Imaging (MRI) device, a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic device for a ship (e.g., a navigation device for a ship and a gyro-compass), avionics, a security device, an automotive head unit, a robot for home or industry, an automatic teller machine (ATM), point of sales (POS) device, or an Internet of Things (IoT) device (e.g., a light bulb, a sensor, an electric or gas meter, a sprinkler device, a fire alarm, a thermostat, a streetlamp, a toaster, a sporting goods, a hot water tank, a heater, a boiler, etc.).

The electronic device may also be a part of furniture or a building/structure, an electronic board, an electronic signature receiving device, a projector, and/or various kinds of measuring instruments (e.g., a water meter, an electric meter, a gas meter, and a radio wave meter).

The electronic device may be a flexible electronic device.

The electronic device may also be a combination of one or more of the aforementioned devices.

Further, the electronic device is not limited to the aforementioned devices, and may include a different or new electronic device.

Herein, the term "user" may indicate a person who uses an electronic device or a device (e.g., an artificial intelligence (AI) electronic device) that uses an electronic device.

FIG. 1 illustrates an electronic device and a network according to an embodiment of the present disclosure.

Referring to FIG. 1, the electronic device 101 includes a bus 110, a processor 120, a memory 130, an input/output interface 150, a display 160, and a communication circuit 170. Alternatively, the electronic device 101 may omit at least one of the above elements and/or may include other elements.

The bus 110 may include a circuit that interconnects the elements and delivers communication (for example, a control message and/or data) therebetween.

The processor 120 may include one or more of a Central Processing Unit (CPU), an Application Processor (AP), and a Communication Processor (CP). The processor 120 may carry out operations or data processing relating to control and/or communication of at least one other element of the electronic device 101.

The memory 130 may include a volatile memory and/or a non-volatile memory. The memory 130 may store instructions or data related to at least one other element of the electronic device 101. The memory 130 store software and/or a program 140. The program 140 includes a kernel 141, middleware 143, an Application Programming Interface (API) 145, and application programs (or applications) 147. At least some of the kernel 141, the middleware 143, and the API 145 may be collectively referred to as an Operating System (OS).

The kernel 141 may control or manage system resources (for example, the bus 110, the processor 120, or the memory 130) used for performing an operation or function implemented by the other programs (for example, the middleware 143, the API 145, or the application programs 147). Further, the kernel 141 may provide an interface through which the middleware 143, the API 145, or the application programs 147 may access the individual elements of the electronic device 101 to control or manage the system resources.

The middleware 143 may function as an intermediary for the API 145 or the application programs 147 to communicate with the kernel 141, e.g., to exchange data.

In addition, the middleware 143 may process one or more task requests received from the application programs 147 according to priorities thereof. For example, the middleware 143 may assign priorities for using the system resources (for example, the bus 110, the processor 120, the memory 130, etc.) of the electronic device 101, to at least one of the application programs 147. The middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include at least one interface or function (for example, instruction) for file control, window control, image processing, and/or text control.

The input/output interface 150 may function as an interface that may transfer instructions or data input from a user or another external device to the other elements of the electronic device 101. Also, the input/output interface 150 may output instructions or data received from other elements of the electronic device 101 to the user or another external device.

The display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display various types of contents (e.g., text, images, videos, icons, and/or symbols). The display 160 may include a touch screen, which receives a touch, gesture, proximity, or hovering input by using an electronic pen or a user body part.

The communication circuit 170 may set communication between the electronic device 101 and a first external electronic device 102, a second external electronic device 104, and/or a server 106. The communication circuit 170 may be connected to a network 162 through wireless or wired communication to communicate with the second external electronic device 104 or the server 106.

The wireless communication may use at least one of Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include short range communication 164. The short-range communication 164 may include at least one of Wi-Fi, Bluetooth, Near Field Communication (NFC), and Global Navigation Satellite System (GNSS). The GNSS may include at least one of a Global Positioning System (GPS), a Global Navigation Satellite System (Glonass), a Beidou Navigation Satellite System, and a European Global Satellite-based Navigation System (Galileo), according to a use area, a bandwidth, etc.

The wired communication may include at least one of a Universal Serial Bus (USB), a High Definition Multimedia Interface (HDMI), Recommended Standard 232 (RS-232), and a Plain Old Telephone Service (POTS).

The network 162 may include at least one of a communication network, for example, a computer network (e.g., a local area network (LAN) or a wide area network (WAN)), the Internet, and a telephone network.

Each of the first and second external electronic devices 102 and 104 may be of a type identical to or different from that of the electronic device 101. The server 106 may include a group of one or more servers.

All or some of the operations performed in the electronic device 101 may be performed in the electronic devices 102 and 104 and/or the server 106.

For example, when the electronic device 101 has to perform some functions or services, the electronic device 101 may make a request for performing at least some functions relating thereto to the electronic device 102 or 104 and/or the server 106, instead of performing the functions or services by itself or in addition. The electronic device 102 or 104 and/or the server 106 may execute the requested functions or the additional functions, and may deliver a result of the execution to the electronic device 101. The electronic device 101 may provide the received result as is or further process the received result. For example, cloud computing, distributed computing, or client-server computing technology may be used in this process.

Figure 2:
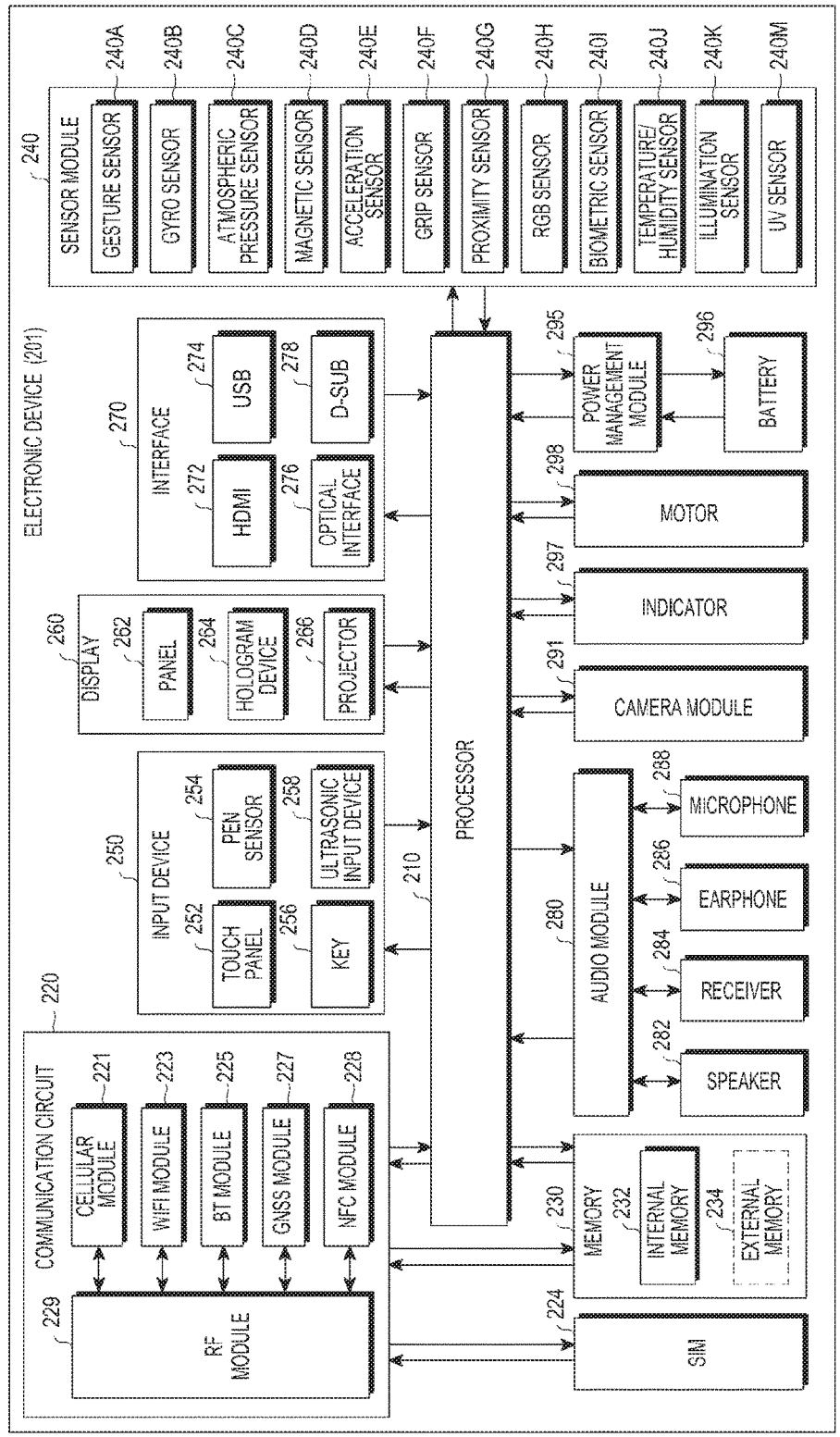
FIG. 2 illustrates an electronic device according to an embodiment of the present disclosure.

FIG. 2 illustrates an electronic device according to an embodiment of the present disclosure.

Referring to FIG. 2, the electronic device 201 includes an AP 210, a communication circuit 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an OS or an application program and perform processing of various pieces of data and calculations. For example, the processor 210 may be implemented by a System on Chip (SoC). The processor 210 may further include a Graphic Processing Unit (GPU) and/or an image signal processor. The processor 210 may also include at least some (e.g., a cellular module 221) of the elements illustrated in FIG. 2.

The processor 210 may load, into a volatile memory, instructions or data received from at least one of the other elements (e.g., a non-volatile memory), process the loaded instructions or data, and store various data in a non-volatile memory.

The communication circuit 220 includes the cellular module 221, a Wi-Fi module 223, a BT module 225, a GNSS module 227 (e.g., a GPS module, a Glonass module, a Beidou module, or a Galileo module), an NFC module 228, and an RF module 229.

The cellular module 221 may provide a voice call, image call, a text message service, and/or an Internet service through a communication network. The cellular module 221 may distinguish between and authenticate the electronic device 201 within a communication network using a subscriber identification module (e.g., the SIM card 224). The cellular module 221 may perform at least some of the functions that the processor 210 may provide. The cellular module 221 may include a Communication Processor (CP).

Each of the Wi-Fi module 223, the BT module 225, the GNSS module 227, and the NFC module 228 may include a processor for processing data transmitted and received through the corresponding module. At least some (two or more) of the cellular module 221, the Wi-Fi module 223, the Bluetooth module 225, the GNSS module 227, and the NFC module 228 may be included in one Integrated Chip (IC) or IC package.

The RF module 229 may transmit/receive a communication signal (e.g., an RF signal). The RF module 229 may include a transceiver, a Power Amp Module (PAM), a frequency filter, a Low Noise Amplifier (LNA), and/or an antenna. At least one of the cellular module 221, the Wi-Fi module 223, the BT module 225, the GNSS module 227, and the NFC module 228 may transmit/receive an RF signal through a separate RF module.

The subscriber identification module 224 may include a SIM card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 includes an internal memory 232 and an external memory 234. The internal memory 232 may include a volatile memory (for example, a Dynamic Random Access Memory (DRAM), a Static RAM (SRAM), a Synchronous Dynamic RAM (SDRAM), etc.) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disk drive, a Solid State Drive (SSD), etc.).

The external memory 234 may further include a flash drive, a Compact Flash (CF), a Secure Digital (SD), a Micro Secure Digital (Micro-SD), a Mini Secure Digital (Mini-SD), an eXtreme Digital (xD), a memory stick, etc. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 includes a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, a light sensor 240K, and a ultraviolet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an Infrared (IR) sensor, an iris sensor, and/or a fingerprint sensor.

The sensor module 240 may further include a control circuit for controlling one or more sensors included therein.

The electronic device 201 may further include a processor configured to control the sensor module 240 as a part of or separately from the processor 210, and may control the sensor module 240 while the processor 210 is in a sleep state.

The input device 250 includes a touch panel 252, a (digital) pen sensor 254, a key 256, and an ultrasonic input device 258. The touch panel 252 may use at least one of a capacitive type, a resistive type, an infrared type, and an ultrasonic type. The touch panel 252 may further include a control circuit and/or a tactile layer that provides tactile feedback to s user.

The (digital) pen sensor 254 may include a recognition sheet which is a part of the touch panel or is separated from the touch panel.

The key 256 may include a physical button, an optical key, and/or a keypad.

The ultrasonic input device 258 may detect ultrasonic waves generated by an input tool through a microphone (e.g., a microphone 288) and identify data corresponding to the detected ultrasonic waves.

The display 260 includes a panel 262, a hologram device 264, and a projector 266. The panel 262 may be implemented to be flexible, transparent, or wearable. The panel 262 and the touch panel 252 may be implemented as one module.

The hologram device 264 may show a three dimensional image in the air by using an interference of light.

The projector 266 may display an image by projecting light onto a screen. The screen may be located inside or outside the electronic device 201.

The display 260 may further include a control circuit for controlling the panel 262, the hologram device 264, or the projector 266.

The interface 270 includes a High-Definition Multimedia Interface (HDMI) 272, a Universal Serial Bus (USB) 274, an optical interface 276, and a D-subminiature (D-sub) 278. Additionally or alternatively, the interface 270 may include a Mobile High-definition Link (MHL) interface, a Secure Digital (SD) card/Multi-Media Card (MMC) interface, and/or an Infrared Data Association (IrDA) standard interface.

The audio module 280 may bilaterally convert a sound and an electrical signal. The audio module 280 may process sound information which is input or output through a speaker 282, a receiver 284, earphones 286, the microphone 288, etc.

The camera module 291 captures still and dynamic images. The camera module 291 may include one or more image sensors (e.g., a front sensor or a back sensor), a lens, an Image Signal Processor (ISP) or a flash (for example, LED or xenon lamp).

The power management module 295 may manage power of the electronic device 201. The power management module 295 may include a Power Management Integrated Circuit (PMIC), a charger Integrated Circuit (IC), and/or a battery gauge. The PMIC may have a wired and/or wireless charging scheme. Examples of the wireless charging method may include a magnetic resonance method, a magnetic induction method, an electromagnetic wave method, etc. Additional circuits (e.g., a coil loop, a resonance circuit, a rectifier, etc.) for wireless charging may be further included.

The battery gauge may measure a residual quantity of the battery 296, and a voltage, a current, and/or a temperature during the charging.

The battery 296 may include a rechargeable battery and/or a solar battery.

The indicator 297 may display a particular state (e.g., a booting state, a message state, a charging state, etc.) of the electronic device 201 or a part (e.g., the processor 210) of the electronic device 201.

The motor 298 may convert an electrical signal into mechanical vibration, and may generate vibration, a haptic effect, etc.

Although not illustrated, the electronic device 201 may include a processing unit (e.g., a GPU) for supporting a mobile TV. The processing unit for supporting mobile TV may process media data according to a certain standard such as Digital Multimedia Broadcasting (DMB), Digital Video Broadcasting (DVB), or mediaFlo®.

Each of the above-described component elements of hardware according to the present disclosure may be configured with one or more components, and the names of the corresponding component elements may vary based on the type of electronic device. The electronic device may include at least one of the aforementioned elements. Some elements may be omitted or other additional elements may be further included in the electronic device. Also, some of the hardware components may be combined into a single entity, which may perform similar functions to those of the relevant components before the combination.

Figure 3:
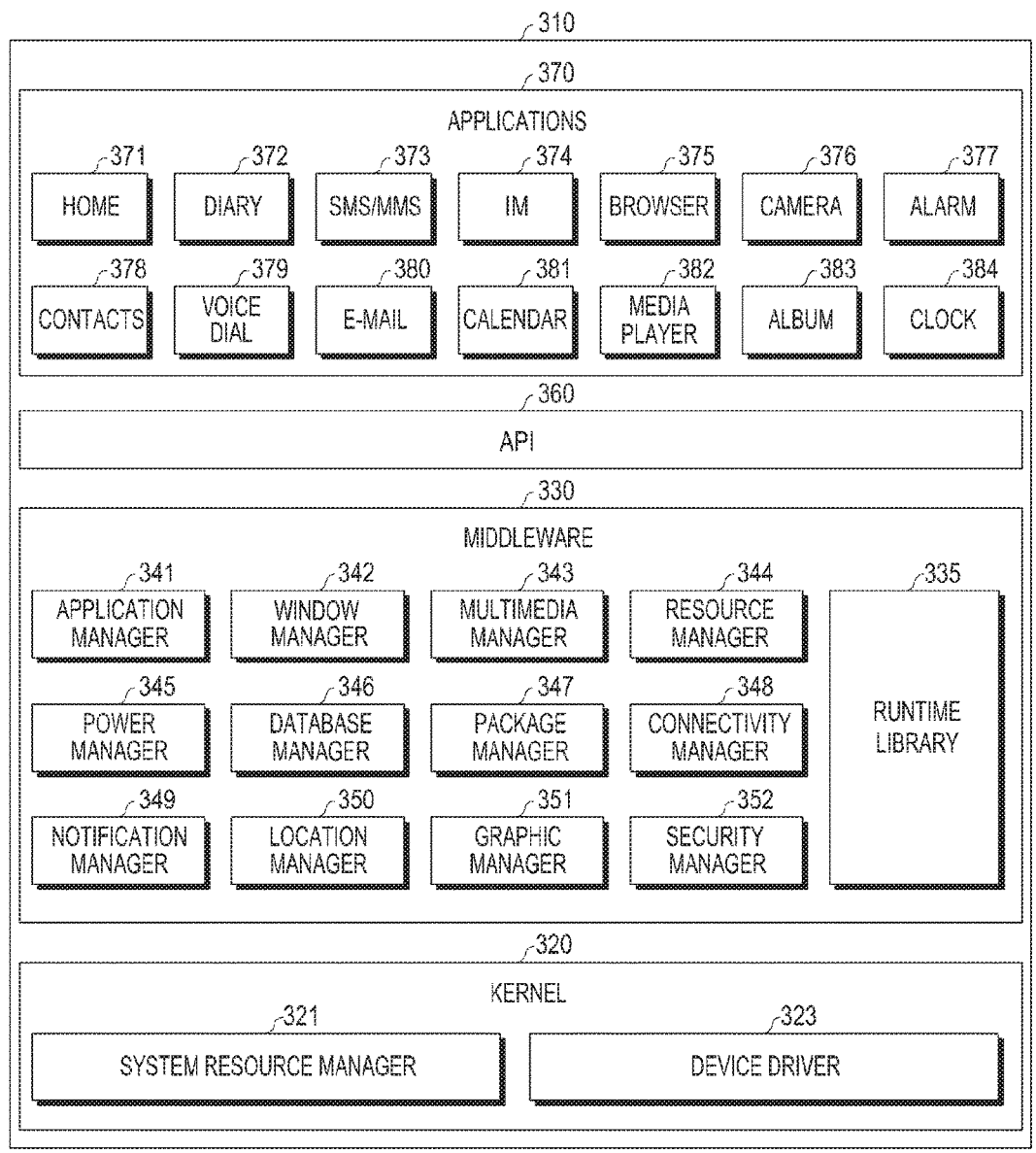
FIG. 3 illustrates a program module according to an embodiment of the present disclosure.

FIG. 3 illustrates a program module according to an embodiment of the present disclosure.

Referring to FIG. 3, the program module 310 may include an OS for controlling resources related to an electronic device and/or various applications executed in the OS.

The program module 310 includes a kernel 320, middleware 330, an API 360, and applications 370. At least some of the program module 310 may be preloaded on the electronic device, or may be downloaded from an external electronic device.

The kernel 320 includes a system resource manager 321 and a device driver 323. The system resource manager 321 may perform the control, allocation, retrieval, etc., of system resources. The system resource manager 321 may include a process manager, a memory manager, a file system manager, etc. The device driver 323 may include a display driver, a camera driver, a Bluetooth driver, a shared memory driver, a USB driver, a keypad driver, a Wi-Fi driver, an audio driver, and/or an Inter-Process Communication (IPC) driver.

The middleware 330 may provide a function required by the applications 370 in common or provide various functions to the applications 370 through the API 360, so that the applications 370 efficiently use limited system resources within the electronic device. The middleware 330 includes a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, etc.

The application manager 341 may manage a life cycle of at least one of the applications 370.

The window manager 342 may manage Graphical User Interface (GUI) resources used for the screen.

The multimedia manager 343 may determine a format required to reproduce various media files, and may encode or decode a media file by using a coder/decoder (codec) appropriate for the corresponding format.

The resource manager 344 may manage resources, such as a source code, a memory, a storage space, etc., of at least one of the applications 370.

The power manager 345 may operate together with a Basic Input/Output System (BIOS) to manage a battery or power, and may provide power information required for the operation of the electronic device.

The database manager 346 may generate, search for, and/or change a database to be used by at least one of the applications 370.

The package manager 347 may manage the installation or update of an application distributed in the form of a package file.

The connectivity manager 348 may manage a wireless connection, such as Wi-Fi or Bluetooth.

The notification manager 349 may display or notify of an event, such as an arrival message, an appointment, a proximity notification, etc.

The location manager 350 may manage location information of the electronic device.

The graphic manager 351 may manage a graphic effect, which is to be provided to the user, or a user interface related to the graphic effect.

The security manager 352 may provide various security functions required for system security, user authentication, etc.

When the electronic device has a telephone function, the middleware 330 may further include a telephony manager for managing a voice call function or a video call function of the electronic device.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 is a set of API programming functions, and may be provided with a different configuration according to an OS. For example, when the OS is Android® or iOS®, one API set may be provided for each platform, and when the OS is Tizen®, two or more API sets may be provided for each platform.

The applications 370 include a home application 371, a dialer application 372, a short message service/multimedia message service (SMS/MMS) application 373, an Instant Message (IM) application 374, a browser application 375, a camera application 376, an alarm application 377, a contacts application 378, a voice dial application 379, an email application 380, a calendar application 381, a media player application 382, an album application 383, and a clock application 384. Additionally, the applications 370 may include a health care application (e.g., an application for measuring exercise or a blood sugar level) and/or an environment information application (e.g., an application that uses atmospheric pressure, humidity, or temperature information).

The applications 370 may also include an information exchange application that supports information exchange between the electronic device and an external electronic device. The information exchange application may include a notification relay application for transferring specific information to an external electronic device or a device management application for managing an external electronic device.

For example, the notification relay application may include a function of transferring, to the external electronic device, notification information generated from other applications of the electronic device (e.g., the SMS/MMS application 373, the email application 380, a health management application, or an environmental information application). Further, the notification relay application may receive notification information from an external electronic device and provide the received notification information to a user.

The device management application may manage (e.g., install, delete, or update) a function of an external electronic device communicating with the electronic device (e.g., turning on/off the external electronic device itself (or some elements thereof) or adjusting brightness (or resolution) of a display), applications executed in the external electronic device, or services provided from the external electronic device (e.g., a telephone call service or a message service).

The applications 370 may include applications designated according to attributes of an external electronic device. The applications 370 may include an application received from an external electronic device. The applications 370 may include a preloaded application or a third party application, which was downloaded from a server.

Names of the elements of the program module 310 may change depending on the type of OS.

At least some of the program module 310 may be implemented in software, firmware, hardware, or a combination of two or more thereof. At least some of the program module 310 may be implemented (e.g., executed) by a processor (e.g., the processor 210). At least some of the program module 310 may include a module, a program, a routine, a set of instructions, and/or a process for performing one or more functions.

Figure 4:
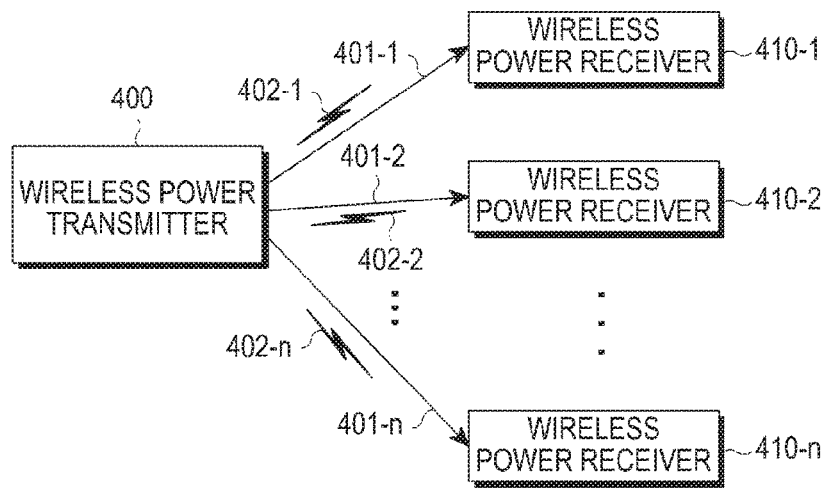
FIG. 4 illustrates a wireless charging system according to an embodiment of the present disclosure.

FIG. 4 illustrates a wireless charging system according to an embodiment of the present disclosure.

Referring to FIG. 4, the wireless charging system includes a wireless power transmitter 400 and wireless power receivers 410-1, 410-2, and 410-n. For example, the wireless power transmitter 400 may be implemented as an electronic device in a pad form or as a portable terminal device such as a mobile communication device. More specifically, the electronic device may wirelessly transmit power to another electronic device and wirelessly receive power from an external electronic device.

The wireless power transmitter 400 may wirelessly transmit power 401-1, 401-2, and 401-n to the wireless power receivers 410-1, 410-2, and 410-n, respectively.

The wireless power transmitter 400 may form an electrical connection with the wireless power receivers 410-1, 410-2, and 410-n. For example, the wireless power transmitter 400 may transmit wireless power by radiating an electromagnetic field or a magnetic field. The wireless power transmitter 400 may transmit wireless power based on an induction scheme or a resonance scheme.

The wireless power transmitter 400 may perform bi-directional communication with the wireless power receivers 410-1, 410-2, and 410-n by using a short-range communication protocol (e.g., Bluetooth, NFC, Wi-Fi, etc.). In out-band type communication, the wireless power transmitter 400 and the wireless power receivers 410-1, 410-2, and 410-n may process or transmit packets 402-1, 402-2, and 402-n including predetermined frames. Particularly, each of the wireless power receivers 410-1, 410-2, and 410-n may be implemented as a mobile communication terminal, a PDA, a PMP, a smart phone, a wearable electronic device, etc.

In in-band type communication, the wireless power receivers 410-1, 410-2, and 410-n may perform load modulation and the wireless power transmitter 400 may acquire reports of the wireless power receivers 410-1, 410-2, and 410-n according to detection of the load change.

The wireless power transmitter 400 may wirelessly provide power to the wireless power receivers 410-1, 410-2, and, 410-n. For example, the wireless power transmitter 400 may transmit power to the plurality of wireless power receivers 410-1, 410-2, and 410-n through the resonance scheme. When the wireless power transmitter 400 adopts the resonance scheme, distances between the wireless power transmitter 400 and the wireless power receivers 410-1, 410-2, and 410-n may be distances for the operation in an indoor environment. Further, when the wireless power transmitter 400 adopts the electromagnetic induction scheme, the distances between the wireless power transmitter 400 and the wireless power receivers 410-1, 410-2, and 410-n should be 10 cm or shorter.

The wireless power receivers 410-1, 410-2, and 410-n may receive wireless power from the wireless power transmitter 400 to charge batteries therein.

Further, the wireless power receivers 410-1, 410-2, and 410-n may transmit a signal for requesting wireless power transmission, information for wireless power reception, information on a status of the wireless power receiver, and/or information on a control of the wireless power transmitter 400 to the wireless power transmitter 400.

In addition, the wireless power receivers 410-1, 410-2, and 410-n may transmit a message indicating a charging state of each of the wireless power receivers 410-1, 410-2, and 410-n to the wireless power transmitter 400 in the in-band type or out-band type.

The wireless power transmitter 400 may include a display for displaying a status of each of the wireless power receivers 410-1, 410-2, and 410-n based on the message received from each of the wireless power receivers 410-1, 410-2, and 410-n. The wireless power transmitter 400 may also display an expected time period until each of the wireless power receivers 410-1, 410-2, and 410-n is completely charged.

Figure 5:
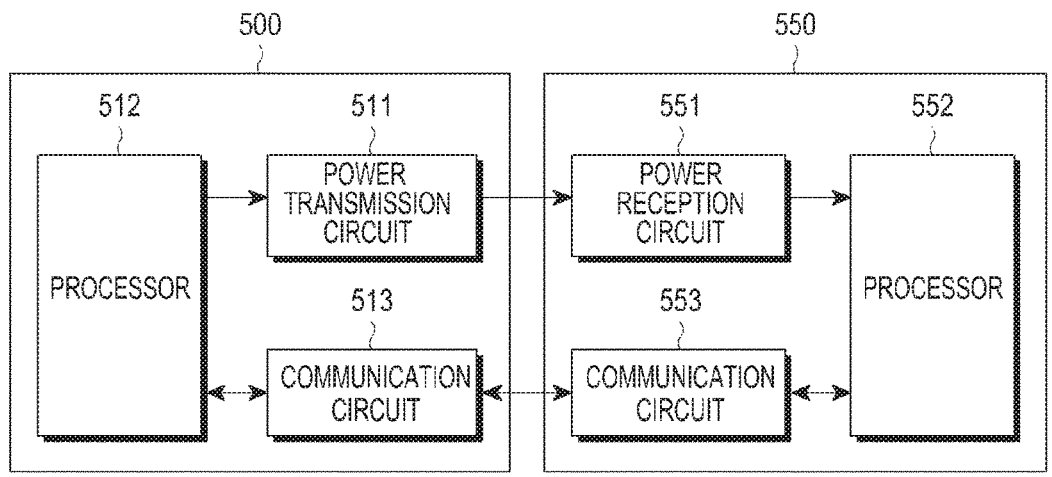
FIG. 5 illustrates a wireless power transmitter and a wireless power receiver according to an embodiment of the present disclosure.

FIG. 5 illustrates a wireless power transmitter and a wireless power receiver according to an embodiment of the present disclosure.

Referring to FIG. 5, a wireless power transmitter 500 includes a power transmission circuit 511, a processor 512, and a communication circuit 513, and the wireless power receiver 550 includes a power reception circuit 551, a processor 552, and a communication circuit 553.

The power transmission circuit 511 may wirelessly provide power to the wireless power receiver 550. For example, the power transmission circuit 511 may supply power in an AC waveform. Alternatively, the power transmission circuit 511 may supply power in a DC waveform and then convert the DC waveform into the AC waveform by using an inverter in order to provide the power in the AC waveform. Those skilled in the art will appreciate that the power transmission circuit 511 has no limitation as long as it can supply power of constant alternate current waves.

The power transmission circuit 511 may provide power of the AC waveform to the wireless power receiver 550. The power transmission circuit 511 may further include a resonant circuit or an inductive circuit, resulting in transmission or reception of a predetermined electromagnetic wave or magnetic field. When the power transmission circuit 511 is implemented by the resonant circuit, inductance L of a loop coil of the resonant circuit may be changed. Those skilled in the art will appreciate that the power transmission circuit 511 has no limitation as long as the power transmission circuit 511 is capable of transmitting/receiving an electromagnetic wave or magnetic wave.

The processor 512 may control a general operation of the wireless power transmitter 500. The processor 512 or the processor 552 may control the general operation of the wireless power transmitter 500 or the wireless power receiver 550 by using an algorithm, a program, or an application, required for the control, read from a memory.

The communication circuit 513 communicates with the wireless power receiver 550 or another electronic device in a predetermined scheme. For example, the communication circuit 513 may communicate with the communication circuit 553 of the wireless power receiver 550 by using a Near Field Communication (NFC) scheme, a Zigbee communication scheme, an infrared communication scheme, a visible ray communication scheme, a Bluetooth communication scheme, a Bluetooth Low Energy (BLE) scheme, Magnetic Secure Transfer (MST) scheme, etc.

The power reception circuit 551 may receive wireless power from the power transmission circuit 511 based on the induction scheme or the resonance scheme.

Figure 6:
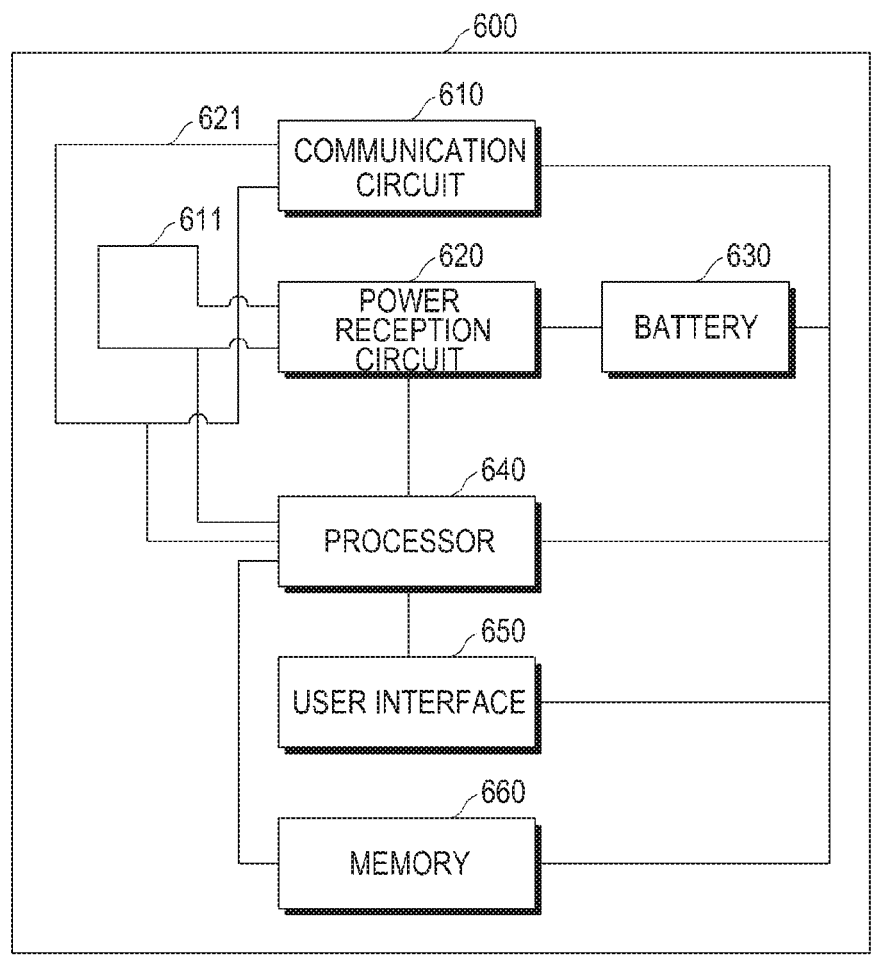
FIG. 6 illustrates a wireless power receiver according to an embodiment of the present disclosure.

FIG. 6 illustrates a wireless power receiver according to an embodiment of the present disclosure.

Referring to FIG. 6, the wireless power receiver i600 includes a communication circuit 610, a first coil 611, a power reception circuit 620, a second coil 621, a battery 630, a processor 640, a user interface 650, and a memory 660.

The communication circuit 610 may communicate with another electronic device. For example, the communication circuit 610 may communicate with another electronic device based on various communication standards. The communication circuit 610 may be connected to the second coil 621. The second coil 621 may serve as an antenna for transmitting an output signal from the communication circuit 610 or receiving a communication signal from another electronic device. More specifically, the communication circuit 610 may output the output signal to the second coil 621. The second coil 621 may radiate a magnetic field or an electromagnetic field according to the received output signal, and the other electronic device may communicate with the wireless power receiver 600 by using the radiated electromagnetic field. Further, the second coil 621 may output, to the communication circuit 610, an induced current according to the change in the magnetic field or electromagnetic field radiated from the other electronic device. Alternatively, the second coil 621 may constitute the resonant circuit together with another device and, in this case, may absorb the electromagnetic field radiated from the other electronic device and output the electromagnetic field to the communication circuit 610. An electrical characteristic of the second coil 621 may be defined according to a standard, which the communication circuit 610 follows, but there is no limitation on the electrical characteristic.

The first coil 611 may be connected to the power reception circuit 620. The wireless power receiver 600 may perform wireless charging in the induction scheme, and in this case, the first coil 611 may wirelessly receive power by outputting the induced current based on the magnetic field radiated from the wireless power transmitter.

The wireless power receiver 600 may perform wireless charging in the resonance scheme, and in this case, the first coil 611 may wirelessly receive power by configuring the resonant circuit with another device and absorbing the electromagnetic field radiated from the wireless power transmitter.

The power reception circuit 620 may process power wirelessly received from the first coil 611. For example, the power reception circuit 620 may rectify the received power in the AC waveform to power in the DC waveform and perform DC/DC conversion to a rated voltage of the battery 630. The power reception circuit 620 may be configured differently according to various wireless charging standards and there is no limitation on the type thereof.

Although FIG. 6 illustrates the first coil 611 inside of the second coil 621, the relative positions and patterns of the first coil 611 and the second coil 621 may vary. Further, the coils 611 and 621 may be implemented in a winding pattern on a plane. Accordingly, the terms "coil" and "conductive pattern" may be used interchangeably throughout the specification.

The battery 630 may be attachable to and detachable from the wireless power receiver or embedded therein.

Although FIG. 6 illustrates that the power reception circuit 620 and the battery 630 are directly connected to each other, a Power Management Integrated Circuit (PMIC) or a charger may be further interposed between the power reception circuit 620 and the battery 630.

The processor 640 may control a general operation of the wireless power receiver 600.

The memory 660 may store instructions to allow the processor 640 to receive power from the wireless power transmitter through the first coil 611, to detect a voltage or current of a signal output from the second coil 621 while receiving power, and to provide the output through the user interface 650 at least partially based on the detected voltage or current when the instructions are executed.

The user interface 650 may include at least one of a display, a speaker, a vibration device, and a light emitting device.

For example, the processor 640 may determine an alignment state of the first coil 611 with respect to the wireless power transmitter at least partially based on the voltage or current of the signal output from the second coil 621 during the reception of power. The processor 640 may determine the alignment state of the first coil 611 with respect to the wireless power transmitter by comparing the voltage or current of the signal output from the second coil 621 during the reception of power with a pre-stored reference value of the signal output from the second coil 621. The processor 640 may determine a coordinate of the first coil 611 based on the wireless power transmitter at least partially based on the voltage or current of the signal output from the second coil 621 during the reception of power. Further, the processor 640 may determine a relation between the determined coordinate and a proper position, and thus, determine a direction in which the wireless power receiver has to move.

Accordingly, the processor 640 may output the coordinate of the wireless power receiver or display induction of movement of the wireless power receiver through the user interface 650 based on a result of the determination of the alignment, when an instruction stored in the memory 660 is executed.

Alternatively, the processor 640 may control an amount of power transferred to the battery according to an alignment state.

As illustrated in FIG. 6, the first coil 611 and the second coil 621 may be directly connected to the processor 640. That is, the second coil 621 may not exchange a signal with the communication circuit 610 during the determination on the alignment state and may transmit an output signal to the processor 640.

Although not illustrated in FIG. 6, a switch or a rectifying device may be further interposed between the second coil 621 and the processor 640.

The second coil 621 may include a coil form asymmetrical in at least one direction when viewed from the top of one side of the wireless power receiver 600. The second coil 621 may be asymmetrical based on an axis penetrating the second coil 621. For example, a width of a conducting wire of a first part of the second coil 621 arranged on one side of the axis may be different from a width of a conducting wire of a second part of the second coil 621 arranged on the other side of the axis.

Relative positions of a plurality of parts included in the second coil 621 with respect to the first coil 611 may be different. For example, a shortest distance between the first part of the second coil 621 and the first coil 611 may be different from a shortest distance between the second part of the second coil 621 and the first coil 611.

Based on the asymmetry of the second coil 621 or the fact that the relative positions of the respective parts of the second coil 621 with respect to the first coil 611 are different, voltages applied to the respective parts of the second coil 621 may be different. For example, the voltage applied to the first part of the second coil 621 and the voltage applied to the second part of the second coil 621 may be different, and accordingly, a potential difference may be generated.

Further, the generated potential difference may be different according to a relative position between the wireless power receiver 600 and the wireless power transmitter.

For example, the potential difference between the first part and the second part of the second coil 621, when the wireless power receiver 600 is arranged at a first position of the wireless power transmitter, may be different from the potential difference between the first part and the second part of the second coil 621, when the wireless power receiver 600 is arranged at a second position of the wireless power transmitter, based on a direction of the magnetic field or the electromagnetic field radiated from the wireless power transmitter, which will be described in more detail below.

Although it is assumed that the number of communication circuits 620 is one in the embodiment of FIG. 6, the wireless power receiver 600 may further include an additional communication circuit and an additional coil connected thereto. The processor 640 may then determine an alignment state of the first coil 611 with respect to the wireless power transmitter by using a signal output from the additional coil.

The processor 640 may determine an amount of the current supplied to the battery 630 based on the detected voltage or current.

As described above, the wireless power receiver 600 may determine its alignment state by using a conventionally arranged coil for communication, without an additional coil.

Figure 7:
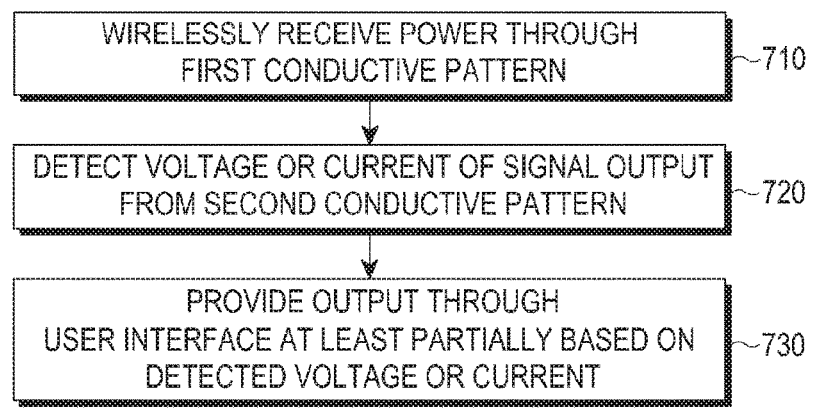
FIG. 7 is a flowchart illustrating a control method of a wireless power receiver according to an embodiment of the present disclosure.

FIG. 7 is a flowchart illustrating a control method of a wireless power receiver according to an embodiment of the present disclosure.

Referring to FIG. 7, the wireless power receiver wirelessly receives power through a first conductive pattern in step 710. The first conductive pattern may be formed for wireless power reception.

In step 720, the wireless power receiver detects a voltage or a current of a signal output from a second conductive pattern. For example, the wireless power receiver may detect the voltage or the current output from the second conductive pattern, while wirelessly receiving power through the first conductive pattern. The second conductive pattern may be a pattern formed for communication and may output a signal by the magnetic field or the electromagnetic field from the wireless power transmitter.

In step 730, the wireless power receiver provides an output through a user interface at least partially based on the detected voltage or current. For example, the wireless power receiver may provide information on an alignment state with respect to the wireless power transmitter, a movement direction for a good alignment, and a relative position of the wireless power receiver with respect to the wireless power transmitter through the user interface.

Figure 8:
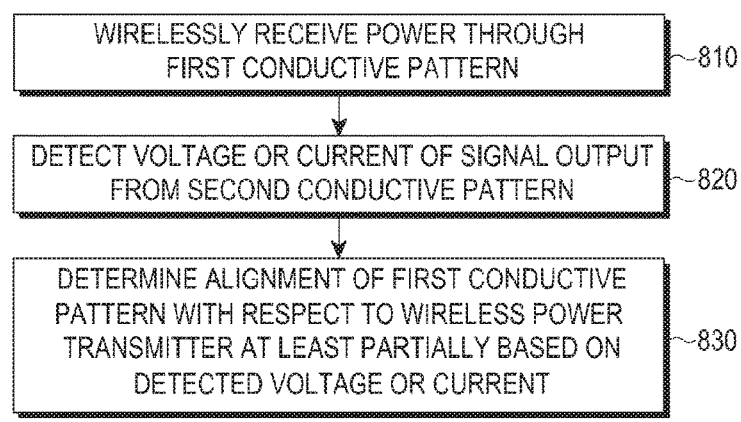
FIG. 8 is a flowchart illustrating a control method of a wireless power receiver according to an embodiment of the present disclosure.

FIG. 8 is a flowchart illustrating a control method of a wireless power receiver according to an embodiment of the present disclosure.

Referring to FIG. 8, the wireless power receiver wirelessly receives power through the first conductive pattern in step 810.

In step 820, the wireless power receiver detects a voltage or current of a signal output from the second conductive pattern.

In step 830, the wireless power receiver determines an alignment state of the first conductive pattern with respect to the wireless power transmitter at least partially based on the detected voltage or current.

Figure 9:
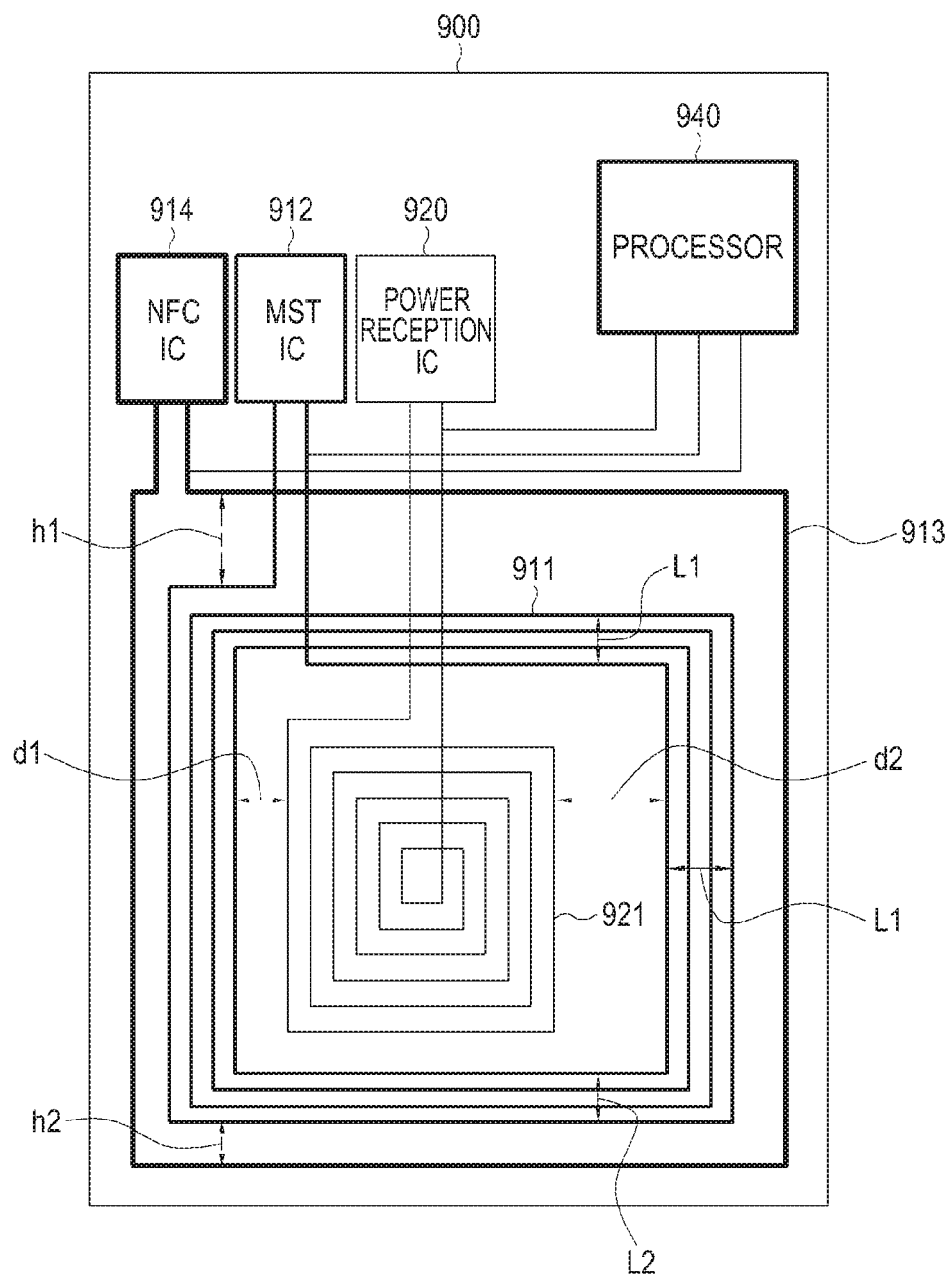
FIG. 9 illustrates a wireless power receiver according to an embodiment of the present disclosure.

FIG. 9 illustrates a wireless power receiver according to an embodiment of the present disclosure.

Referring to FIG. 9, the wireless power receiver 900 includes an MST coil 911, an MST IC 912, an NFC coil 913, an NFC IC 914, a power reception IC 920, a power reception coil 921, and a processor 940. Although FIG. 9 illustrates the MST coil 911 being arranged inside the NFC coil 913 and the power reception coil 921 being arranged inside the MST coil 911, the relative positions of the coils may vary. Further, the relative positions of a plurality of parts of the wireless power reception coil 921 with respect to the MST coil 911 may also be different.

A distance between an outermost conducting wire on the left side of the wireless power reception coil 921 and an innermost conducting wire on the left side of the MST coil 911 is d1, and a distance between an outermost conducting wire on the right side of the wireless power reception coil 921 and an innermost conducting wire on the right side of the MST coil 911 is d2. That is, the wireless power reception coil 921 may be biased relatively to the left inside the MST coil 911. Accordingly, relative positions of the plurality of parts of the MST coil 911 with respect to the wireless power reception coil 921, the shortest distances between the plurality of parts of the MST coil 911 and the wireless power reception coil 921 may be different.

Relative positions of a plurality of parts of the NFC coil 913 with respect to the MST coil 911 may also be different.

For example, a distance between an outermost conducting wire on the upper side of the MST coil 911 and a distance between an innermost conducting wire on the upper side of the NFC coil 913 is h1, and a distance between an outermost conducting wire on the lower side of the MST coil 911 and a distance between an innermost conducting wire on the lower side of the NFC coil 913 is h2. That is, the MST coil 911 may be biased relatively to the lower side inside the NFC coil 913. Accordingly, relative positions of a plurality of parts of the MST coil 911 with respect to the NFC coil 913, the shortest distances between the plurality of parts of the MST coil 911 and the NFC coil 913 may be different.

Because the relative positions of the plurality of parts of one coil with respect to another coil are different, when a magnetic field or an electromagnetic field is applied to the outside, voltages applied to the plurality of parts of the one coil may be different. For example, the voltage applied to the upper conducting wire of the NFC coil 913 and the voltage applied to the lower conducting wire of the NFC coil 913 may be different.

Further, the voltage applied to the left conducting wire of the MST coil 911 and the voltage applied to the right conducting wire of the MST coil 911 may be different. Accordingly, a potential difference may be formed between the plurality of parts within one coil.

According to a position change in the wireless power receiver, the potential difference formed between the plurality of parts of one coil may be changed. For example, the potential difference between the right conducting wire and the left conducting wire of the MST coil 911, when the wireless power receiver 900 is arranged at a first position of the wireless power transmitter, may be different from the potential difference between the right conducting wire and the left conducting wire of the MST coil 911, when the wireless power receiver 900 is arranged at a second position of the wireless power transmitter.

Further, the potential difference between the upper conducting wire and the lower conducting wire of the NFC coil 913, when the wireless power receiver 900 is arranged at a first position of the wireless power transmitter, may be different from the potential difference between the upper conducting wire and the lower conducting wire of the NFC coil 913, when the wireless power receiver 900 is arranged at a second position of the wireless power transmitter.

A combined width of the conducting wires on the upper side and the right side of the MST coil 911 is L1, and a combined width of the conducting wires on the lower side and the left side of the MST coil 911 is L2. The widths of the conducting wires may be relevant to resistance, and the voltage applied to the conducting wires on the upper side and the right side of the MST coil 911 may be different from the voltage applied to the conducting wires on the lower side and the left side of the MST coil 911. Accordingly, a potential difference may be formed between the plurality of parts.

More specifically, the potential difference between the plurality of parts may be different according to a relative position of the wireless power receiver 900 with respect to the wireless power transmitter. For example, the potential difference between the right conducting wire and the left conducting wire of the MST coil 911, when the wireless power receiver 900 is arranged at a first position based on the wireless power transmitter, may be different from the potential difference between the right conducting wire and the left conducting wire of the MST coil 911, when the wireless power receiver 900 is arranged at a second position based on the wireless power transmitter.

The processor 940 may determine a coordinate of the wireless power receiver 900 by using the measured potential difference. The processor 940 may determine an alignment state of the wireless power receiver 900 with respect to the wireless power transmitter according to the determined coordinate. A memory may pre-store a table between the potential difference and the coordinate of the wireless power receiver, and the processor 940 may determine the coordinate of the wireless power receiver 900 by using the measured potential difference and the table.

As illustrated in FIG. 9, the implementation of the MST coil 911 in the asymmetrical form or the implementation of the biased arrangement of the wireless power reception coil 921 in a particular direction inside the MST coil 911 are all examples. Alternatively, the MST coil 911 and the wireless power reception coil 921 and/or the NFC coil 913 may be implemented in asymmetrical form, and a relative position between at least two of the MST coil 911, the NFC coil 913, and the wireless power reception coil 921 may be implemented in various ways. That is, when the magnetic field or the electromagnetic field is incident from the wireless power transmitter, voltages applied to one part and another part of the coil for measurement are different, so that those skilled in the art may understand that there is no limitation on the implementation type as long as a sufficient potential difference is generated.

Figure 10A:
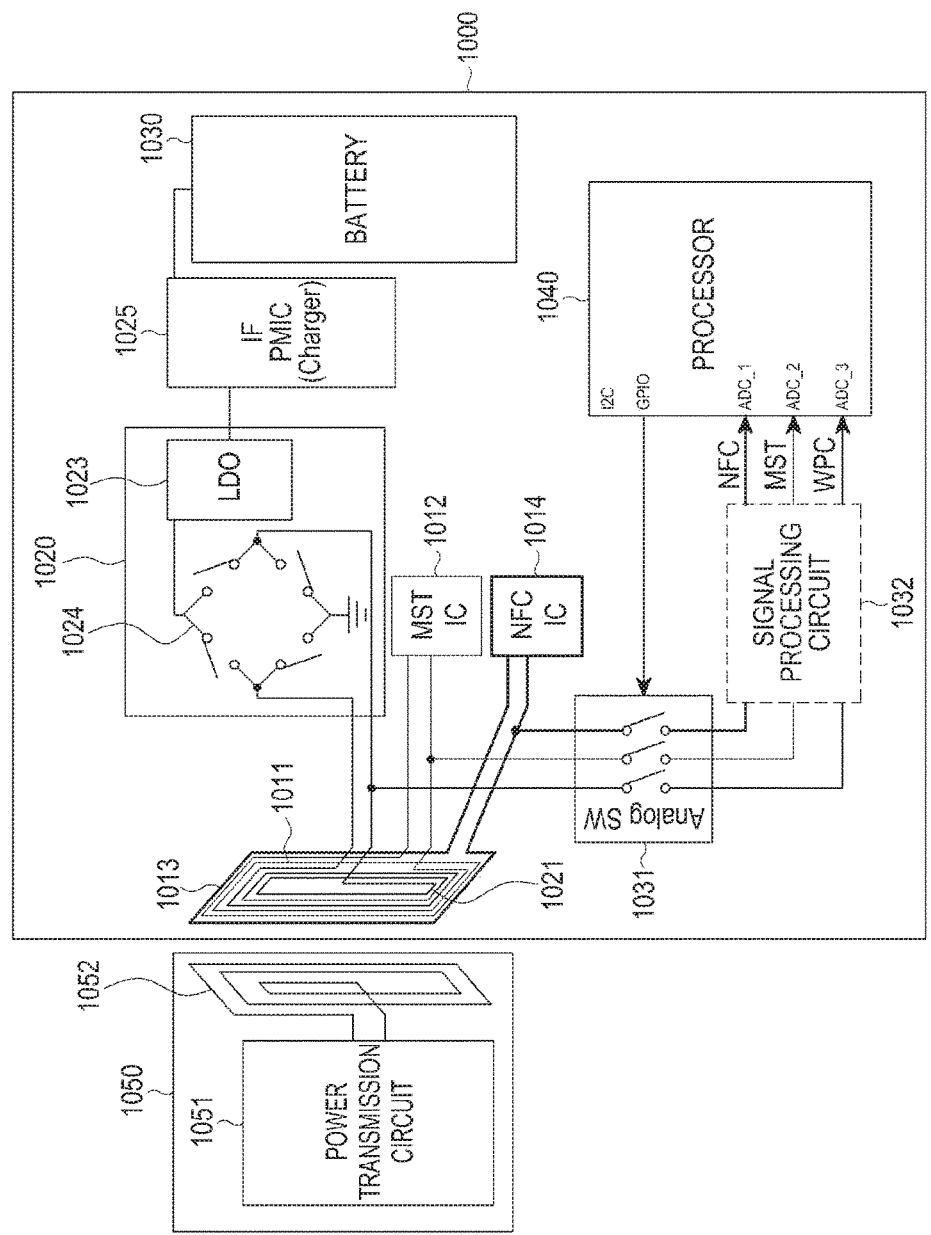
FIGS. 10A to 10C illustrate a wireless power receiver and a wireless power transmitter according to embodiments of the present disclosure.
Figure 10B:
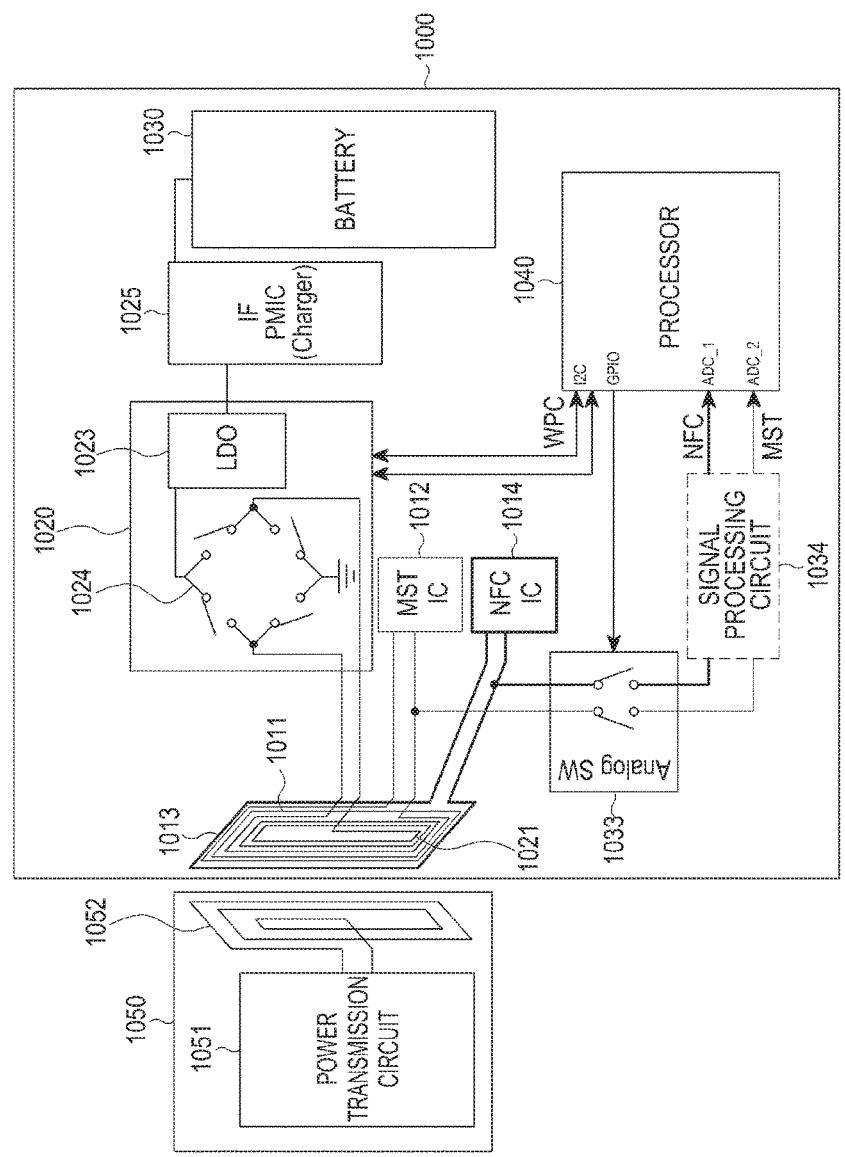

FIGS. 10A and 10B illustrate a wireless power receiver and a wireless power transmitter according to an embodiment of the present disclosure.

Referring to FIG. 10A, the wireless power transmitter 1050 includes a power transmission circuit 1051 and a power transmission coil 1052. The power transmission circuit 1051 may include hardware according to the standard based on the resonance scheme or the induction scheme. For example, the power transmission circuit 1051 may include a power providing circuit, an inverter, an amplifier, and an impedance matching circuit. When the wireless power transmitter 1050 is manufactured based on the induction scheme, the power transmission coil 1052 may peripherally induce the magnetic field by using the current applied to a primary coil. When the wireless power transmitter 1050 is manufactured based on the resonance scheme, the power transmission coil 1052 may configure a resonant circuit with another device and the resonant circuit may radiate the electromagnetic field.

The wireless power receiver 1000 includes an MST coil 1011, an MST IC 1012, an NFC coil 1013, an NFC IC 1014, a power reception circuit 1020, a power reception coil 1021, a PMIC 1025, a battery 1030, a switch 1031, a signal processing circuit 1032, and a processor 1040.

The power reception coil 1021 may perform wireless charging by generating an induced current by using the magnetic field radiated from the power transmission coil 1052. Alternatively, the power reception coil 1021 may configure a resonant circuit with another device and may absorb the electromagnetic field from the resonant circuit included in the power transmission coil 1052 to perform wireless charging.

When the magnetic field is radiated from the power transmission coil 1052, the NFC coil 1013 and the MST coil 1011 may also generate the induced current by the magnetic field. As described above, at least one of the power reception coil 1021, the NFC coil 1013, or the MST coil 1011 may have the asymmetrical form based on the penetrating axis. Accordingly, voltages applied to a first part and a second part of each of the power reception coil 1021, the NFC coil 1013, or the MST coil 1011, for example, a left conducting wire and a right conducting wire are different, so that a potential difference, which is not 0, may be formed between the first part and the second part. Accordingly, the signal from one of the power reception coil 1021, the NFC coil 1013, and the MST coil 1011 may have the voltage of the potential difference between the first part and the second part.

The processor 1040 may determine whether the wireless power receiver is aligned to the wireless power transmitter by using the signal from at least one of the power reception coil 1021, the NFC coil 1013, and the MST coil 1011. As described above, for example, the voltage of the signal output from the MST coil 1011, when the MST coil 1011 is arranged at a first position based on the wireless power transmitter 1050, may be different from the voltage of the signal output from the MST coil 1011, when the MST coil 1011 is arranged at a second position based on the wireless power transmitter 1050. Accordingly, the processor 1040 may determine a position of the wireless power receiver 1000 with respect to the wireless power transmitter 1050 based on the voltage of the signal from at least one of the power reception coil 1021, the NFC coil 1013, and the MST coil 1011, and determine an alignment state according to the determined position.

For example, the processor 1040 may determine an alignment state of the wireless power receiver 1000 or the power reception coil 1021 by using a pre-stored table about the voltage of the output signal according to each coil and the alignment state. The processor 1040 may determine the alignment state of the wireless power receiver 1000 or the power reception coil 1021 based on the current of the signal from at least one of the power reception coil 1021, the NFC coil 1013, and the MST coil 1011.

The switch 1031 and the signal processing circuit 1032 may be interposed between the coils 1011, 1013, and 1021, and the processor 1040. The switch 1031 may connect at least one of the coils 1011, 1013, and 1021 to the processor 1040 while the alignment state of the wireless power receiver is determined. Further, when the determination on the alignment state ends, the switch 1031 may be open to make the coils 1011, 1013, and 1021 not directly connected to the processor 1040. An open/closed state of the switch 1031 may be controlled by the processor 1040.

When the NFC coil 1013 is driven for NFC communication, the switch 1031 may open a path of the processor 1040 from the NFC coil 1013. Accordingly, the processor 1040 may be prevented from being damaged.

The signal processing circuit 1032 may process signals output from the coils 1011, 1013, and 1021 to have a form that can be processed by the processor 1040 and may transfer the signals to the processor 1040.

In FIG. 10A, the signal processing circuit 1032 includes three input terminals and three output terminals. Accordingly, the processor 1040 may determine the alignment state of the wireless power receiver 1000 or the power reception coil 1021 based on the current of the signal from at least one of the power reception coil 1021, the NFC coil 1013, and the MST coil 1011.

The signal processing circuit 1032 may further include an amplitude detector. The amplitude detector may remove a noise component and measure amplitude of the signal. The measured amplitude value may be input into an Analog to Digital Conversion (ADC) port of the processor 1040, and the processor 1040 may perform an ADC on the input value and then measure a voltage or current. The ADC may be performed in the signal processing circuit 1032. A method of digitizing an analog value may include an I2C scheme in which the signal processing circuit 1032 processes a value and transfers the processed value to the processor 1040 and an ADC scheme in which the processor 1040 processes the value.

The power reception circuit 1020 includes a rectifier 1024 and a Low Drop Out (LDO) regulator 1023. The PMIC 1025 may transfer power to the battery 1030 and manage the power transferred to the battery 1030.

FIG. 10B illustrates a wireless power receiver and a wireless power transmitter according to an embodiment of the present disclosure. Most of the elements in FIG. 10B are the same elements described above regarding FIG. 10A. Accordingly, a repetitive description of these elements will be omitted below.

Referring to FIG. 10, in contrast with FIG. 10A, the processor 1040 may determine the alignment state of the wireless power receiver 1000 or the power reception coil 1021 based on the current of the signal from at least one of the NFC coil 1013 and the MST coil 1011. Specifically, a switch 1033 may connect at least one of the coils 1013 and 1021 to the processor 1040, while the alignment state of the wireless power receiver is determined. Further, when the determination on the alignment state ends, the switch 1033 may be open to disconnect the coils 1013 and 1021 from the processor 1040. In FIG. 10B, a signal processing circuit 1034 includes two input terminals and two output terminals.

Figure 10C:
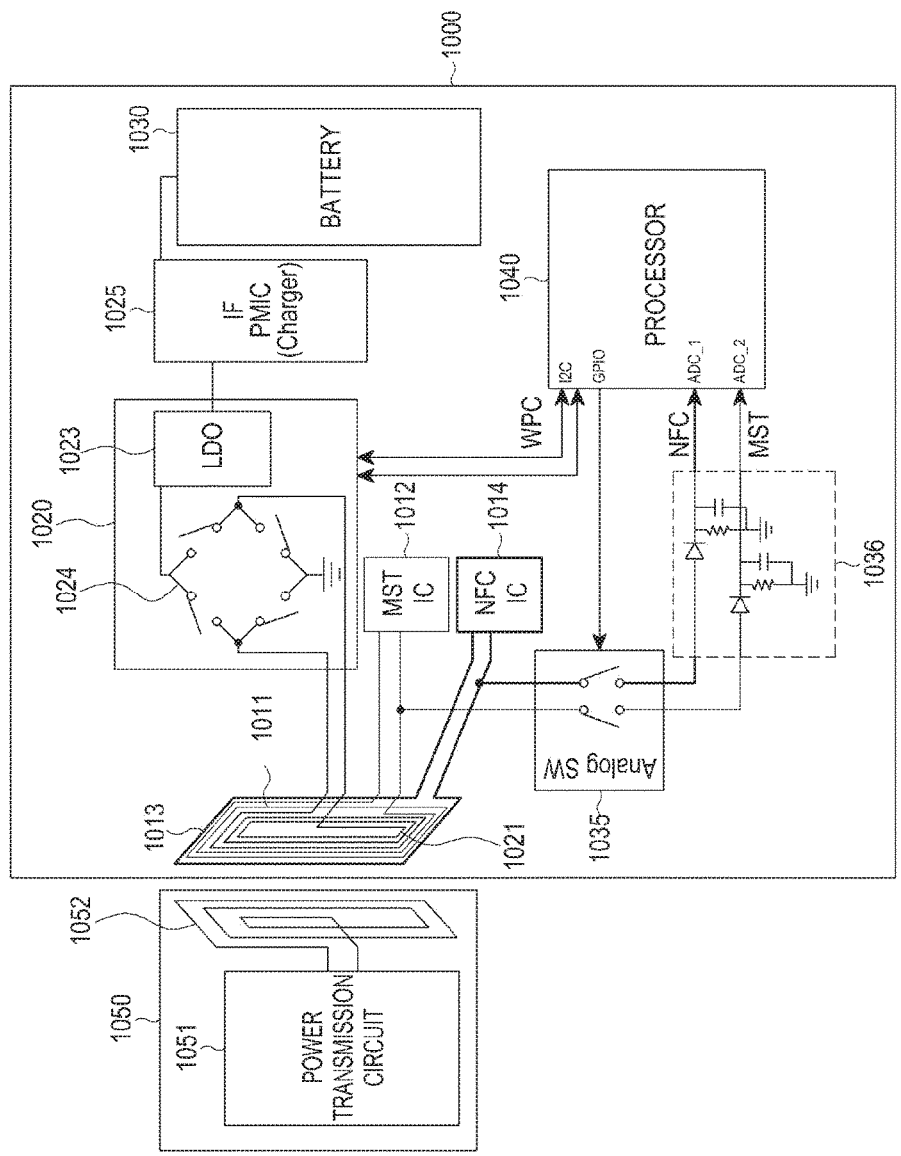

FIG. 10C illustrates a wireless power receiver and a wireless power transmitter according to an embodiment of the present disclosure. Most of the elements in FIG. 10C are the same elements described above regarding FIG. 10A. Accordingly, a repetitive description of these elements will be omitted below.

Referring to FIG. 10C, when a switch 1035 is in an on state, a signal processing circuit 1036 may process the signal from at least one of the NFC coil 1013 and the MST coil 1011 and output the processed signal to the processor 1040. More specifically, the signal processing circuit 1036 may include a rectifier that rectifies at least one of the NFC coil 1013 and the MST coil 1011 from an AC waveform to a DC waveform. The signal processing circuit 1036 may perform ADC.

FIGS. 11A to 11F illustrate a wireless power receiver moving in left and right directions according to an embodiment of the present disclosure.

Figure 11A:
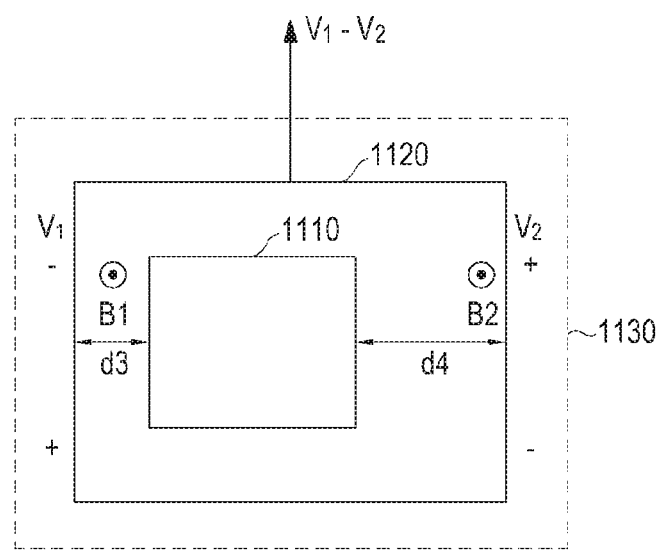
FIGS. 11A to 11F illustrate a wireless power receiver moving in left and right directions according to an embodiment of the present disclosure.
Figure 11B:
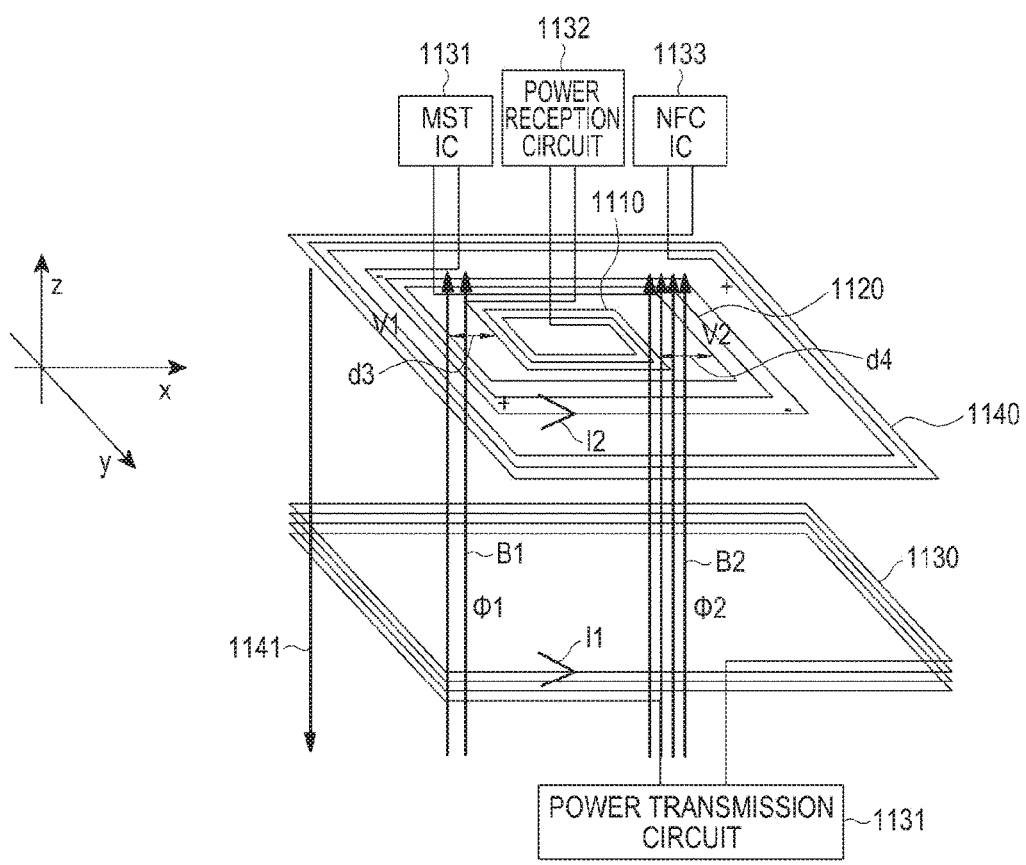

Referring to FIGS. 11A and 11B, a power reception coil 1110 and an MST coil 1120 are arranged on the upper side of a power transmission coil 1130. In FIGS. 11A and 11B, the power reception coil 1110 may be biased relatively to the left, inside of the MST coil 1120. More specifically, a distance d3 between a left conducting wire of the power reception coil 1110 and a left conducting wire of the MST coil 1120 is different from a distance d4 between a right conducting wire of the power reception coil 1110 and a right conducting wire of the MST coil 1120, e.g., d4 is larger than d3.

As described above, because the shortest distances d3 and d4 between the left conducting wire and the right conducting wire of the MST coil 1120 and the power reception coil 1110 are different from each other, a voltage V1 applied to the left conducting wire of the MST coil 1120 may be different from a voltage V2 applied to the right conducting wire of the MST coil 1120. The power reception coil 1110 is connected to a power reception circuit 1132. The MST coil 1120 is connected to a MST IC 1131. The NFC coil 1140 is connected to a NFC IC 1133. The power transmission coil 1130 is connected to a power transmission circuit 1131.

As illustrated in FIG. 11B, magnetic flux $\phi1$ corresponding to the left conducting wire of the MST coil 1120 may be different from magnetic flux $\phi2$ corresponding to the right conducting wire of the MST coil 1120. Further, when the entire MST coil 1120 moves in a left direction, a change $\phi1'$ in the magnetic flux $\phi1$ corresponding to the left conducting wire of the MST coil 1120 may be different from a change $\phi2'$ in the magnetic flux $\phi2$ corresponding to the right conducting wire of the MST coil 1120. Because the changes in the magnetic fluxes corresponding to the respective conducting wires are different from each other, voltages V1 and V2 applied to the left conducting wire and the right conducting wire may be different from each other. More specifically, based on Lenz's law, in which an induced voltage is proportional to a change in magnetic flux, the voltages V1 and V2 applied to the left conducting wire and the right conducting wire may be different.

The magnetic field from the power reception coil 1110 may also influence the difference between the voltages applied to the left conducting wire and the right conducting wire of the MST coil 1120. For example, a voltage "a" may be applied to the left conducting wire of the MST coil 1120 and a voltage "b" may be applied to the right conducting wire of the MST coil 1120. A signal by a potential difference (a-b) may be applied to the upper conducting wire of the MST coil 1120. In this case, the size of the current of the signal may be generated by dividing the potential difference by resistance of the upper conducting wire, i.e., the voltage value may correspond to the potential difference. Accordingly, the wireless power receiver may determine a coordinate of the wireless power receiver and an alignment state by using the current or voltage of the signal from the MST coil 1120.

More specifically, due to the magnetic field radiated from the power transmission coil 1130, the induced current may be formed in the power reception coil 1110 and an induced magnetic field in a direction opposite to the magnetic field from the power transmission coil 1130 inside the power reception coil 1110. That is, the power reception coil 1110 may also radiate the magnetic field during wireless charging. Accordingly, an intensity of the magnetic field reaching the left conducting wire of the MST coil 1120 located relatively close to the power reception coil 1110 may be stronger than an intensity of the magnetic field reaching the right conducting wire of the MST coil 1120, which is located relatively farther from the power reception coil 1110. As a result, the magnetic field from the wireless power transmitter and the magnetic field from the power reception coil 1110 may influence the left wire, and the magnetic field from the wireless power transmitter and the magnetic field from the power reception coil 1110 may influence the right wire of the MST coil 1120.

As described above, because the intensity of the magnetic field reaching to the left side of the MST coil 1120 from the power reception coil 1110 is different from the intensity of the magnetic field reaching to the right side of the MST coil 1120 from the power reception coil 1110, an intensity of the magnetic field B1 in the left conducting wire of the MST coil 1120 may be different from an intensity of the magnetic field B2 in the right conducting wire of the MST coil 1120. Because the intensity of the magnetic field B1 in the left conducting wire of the MST coil 1120 is different from the intensity of the magnetic field B2 in the right conducting wire of the MST coil 1120, the voltage V1 applied to the left conducting wire of the MST coil 1120 may be different to the voltage V2 applied to the right conducting wire of the MST coil 1120.

Accordingly, the voltage of the signal output from the MST coil 1120 may correspond to a potential difference (V1−V2) between the left conducting wire of the MST coil 1120 and the right conducting wire of the MST coil 1120. The wireless power receiver may pre-store information on a relation between the voltage of the signal from the MST coil 1120 and the coordinate of the wireless power receiver with respect to the wireless power transmitter. The wireless power receiver may determine the alignment state by determining the position of the wireless power receiver based on the voltage of the signal from the MST coil 1120 being V1−V2.

Figure 11C:
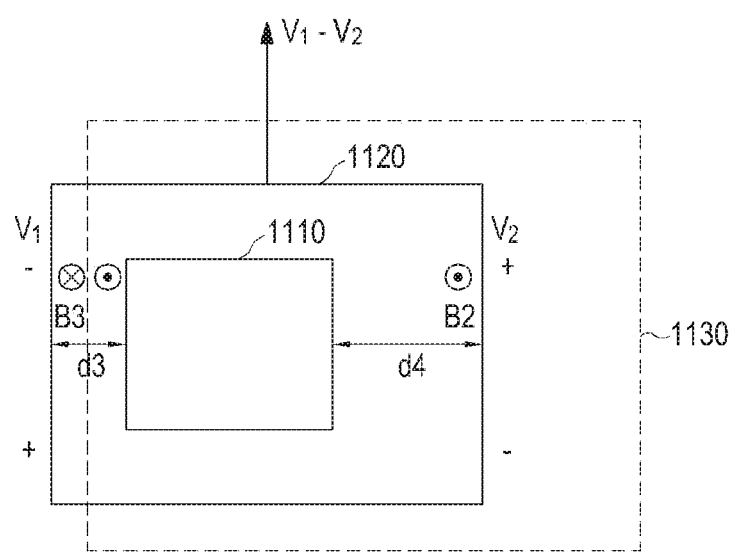
Figure 11D:
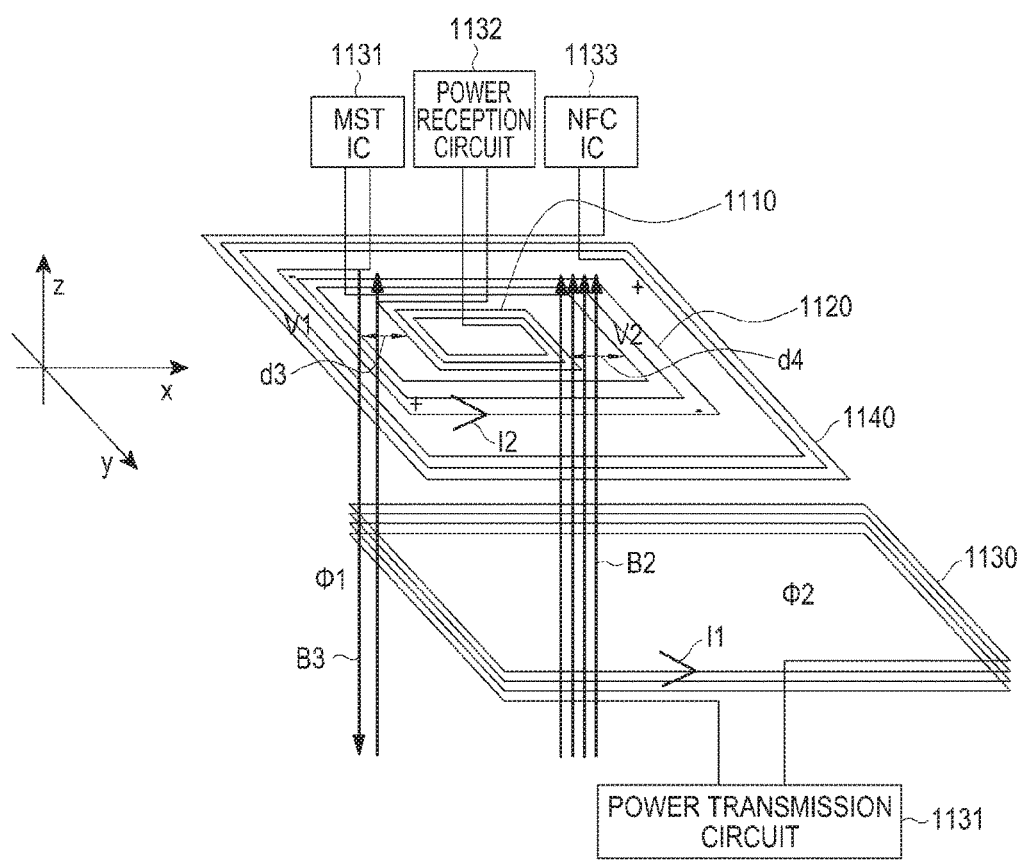

Referring to FIGS. 11C and 11D, the MST coil 1120 and the power reception coil 1110 may move relatively in a left direction compared to FIGS. 11A and 11B. A magnetic field in a direction from the ground may be formed inside the power transmission coil 1130 and a magnetic field in a direction to the ground may be formed outside the power transmission coil 1130, and thus, the size of a magnetic field B3 formed near the left conducting wire of the MST coil 1120 may be different from the size of the magnetic field B1 formed near the left conducting wire of the MST coil 1120 of FIGS. 11A and 11B. Accordingly, the voltage V1 applied near the left conducting wire of the MST coil 1120 at a position in FIG. 11C may be different from the voltage V1 applied near the left conducting wire of the MST coil 1120 at a position in FIG. 11A.

In FIG. 11C, the size of the magnetic field from the power transmission coil 1130 reaching near the left conducting wire of the MST coil 1120 may be smaller than the size of the magnetic field of FIG. 11A. The voltage V1−V2 of the signal output from the MST coil 1120 may be also different at the positions in FIG. 11C and FIG. 11A. For example, the voltage or current of the signal output from the MST coil 1120 may be different according to each position of the wireless power receiver with respect to the wireless power transmitter.

As described above, the voltage or current of the signal output from at least one coil of the wireless power receiver may be different according to the position of the wireless power receiver, and the wireless power receiver according to various embodiments of the present disclosure may determine the position of the wireless power receiver by using the voltage or current of the signal output from the included coil.

Figure 11E:
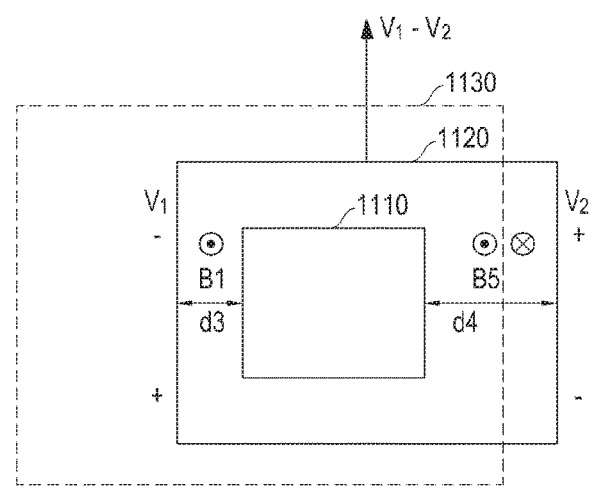
Figure 11F:
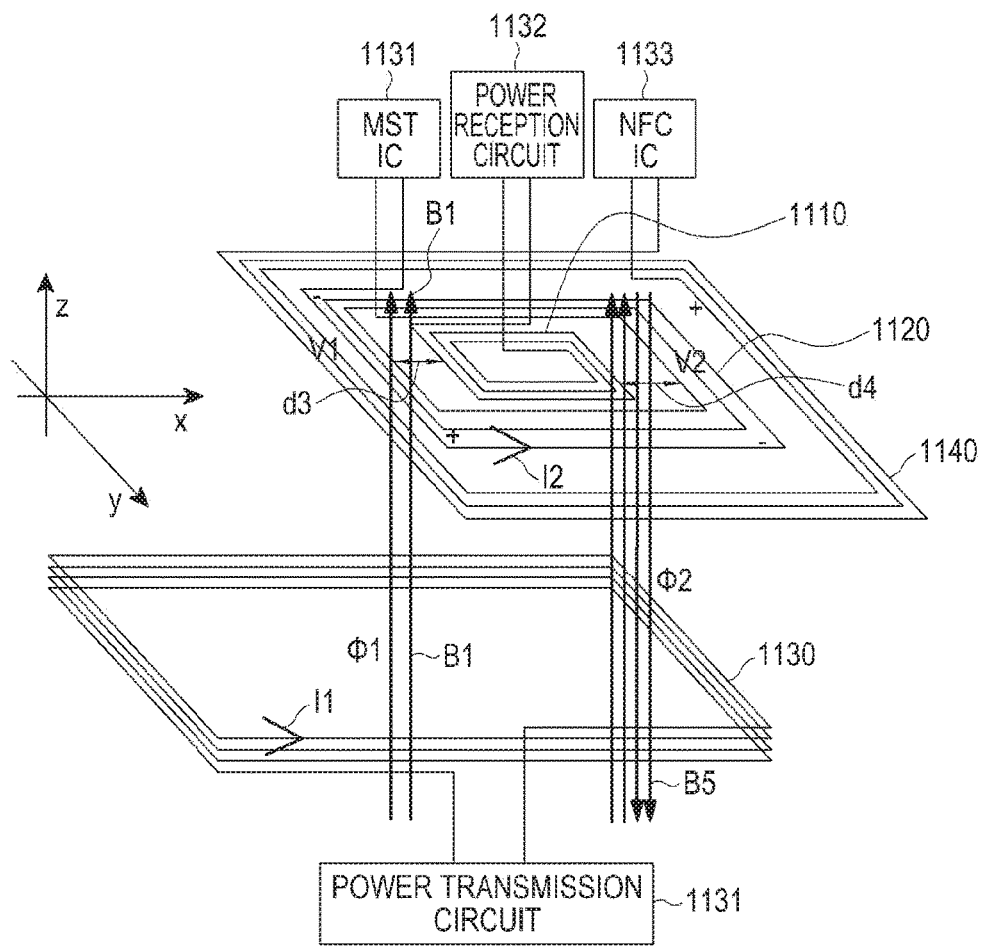

Referring to FIGS. 11E and 11F, the wireless power receiver moves relatively in a right direction compared to FIGS. 11A and 11B. As illustrated in FIGS. 11E and 11F, the size of a magnetic field B5 applied near the right conducting wire of the MST coil 1120 may be smaller than the size of the magnetic field B2 applied in FIGS. 11A and 11B. Accordingly, the size of the voltage V2 applied to the right conducting wire of the MST coil 1120 may be smaller than the size of the voltage V2 applied to the right conducting wire of the MST coil 1120 of FIGS. 11A and 11B. The potential difference V1−V2 in FIGS. 11E and 11F may be larger than the potential difference V1−V2 in FIGS. 11A and 11B. That is, the size of the voltage of the output signal from the MST coil 1120 may be different from the size of the voltage when the wireless power receiver is arranged at the center.

Based on FIGS. 11A to 11F, when the wireless power receiver is arranged at the center, relatively on the left side, and relatively on the right side of the wireless power transmitter, the voltage or current of the signal output from at least one coil of the wireless power receiver may be different.

As described above, the wireless power receiver may store a table in which a relative position of the wireless power receiver with respect to the wireless power transmitter is made to correspond to a voltage or current from at least one coil. The wireless power receiver may measure a signal from at least one coil and then determine a position of the wireless power receiver or an alignment state by using a result of the measurement and the table. Further, the wireless power receiver may output a user interface showing the alignment state.

FIGS. 12A to 12F illustrate a wireless power receiver moving in upward and downward directions according to an embodiment of the present disclosure.

While the wireless power receiver determines the position of the wireless power receiver or the alignment state of the wireless power receiver by receiving the signal from the MST coil 1120 in FIGS. 11A to 11F, the wireless power receiver in FIGS. 12A to 12F may determine the position of the wireless power receiver or the alignment state of the wireless power receiver by using a signal from an NFC coil 1210. In FIGS. 11A to 11F, the wireless power receiver may determine a position of left and right sides of the wireless power receiver on the wireless power transmitter or an alignment state of the left and right sides of the wireless power receiver by receiving a signal from the MST coil 1120. In FIGS. 12A to 12F, the wireless power receiver may determine a position of upper and lower sides of the wireless power receiver on the wireless power transmitter or an alignment state of the upper and lower sides of the wireless power receiver by receiving a signal from the NFC coil 1210. The power reception coil 1221 is connected to a power reception circuit 1242. The MST coil 1220 is connected to a MST IC 1241. The NFC coil 1210 is connected to a NFC IC 1243. The power transmission coil 1230 is connected to a power transmission circuit 1231.

Figure 12A:
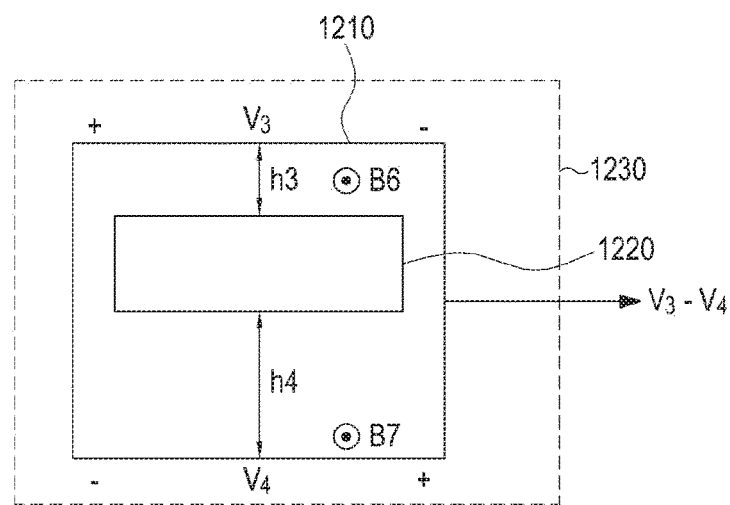
FIGS. 12A to 12F illustrate a wireless power receiver moving in upward and downward directions according to an embodiment of the present disclosure.
Figure 12B:
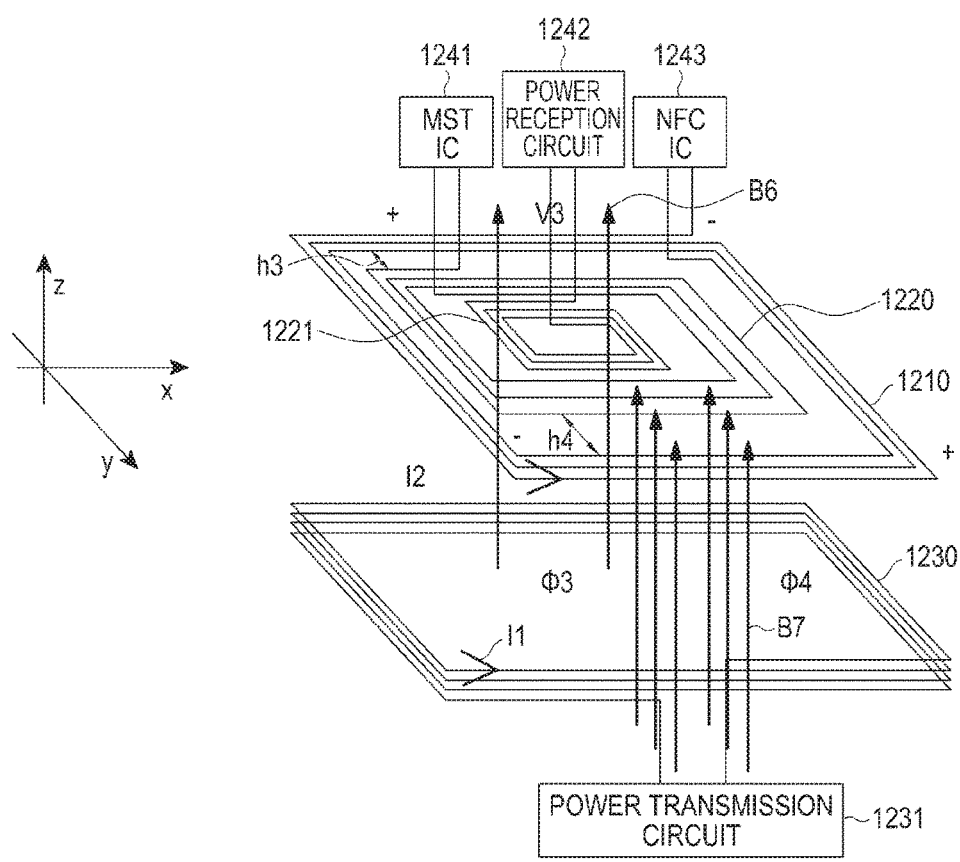

Specifically, FIGS. 12A and 12B illustrate the wireless power receiver being arranged at the center of the wireless power transmitter.

Referring to FIGS. 12A and 12B, the NFC coil 1210 is arranged relatively at the center of a power transmission coil 1230. An MST coil 1220 is arranged inside the NFC coil 1210, and the MST coil 1220 is relatively upwardly biased inside the NFC coil 1210. A distance h3 between an upper conducting wire of the MST coil 1220 and an upper conducting wire of the NFC coil 1210 may be shorter than a distance h4 between a lower conducting wire of the MST coil 1220 and a lower conducting wire of the NFC coil 1210.

As described above, magnetic flux φ3 corresponding to the upper conducting wire of the MST coil 1220 and the upper conducting wire of the NFC coil 1210 may be different from magnetic flux φ4 applied to the space corresponding to the lower conducting wire of the MST coil 1220 and the lower conducting wire of the NFC coil 1210, and change amounts of the magnetic fluxes may be different from each other. Accordingly, a voltage V3 applied to the upper conducting wire of the NFC coil 1210 and a voltage V4 applied to the lower conducting wire of the NFC coil 1210 may be different.

The size of a magnetic field B6 applied near the upper conducting wire of the NFC coil 1210 may be different from the size of a magnetic field B7 applied near the lower conducting wire of the NFC coil 1210. As described above, due to the magnetic field from the power transmission coil 1230, the magnetic field may be induced in the MST coil 1220. The upper conducting wire of the NFC coil 1210 located relatively close to the MST coil 1220 may receive further influence of the magnetic field from the MST coil 1220. Accordingly, the size of a magnetic field B6 applied near the upper conducting wire of the NFC coil 1210 may be different from the size of a magnetic field B7 applied near the lower conducting wire of the NFC coil 1210.

According to the difference between the sizes of the magnetic fields, the voltage V3 applied to the upper conducting wire of the NFC coil 1210 and the voltage V4 applied to the lower conducting wire of the NFC coil 1210 may be different. Accordingly, the voltage of the signal output from the NFC coil 1210 may correspond to V3–V4 and may have a current corresponding thereto. The wireless power receiver may determine the position of the wireless power receiver or the alignment state at least partially based on the voltage or current of the signal from the NFC coil 1210.

When the size of power received from the wireless power receiver is reduced, the wireless power receiver may report the reduction in the size of the power through in-band communication or out-band communication. The wireless power transmitter may increase the current applied to the power transmission coil 1230 according to the report. In this case, because the size of the magnetic field applied to the coil of the wireless power receiver is changed, the signal output from at least one coil of the wireless power receiver may be also changed. The operations of the wireless power transmitter and the wireless power receiver may be performed based on the standard of wireless charging, and the wireless power receiver may map a result of correction of the voltage or current of the signal from at least one coil through the magnetic field change based on the standard of the wireless charging, and the position or alignment state of the wireless power receiver and store the mapped information. The wireless power receiver may determine the position or alignment state of the wireless power receiver from the measured signal from the coil by using a table about the result of the correction and the position or alignment state of the wireless power receiver.

Figure 12C:
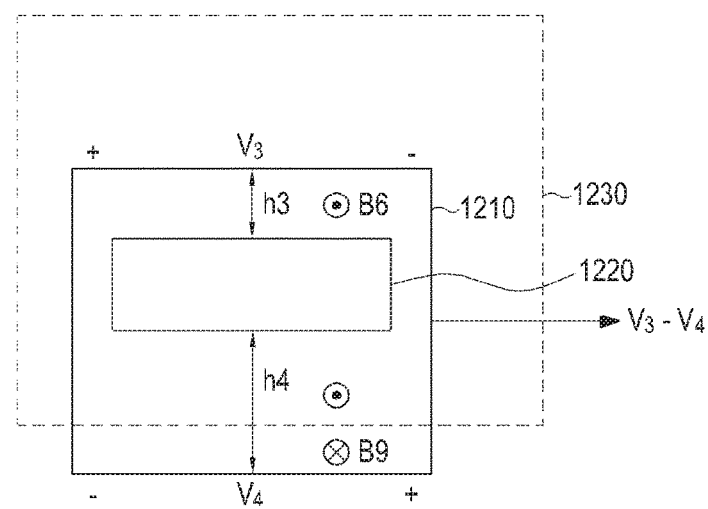
Figure 12D:
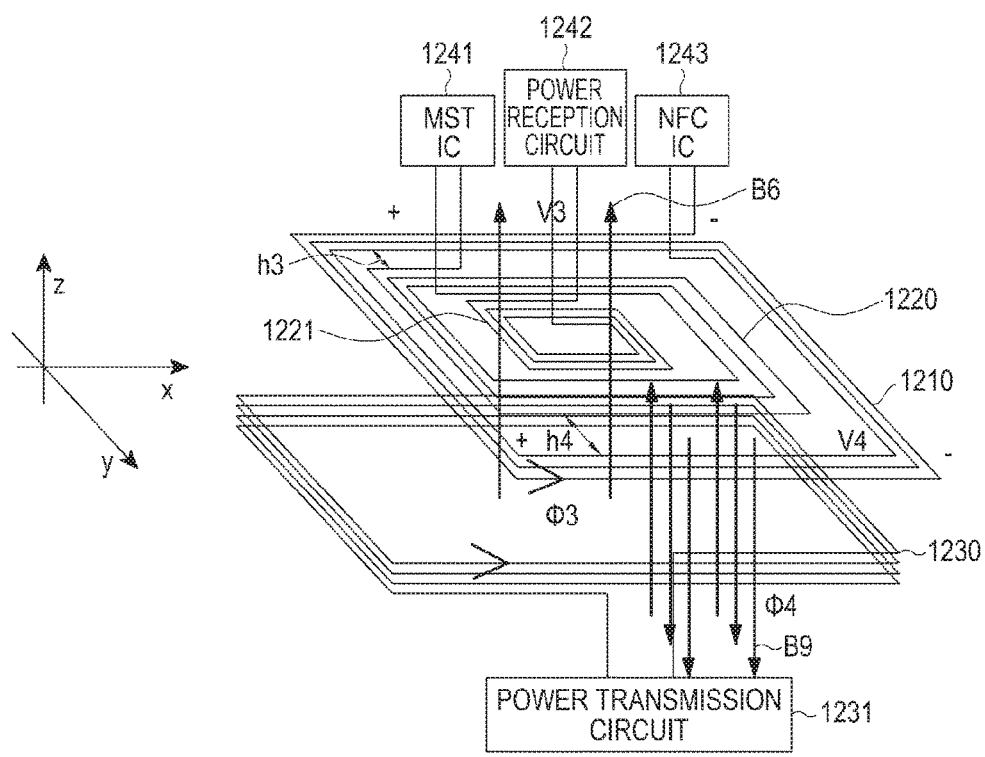

FIGS. 12C and 12D illustrate the wireless power receiver being arranged relatively on the lower side of the wireless power transmitter.

Referring to FIGS. 12C and 12D, the NFC coil 1210 is arranged relatively below the power transmission coil 1230, and a part of the NFC coil 1210 is arranged on the upper side outside the power transmission coil 1230. A magnetic field in a direction from the ground may be formed inside the power transmission coil 1230, and a magnetic field in a direction to the ground may be formed outside the power transmission coil 1230. Accordingly, the size of a magnetic field B9 applied near the lower conducting wire of the NFC coil 1210 may be lower than the size of a magnetic field B7 applied near the lower conducting wire of the NFC coil 1210 in FIGS. 12A and 12B.

A voltage V4 applied near the lower conducting wire of the NFC coil 1210 may be lower than a voltage V4 applied near the lower conducting wire of the NFC coil 1210 of FIGS. 12A and 12B, and accordingly, a potential difference V3–V4 may increase. That is, the voltage or current of the signal output from the NFC coil 1210 may be greater than that in FIGS. 12A and 12B. Accordingly, the wireless power receiver may determine the position or the alignment state of the wireless power receiver at least partially based on the voltage or current of the signal output from the NFC coil 1210.

Figure 12E:
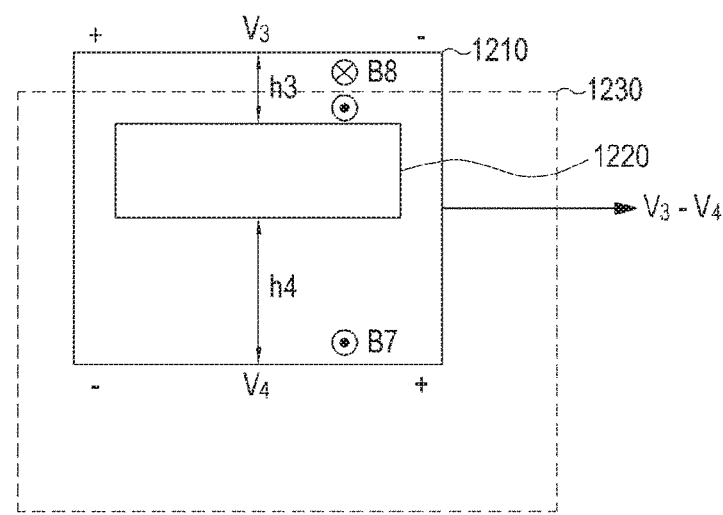
Figure 12F:
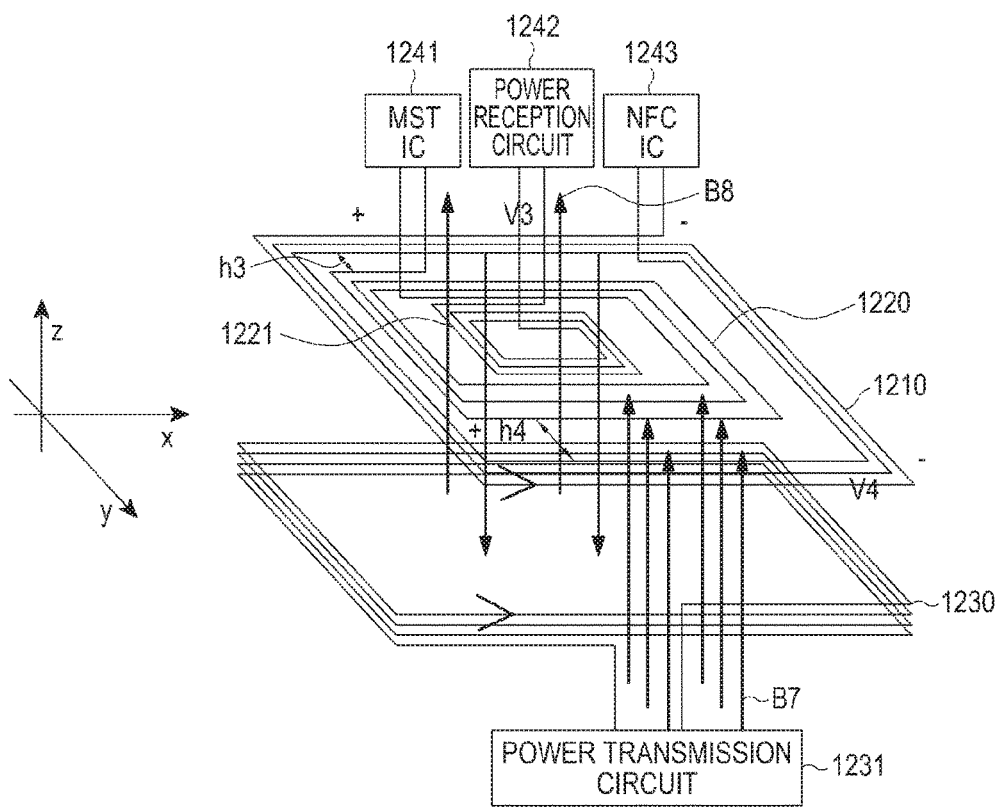

FIGS. 12E and 12F illustrate the wireless power receiver being arranged relatively on the lower side of the wireless power transmitter, i.e., where the NFC coil 1210 is arranged relatively on the upper side of the power transmission coil 1230.

Referring to FIG. 12E, the upper conducting wire of the NFC coil 1210 is arranged on the upper side outside the power transmission coil 1230. Accordingly, both a magnetic field in a direction to the ground, which is formed outside the power transmission coil 1230, and a magnetic field in a direction from the ground, which is formed inside the power transmission coil 1230, influence the upper conducting wire of the NFC coil 1210. Accordingly, the size of a magnetic field B8 applied near the upper conducting wire of the NFC coil 1210 may be smaller than the size of the magnetic field B6 in FIG. 12A.

Further, the voltage V3 applied to the upper conducting wire of the NFC coil 1210 may be less than that in FIG. 12A and the potential difference V3–V4 may be also lower. Therefore, the voltage or current of the signal from the NFC coil 1210 may be changed compared to FIG. 12A.

The wireless power receiver may determine the position or the alignment state of the wireless power receiver at least partially based on the voltage or current of the signal output from the NFC coil 1210.

Based on FIGS. 12A to 12F, when the wireless power receiver is arranged at the center, relatively on the upper side, and relatively on the lower side of the wireless power transmitter, the voltage or current of the signal output from at least one coil of the wireless power receiver may be different.

As described above, the wireless power receiver may store a table in which a relative position of the wireless power receiver with respect to the wireless power transmitter is made to correspond to a voltage or current from at least one coil. Accordingly, the wireless power receiver may measure a signal from at least one coil and then determine a position of the wireless power receiver or an alignment state by using a result of the measurement and the table. Further, the wireless power receiver may output a user interface showing the alignment state.

A result of correction of the voltage or current of the signal from at least one coil through a change in the magnetic field, based on the standard of wireless charging, may be mapped with the position or the alignment state of the wireless power receiver and the mapped information may be stored. The wireless power receiver may determine the position or alignment state of the wireless power receiver from the measured signal from the coil by using a table about the result of the correction and the position or alignment state of the wireless power receiver.

FIGS. 13A to 13D illustrate an asymmetrical coil form according to an embodiment of the preset disclosure.

Figure 13A:
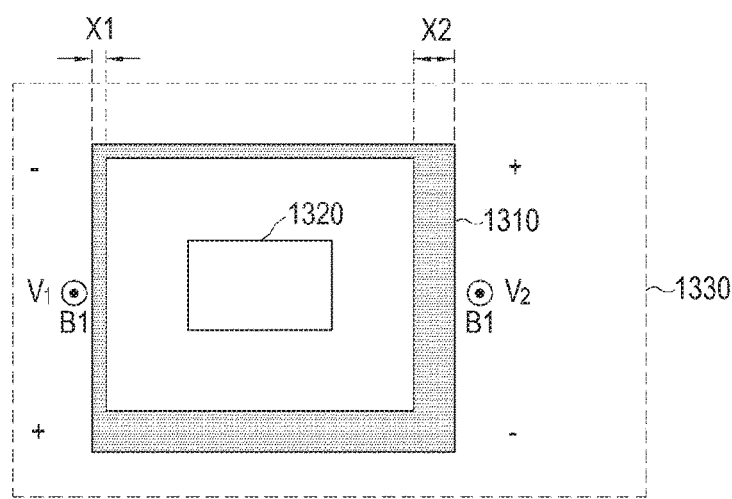
FIGS. 13A to 13D illustrate an asymmetrical coil form according to embodiments of the preset disclosure.
Figure 13B:
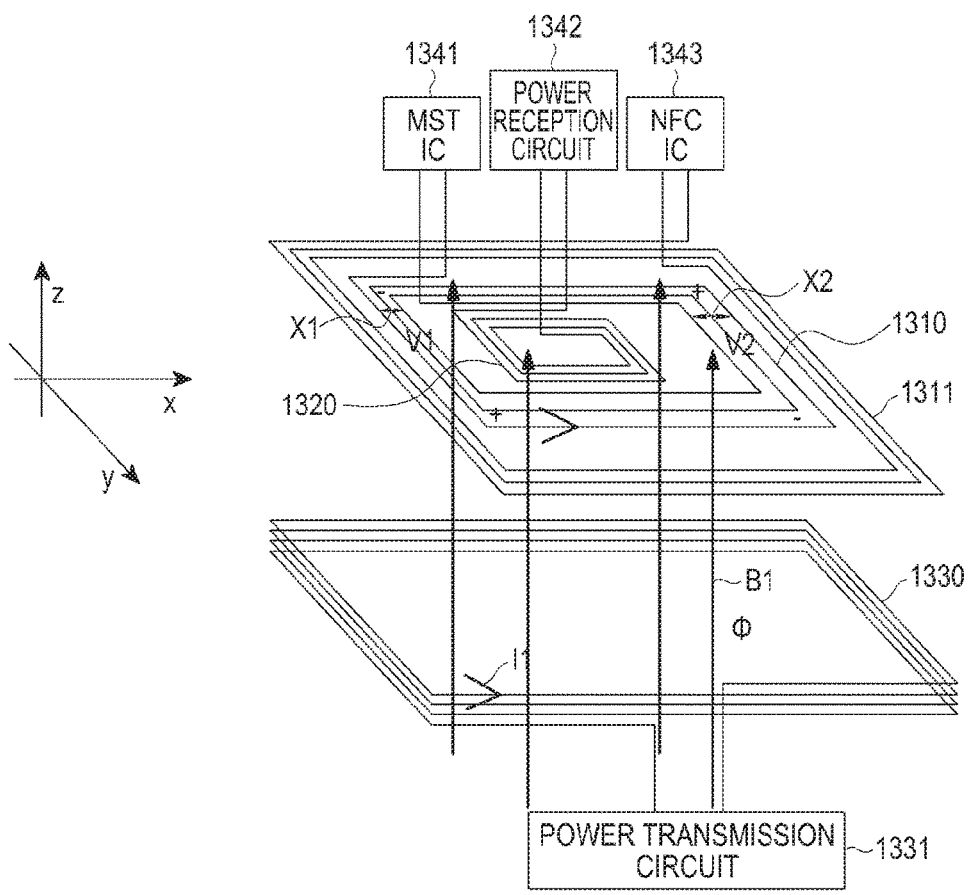

Referring to FIGS. 13A and 13B, a width X2 between right and left conducting wires of an MST coil 1310 is wider than a width X1 between left and upper conducting wires of the MST coil 1310. That is, an asymmetrical pattern may be formed with respect to an axis of symmetry, which penetrates the center, an upper right apex, and a lower left apex of the MST coil 1310. The width of the conducting wire of the MST coil 1310 may be associated with resistance. The resistance R of the conducting wire may be determined as shown in Equation (1).

$$R = \rho \frac{l}{wh} \quad (1)$$

In Equation (1), $\rho$ denotes resistivity, l denotes a length of the conducting wire, w denotes a width of the conducting wire, and h denotes a thickness of the conducting wire. That is, as the width of the conducting wire increases, the resistance of the conducting wire reduces. Accordingly, resistance of right and lower conducting wires of the MST coil 1310 may be smaller than resistance of left and upper conducting wires of the MST coil 1310.

Inductance L of the coil may be determined as shown in Equation (2).

$$L \propto \frac{r^2 N^2}{8r + 11d} \quad (2)$$

In Equation (2), r denotes an average radius of the coil, N denotes the number of windings, and d denotes a depth of the coil, which may be a difference between an outermost radius and an innermost radius. Accordingly, the width of the coil may be associated with d, and the inductance may vary depending on the width of the coil. The power reception coil 1320 is connected to a power reception circuit 1342. The MST coil 1310 is connected to a MST IC 1341. The NFC coil 1311 is connected to a NFC IC 1343. The power transmission coil 1330 is connected to a power transmission circuit 1331.

In addition to the width of the wire and the inductance, various electrical characteristics may be different in each part. Accordingly, a potential difference, which is not 0, may also be generated.

A power reception coil 1320 is arranged relatively on the upper side at the center of the power transmission coil 1330. Due to a resistance difference, the voltage V2 applied to the right conducting wire of the MST coil 1310 and the voltage V1 applied to the left conducting wire of the MST coil 1310 may be different from each other. Accordingly, a potential difference (V1−V2), which is not 0, may be formed between the left conducting wire and the right conducting wire.

A signal output from the MST coil 1310 may have a voltage corresponding to the potential difference of V−V2 and a current corresponding to the voltage.

The wireless power receiver may determine a position and an alignment state of the wireless power receiver at least partially based on the voltage or the current of the signal output from the MST coil 1310 and output a user interface that reflects the position and the alignment state.

Figure 13C:
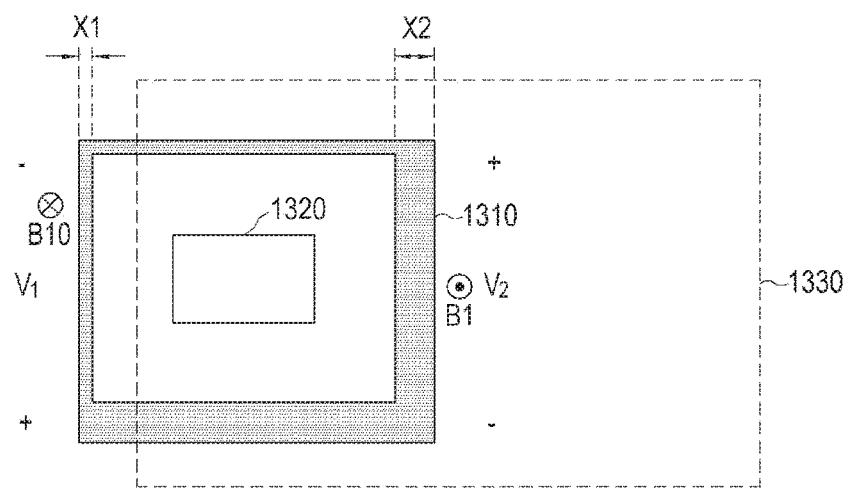
Figure 13D:
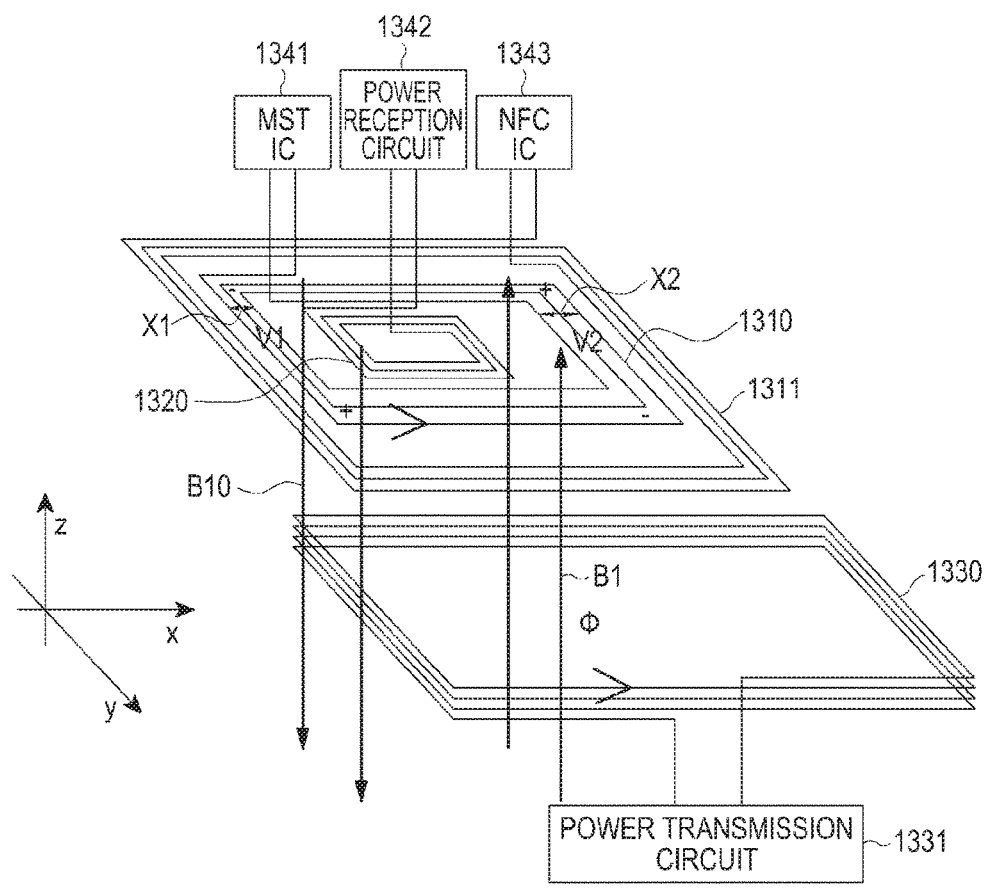

FIGS. 13C and 13D illustrate the MST coil 1310 moving leftward.

Referring to FIGS. 13C and 13D, the left conducting wire of the MST coil 1310 is arranged on the upper side outside the power transmission coil 1330. Accordingly, the size of a magnetic field B10 applied near the left conducting wire of the NFC coil 1310 may be different from the size of the magnetic field B1 in FIGS. 13A and 13B. Due to the difference between the applied magnetic field B10 and the magnetic field B1 at the center, the size of the voltage V1 applied to the left conducting wire of the MST coil 1310 may be also different from the size of the voltage V1 at the center. Accordingly, the voltage of the signal output from the MST coil 1310 may be also different from the voltage of the signal output when the MST coil 1310 is arranged at the center.

The wireless power receiver may determine that the wireless power receiver is arranged relatively on the left side (or that the alignment state is bad) at least partially based on the voltage of the signal output from the MST coil 1310 or the corresponding current.

Based on FIGS. 13A to 13D, when the wireless power receiver is arranged at the center and relatively on the left side of the wireless power transmitter, the voltage or current of the signal output from at least one coil of the wireless power receiver may be different.

As described above, the wireless power receiver may store a table in which a relative position of the wireless power receiver with respect to the wireless power transmitter is made to correspond to a voltage or current from at least one coil. Accordingly, the wireless power receiver may measure a signal from at least one coil and then determine a position of the wireless power receiver or an alignment status by using a result of the measurement and the table. Further, the wireless power receiver may output a user interface showing the alignment state.

A result of correction of the voltage or current of the signal from at least one coil through a change in the magnetic field based on the standard of wireless charging may be mapped with the position or the alignment state of the wireless power receiver and the mapped information may be stored. The wireless power receiver may determine the position or alignment state of the wireless power receiver from the measured signal from the coil by using a table about the result of the correction and the position or alignment state of the wireless power receiver.

As described above, an asymmetrical coil pattern form may cause the potential difference between one part of the coil and another part of the coil. Further, because the potential difference may be changed according to the movement of the wireless power receiver, the wireless power receiver may determine and output the position or the alignment state of the wireless power receiver at least partially based on the voltage or the current of the signal from at least one coil.

Figure 14:
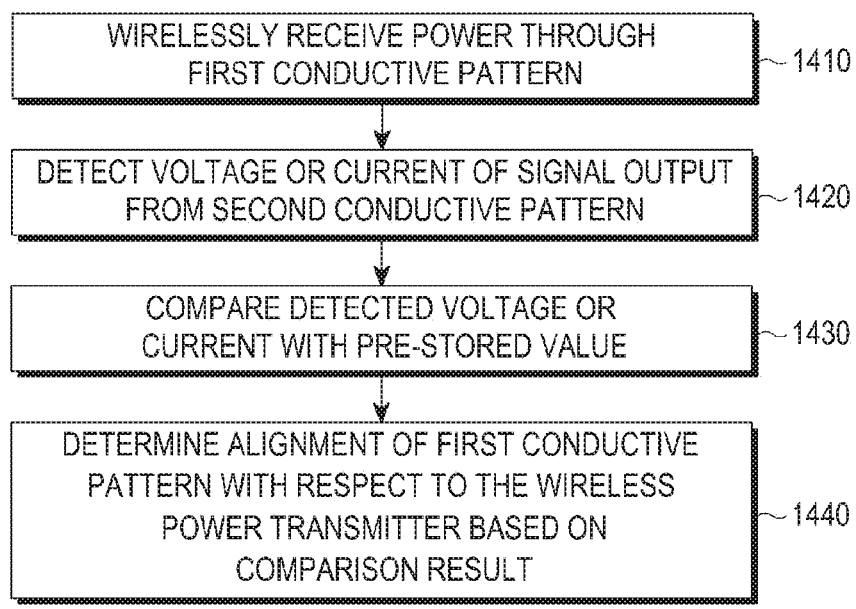
FIG. 14 is a flowchart illustrating a control method of a wireless power receiver according to an embodiment of the present disclosure.

FIG. 14 is a flowchart illustrating a control method of a wireless power receiver according to an embodiment of the present disclosure.

Referring to FIG. 14, in step 1410, the wireless power receiver wirelessly receives power through a first conductive pattern.

In step 1420, the wireless power receiver detects a voltage or a current of a signal output from a second conductive pattern. For example, the second conductive pattern may have an asymmetrical form or a relative position from another conductive pattern may be biased.

In step 1430, the wireless power receiver compares the detected voltage or current with a pre-stored value. The wireless power receiver may measure the voltage or the current of the signal from the second conductive pattern in various positions and store a table including a relation between the position and the voltage or the current between the alignment state and the voltage or the current.

In step 1440, the wireless power receiver determines an alignment state of the first conductive pattern with respect to the wireless power transmitter, based on a result of the comparison. For example, the wireless power receiver may determine the position of the wireless power receiver corresponding to the measured voltage or current in the table and also determine the alignment state of the first conductive pattern.

Figure 15A:
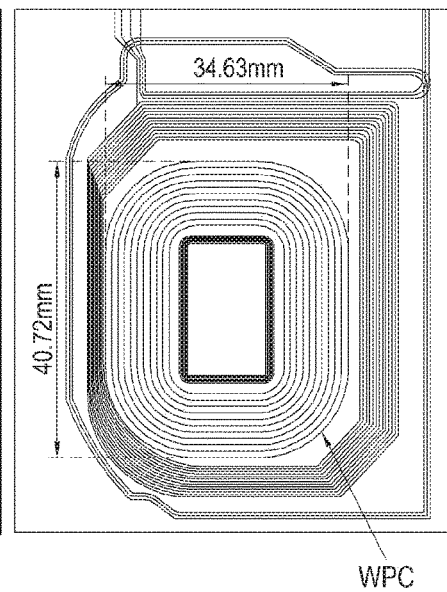
FIGS. 15A to 15C illustrate examples of tables showing relationships between a voltage of a signal from a coil and a location of a wireless power receiver according to an embodiment of the present disclosure.
Figure 15B:
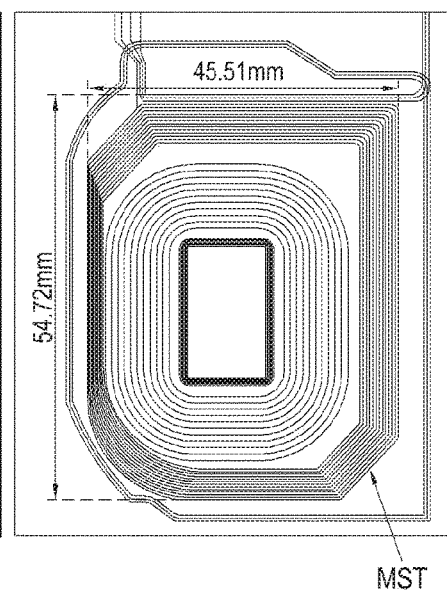
Figure 15C:
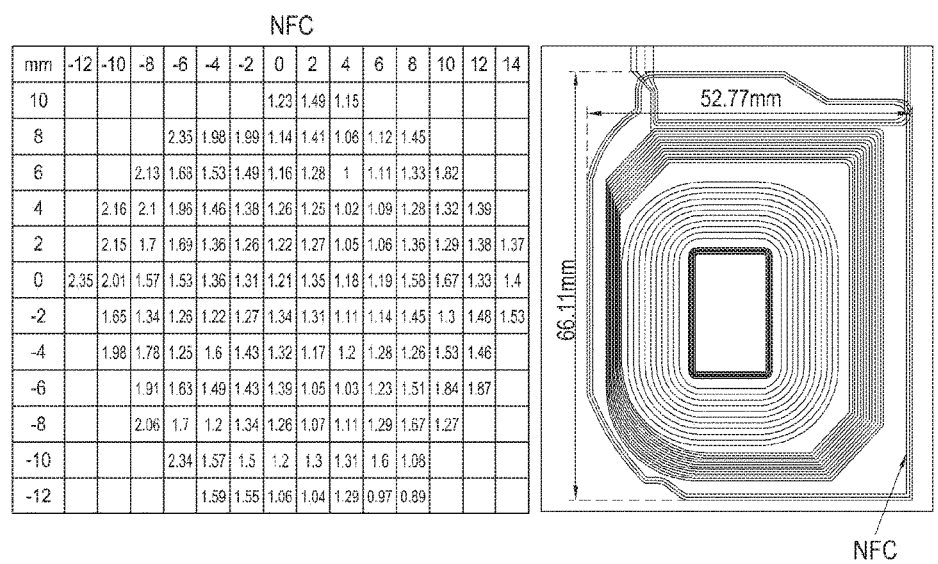

FIGS. 15A to 15C illustrate tables showing relationships between a voltage of a signal from a coil and a position of the wireless power receiver according to an embodiment of the present disclosure. Specifically, FIGS. 15A to 15C illustrate relationships between various positions and voltages of signals output from respective coils measured in the various positions, when a wireless power receiver as illustrated in FIG. 6 is arranged on the various positions of a wireless power transmitter.

Referring to FIGS. 15A to 15C, (0, 0) indicates the center of the wireless power transmitter. For example, a coordinate (0, 2) indicates that the center of the wireless power receiver upwardly moves from the center of the wireless power transmitter by 2 mm. For example, the wireless power receiver may operate based on the WPC standard. The description of WPC in FIGS. 15A to 15C is only one example, and different tables according to other standards such as PMA, A4WP, etc., may also be stored.

Specifically, FIG. 15A illustrates a table showing a relationship between a voltage of a signal output from a power reception coil defined in the WPC standard and a position of the wireless power receiver. As shown in the table of FIG. 15, signals from wireless power reception coils are generally uniform regardless of the position of the wireless power receiver because, when a charging state of the wireless power transmitter (e.g., a voltage value or a current value) is reported to the wireless power transmitter, the wireless power transmitter increases the size of charging power and the signal from the wireless power reception coil may have a relatively uniform value.

FIG. 15B illustrates a table showing a relationship between a voltage of a signal output from the MST coil and a position of the wireless power receiver. As illustrated in FIG. 15B, voltages of signals from the MST coil may be different from each other when the wireless power reception coil and the wireless power transmission coil are arranged relatively on the same position of a plane and when the wireless power reception coil and the wireless power transmission coil are not arranged relatively on the same position of a plane.

FIG. 15C illustrates a table showing a relationship between a voltage of a signal output from the NFC coil and a position of the wireless power receiver. As illustrated in FIG. 15C, voltages of signals from the NFC coil may be different from each other when the wireless power reception coil and the wireless power transmission coil are arranged relatively on the same position of a plane and when the wireless power reception coil and the wireless power transmission coil are not arranged relatively on the same position of a plane, similar to the voltage of the signal output from the MST coil illustrated in FIG. 15B.

The wireless power receiver may determine the position of the wireless power receiver by using the voltage of the signal from the MST coil or the NFC coil and the pre-stored table. The wireless power receiver may also pre-store a table with respect to the current rather than the voltage and may use the table for determining the position. The wireless power receiver may then determine the position by using a table corresponding to the signal from one coil, and may also determine the position by using each of a plurality of tables corresponding to each of the signals of a plurality of coils.

FIGS. 16A to 16E are graphs illustrating measured waveforms according to an embodiment of the present disclosure. For example, the graphs of FIGS. 16A to 16E show waveforms as measured by a switch connected to the coil of FIG. 6.

As illustrated in FIGS. 16A to 16E, values of the signal (e.g., voltage values) from the MST coil or the NFC coil may be different from each other when the wireless power reception coil and the wireless power transmission coil are arranged relatively on the same position of a plane and when the wireless power reception coil and the wireless power transmission coil are not arranged relatively on the same position of a plane.

Figure 16A:
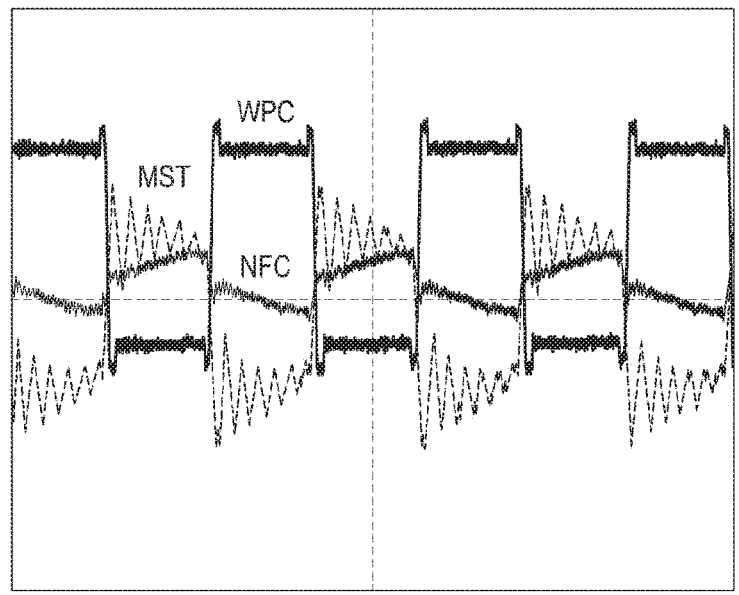
FIGS. 16A to 16E are graphs illustrating measured waveforms according to embodiments of the present disclosure.

Specifically, FIG. 16A illustrates a case where the center of the wireless power transmitter and the center of the wireless power receiver are the same, e.g., the coordinate (0, 0) of FIG. 15A, in which a wireless charging frequency of the wireless power transmission is configured as 174 KHz and wireless charging voltages are configured as 5.36 V, MST 3.35 V, and NFC 0.72 V.

Figure 16B:
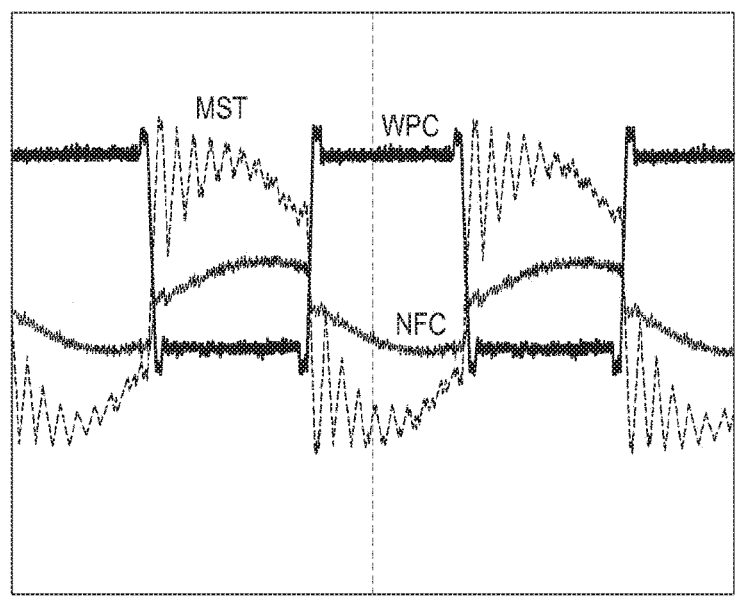

FIG. 16B illustrates, e.g., a coordinate (10, 0) of FIG. 15A, in which a frequency is configured as 114.6 KHz and wireless charging voltages are configured as 5.36 V, MST 6.80 V, and NFC 1.20 V.

Figure 16C:
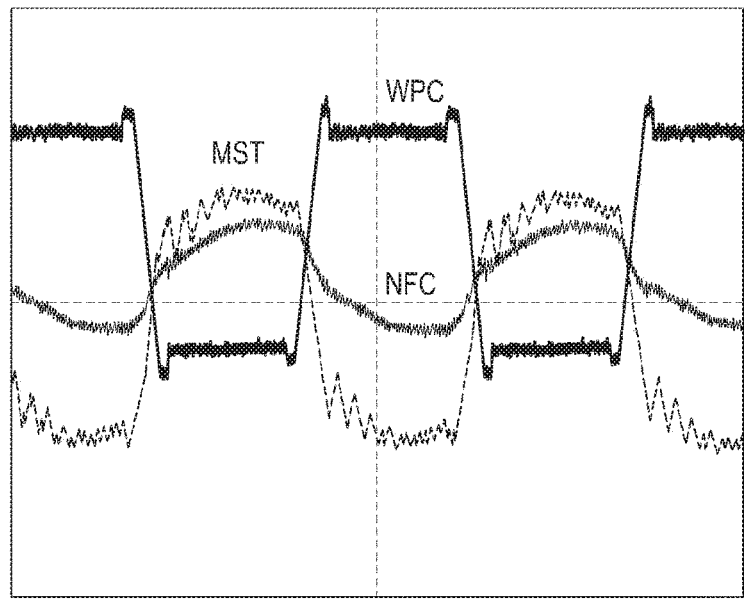

FIG. 16C illustrates, e.g., a coordinate (−10, 0) of FIG. 15A, in which a frequency is configured as 113.3 KHz and wireless charging voltages are configured as 5.92 V, MST 6.64 V, and NFC 1.36 V.

Figure 16D:
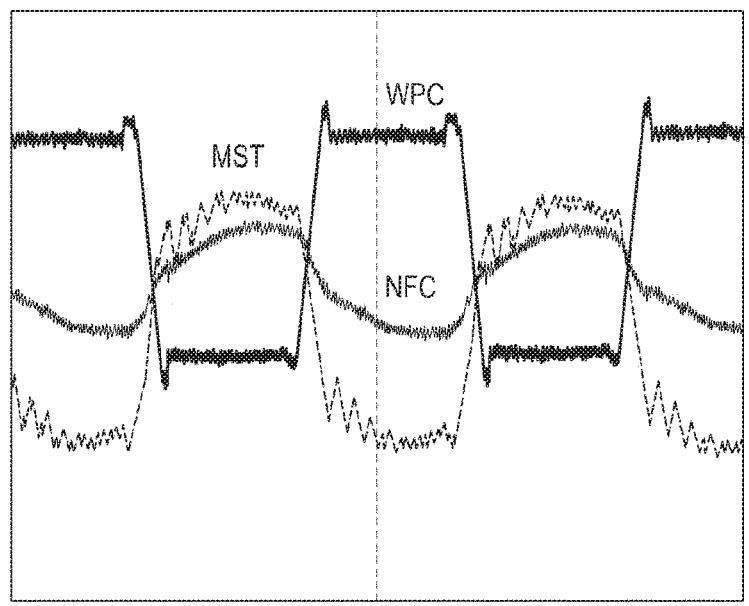

FIG. 16D illustrates, e.g., a coordinate (0, 12) of FIG. 15A, in which a frequency is configured as 113.3 KHz and wireless charging voltages are configured as 5.92 V, MST 6.64 V, and NFC 1.36 V.

Figure 16E:
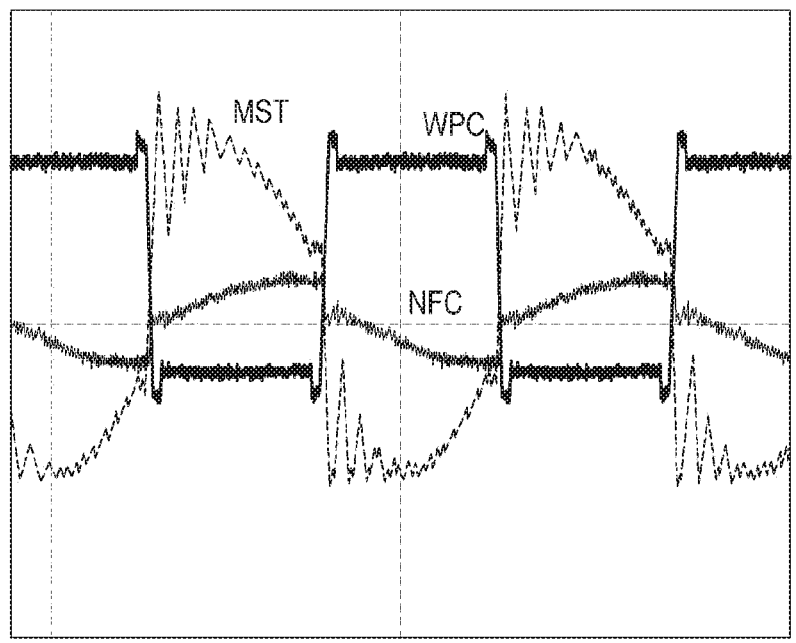

FIG. 16E illustrates, e.g., a coordinate (0, −14) of FIG. 15A, in which a frequency is configured as 111.9 KHz and wireless charging voltages are configured as 5.44V, MST 8.16V, and NFC 1.04V.

As illustrated in FIGS. 16 to 16E, the wireless charging voltages of the wireless power receiver at the center and the upper, lower, left, and right sides of the wireless power transmitter are uniform, but the MST and NFC voltages are different. This is because the potential difference is generated in the MST coil or the NFC coil and the potential difference may vary depending on the position of the wireless power transmitter of the MST or NFC coil.

Figure 17:
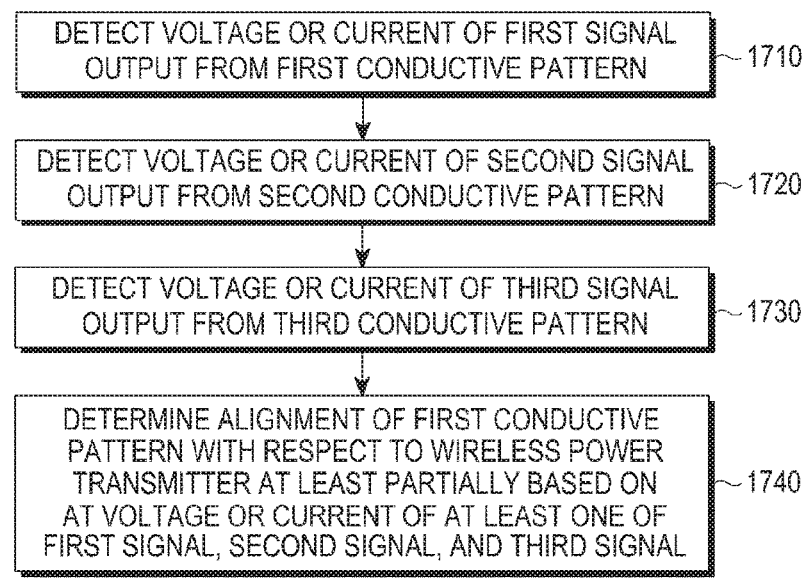
FIG. 17 is a flowchart illustrating a control method of a wireless power receiver according to an embodiment of the present disclosure.

FIG. 17 is a flowchart illustrating a control method of a wireless power receiver according to an embodiment of the present disclosure.

Referring to FIG. 17, in step 1710, the wireless power receiver detects a voltage or a current of a first signal output from a first conductive pattern.

In step 1720, the wireless power receiver detects a voltage or a current of a second signal output from a second conductive pattern. The wireless power receiver may detect the voltage or current of the second signal output from the second conductive pattern while wirelessly receiving power from the external wireless power transmitter by the first conductive pattern.

In step 1730, the wireless power receiver detects a voltage or a current of a third signal output from a third conductive pattern. The wireless power receiver may detect the voltage or current of the second signal output from the third conductive pattern while wirelessly receiving power from the external wireless power transmitter by the first conductive pattern.

In step 1740, the wireless power receiver determines an alignment of the first conductive pattern with respect to the wireless power transmitter, at least partially based on the voltage or current of at least one of the first signal, the second signal, and the third signal.

Figure 18A:
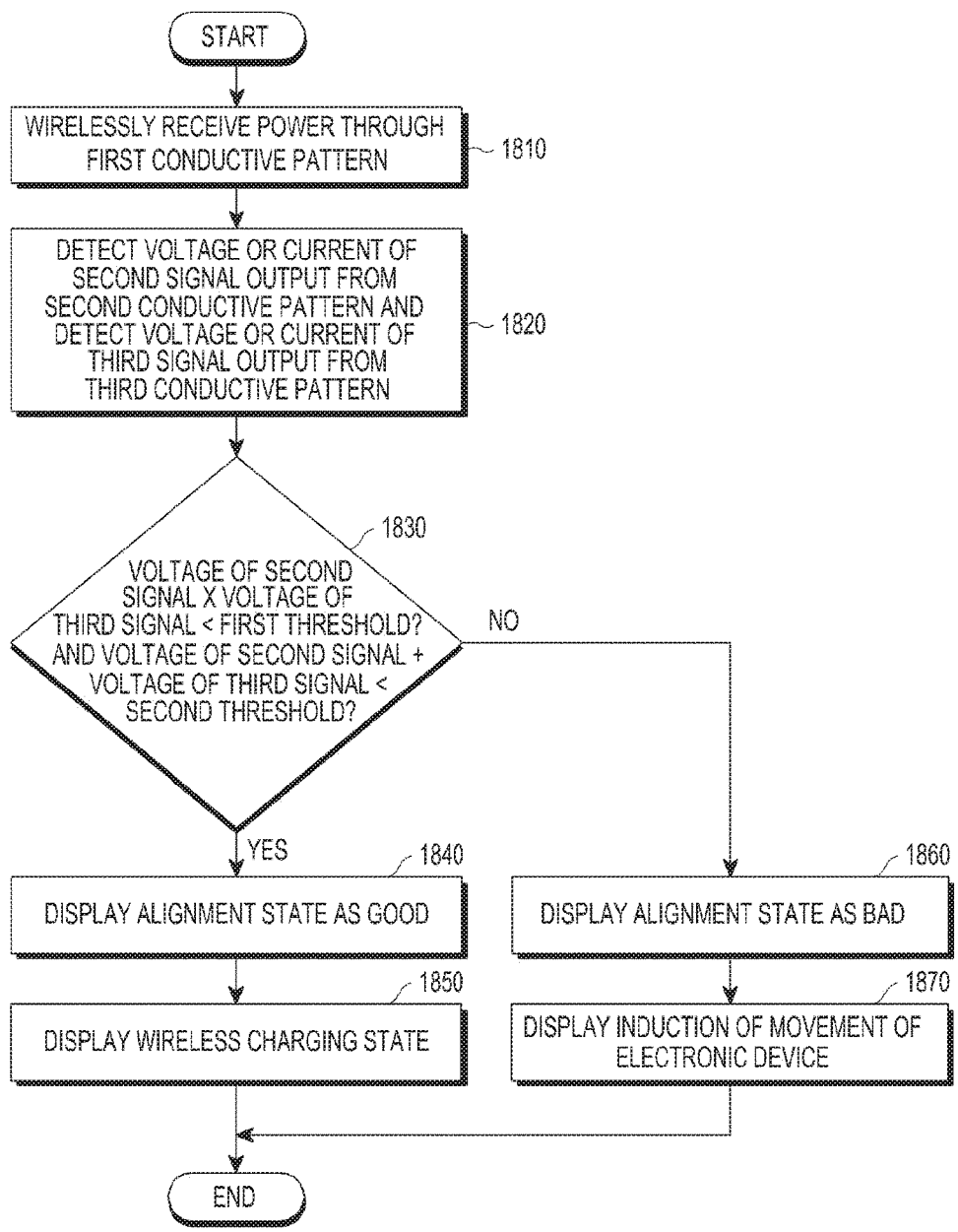
FIG. 18A is a flowchart illustrating a control method of a wireless power receiver according to an embodiment of the present disclosure.

FIG. 18A is a flowchart illustrating a control method of a wireless power receiver according to an embodiment of the present disclosure.

Referring to FIG. 18A, in step 1810, the wireless power receiver wirelessly receives power through a first conductive pattern.

In step 1820, the wireless power receiver detects a voltage or current of a second signal output from a second conductive pattern and detect a voltage or current of a third signal output from a third conductive pattern.

In step 1830, the wireless power receiver determines whether a product of the voltage of the second signal and the voltage of the third signal is smaller than a first threshold. Further, the wireless power receiver may determine whether a sum of the voltage of the second signal and the voltage of the third signal is smaller than a second threshold. When results of the two determinations are both true, the wireless power receiver displays the alignment state as good in step 1840. In step 1850, the wireless power receiver displays a wireless charging state.

However, when at least one of the results of the two determinations is false in step 1830, the wireless power receiver displays the alignment state as bad in step 1860. Further, in step 1860, the wireless power receiver displays induction of movement of the electronic device.

For example, as illustrated in FIG. 18B, both the first threshold and the second threshold may be configured as 6.0, and the wireless power receiver may determine the alignment state or a coordinate of the wireless power receiver through the comparison between the threshold and the calculation result. For example, the second conductive pattern and the third conductive pattern may be the NFC coil and the MST coil, respectively, and the wireless power receiver may determine the position or the alignment state of the wireless power receiver by using signals from the two communication coils.

The calculation in step 1830 is only an example. That is, another calculation may be used to determine the position or the alignment state of the wireless power receiver using the signals from a plurality of coils. Further, the calculation may vary depending on the type of wireless power receiver.

Figure 19A:
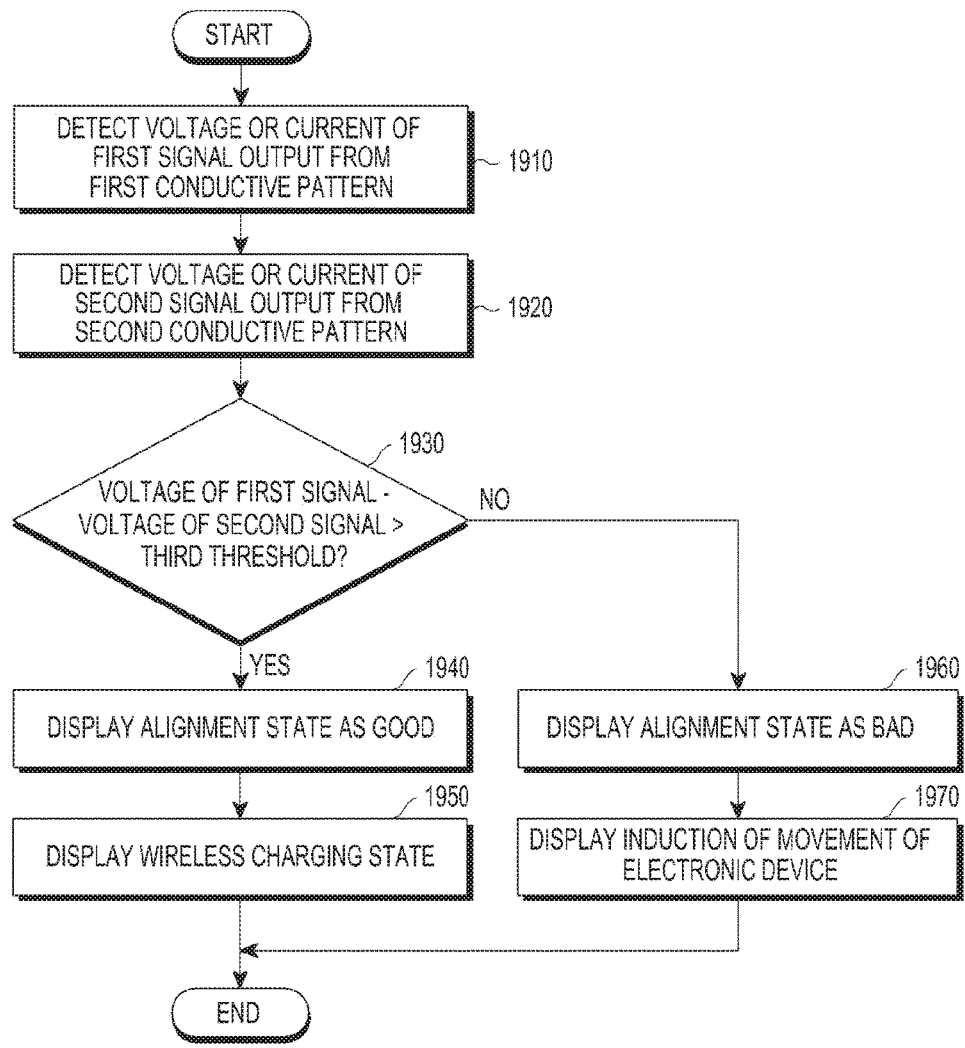
FIG. 19A is a flowchart illustrating a control method of a wireless power receiver according to an embodiment of the present disclosure.

FIG. 19A is a flowchart illustrating a control method of a wireless power receiver according to an embodiment of the present disclosure.

Referring to FIG. 19A, in step 1910, the wireless power receiver detects a voltage or a current of a first signal output from a first conductive pattern.

In step 1920, the wireless power receiver detects a voltage or a current of a second signal output from a second conductive pattern.

In step 1930, the wireless power receiver determines whether a difference between the voltage of the first signal and the voltage of the second signal is larger than a third threshold. As illustrated in FIG. 19B, the third threshold may be configured as 0.5.

When the difference between the voltage of the first signal and the voltage of the second signal is larger than the third threshold in step 1930, the wireless power receiver displays the alignment state as good in step 1940.

In step 1950, the wireless power receiver displays a wireless charging state.

However, when the difference between the voltage of the first signal and the voltage of the second signal is not larger than the third threshold in step 1930, the wireless power receiver displays the alignment state as bad in step 1960.

In step 1970, the wireless power receiver displays induction of movement of the electronic device.

The wireless power receiver may determine the position or the alignment state of the wireless power receiver by using all signals from one communication coil and one power reception coil. For example, the first conductive pattern may be the power reception coil, and the second conductive pattern may be the NFC coil or the MST coil.

The calculation in step 1930 is only an example. That is, another calculation may be used to determine the position or the alignment state of the wireless power receiver using the signals from one communication coil and one power reception coil.

Figure 20A:
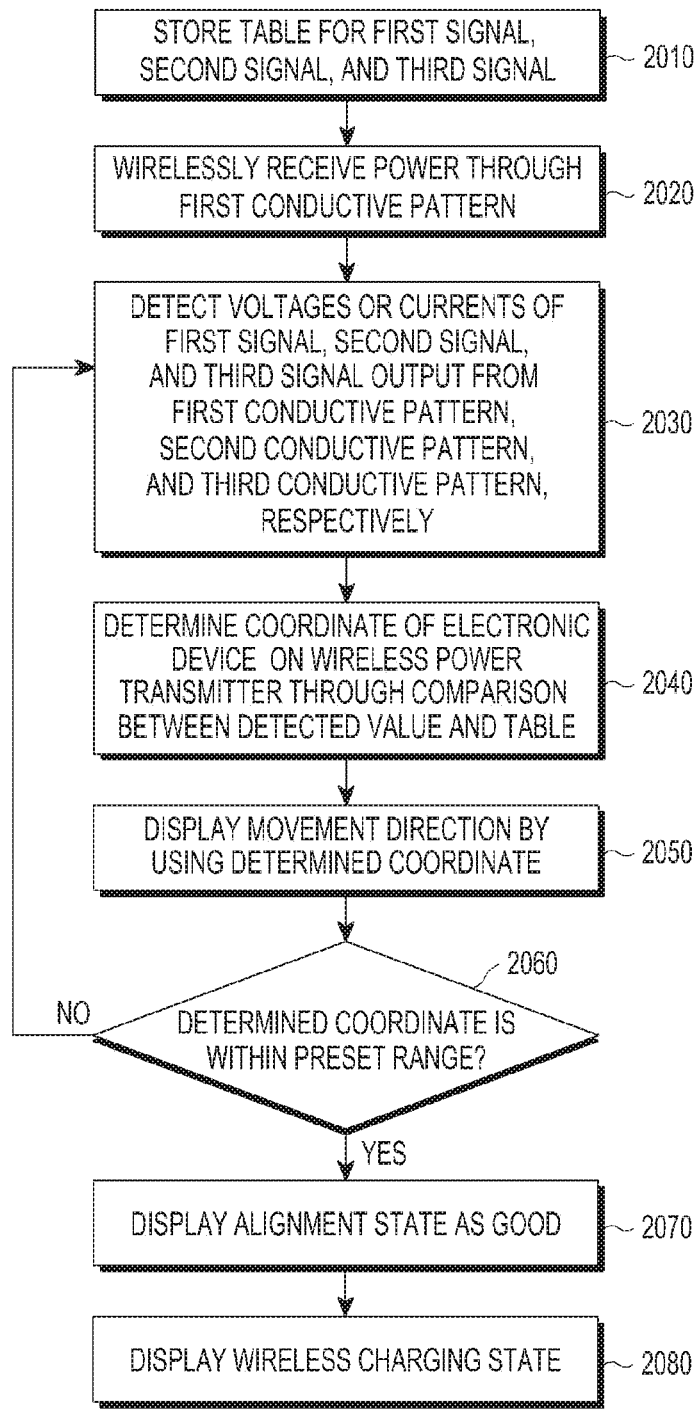
FIG. 20A is a flowchart illustrating a control method of a wireless power receiver according to an embodiment of the present disclosure.

FIG. 20A is a flowchart illustrating a control method of a wireless power receiver according to an embodiment of the present disclosure.

Referring to FIG. 20A, in step 2010, the wireless power receiver stores a table for a first signal, a second signal, and a third signal corresponding to a first conductive pattern, a second conductive pattern, and a third conductive pattern, respectively. The table may include information on a relation between a voltage or a current of the signal and a position or alignment state of the wireless power receiver. The table for the first signal, the second signal, and the third signal may indicate that the voltage or the current changes as relative positions of the first conductive pattern, the second conductive pattern, and the third conductive pattern with respect to the wireless power transmitter change, because the first conductive pattern, the second conductive pattern, and the third conductive pattern include an asymmetrical form or a relative position therebetween is biased in a particular direction.

In step 2020, the wireless power receiver wirelessly receives power through the first conductive pattern.

In step 2030, the wireless power receiver detects voltages or currents of the first signal, the second signal, and the third signal output from the first conductive pattern, the second conductive pattern, and the third conductive pattern, respectively.

In step 2040, the wireless power receiver determines a coordinate of the wireless power receiver on the wireless power transmitter through a comparison between the detected value and the table. For example, the wireless power receiver may determine the coordinate of the wireless power receiver by using the tables illustrated in FIG. 20B.

Figure 20C:
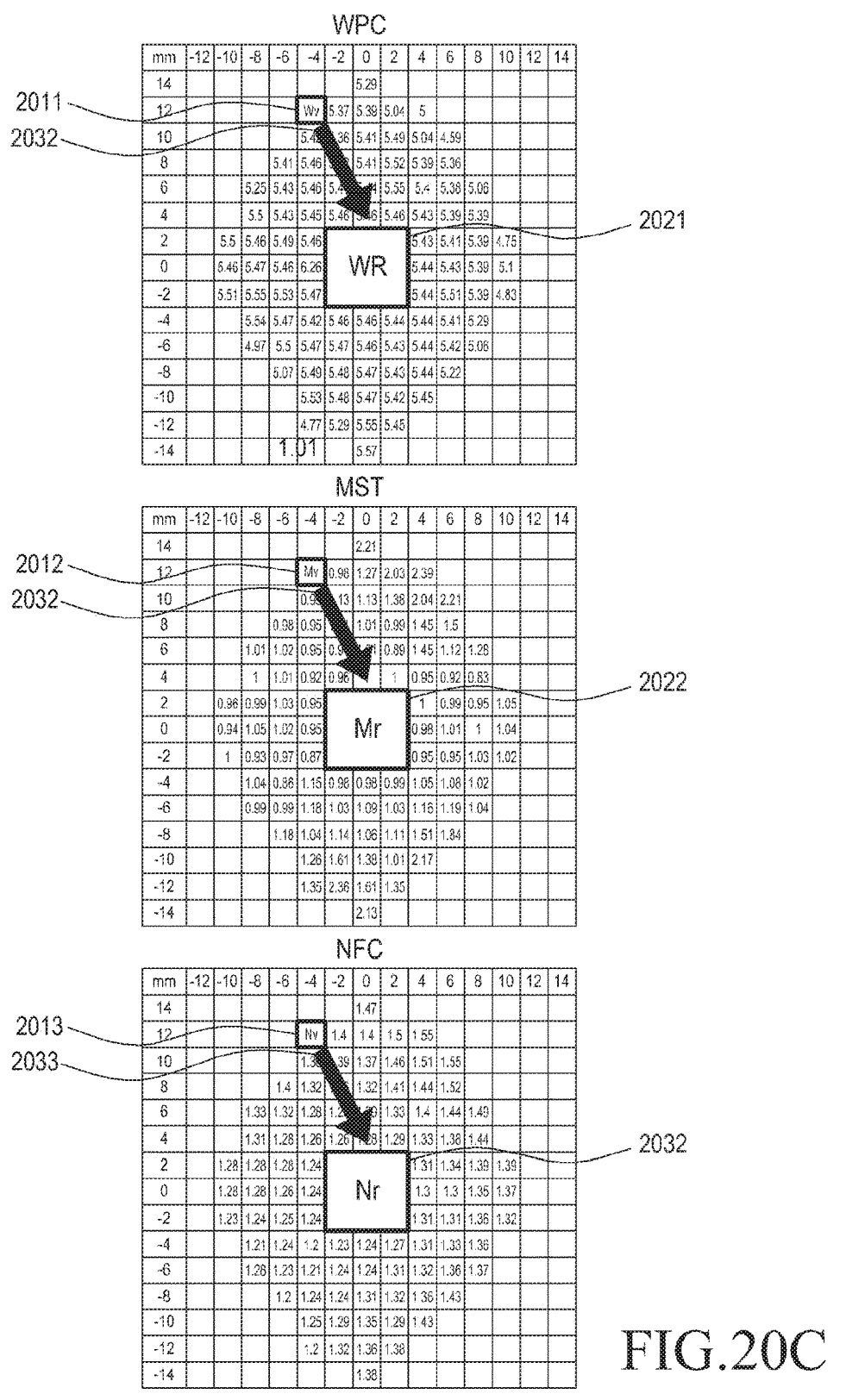

In step 2050, a movement direction of the wireless power receiver is displayed using the determined coordinate. For example, as illustrated in FIG. 20C, the wireless power receiver may determine a difference between the determined position 2011, 2012, or 2013 and a good alignment state 2021, 2022, or 2023 of the wireless power transmitter, and determine and display a movement direction 2031, 2032, or 2033.

In step 2060, the wireless power receiver determines whether the determined coordinate is within a preset range, and displays the movement direction until the coordinate falls within the preset range.

In step 2070, after the coordinate falls within the preset range in step 2060, the wireless power receiver displays the alignment state as good.

In step 2080, the wireless power receiver displays a wireless charging state.

Figure 21:
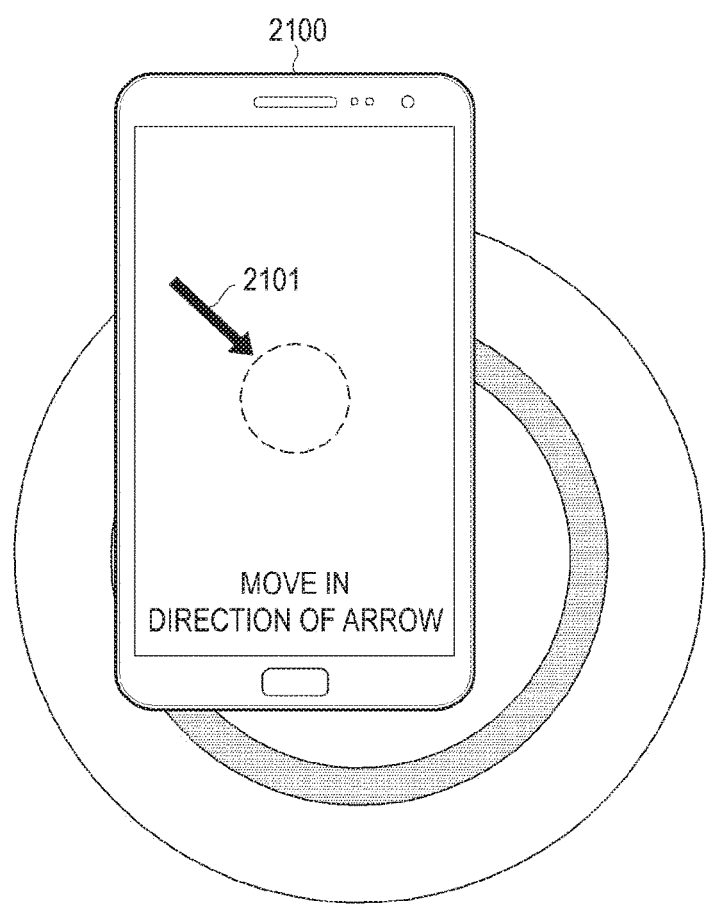
FIG. 21 illustrate a user interface for inducing movement of a wireless power receiver according to an embodiment of the present disclosure.

FIG. 21 illustrates a user interface for inducing movement of a wireless power receiver according to an embodiment of the present disclosure.

Referring to FIG. 21, a wireless power receiver 2100 displays a direction 2101 for moving the wireless power receiver to be within a preset range. The wireless power receiver 2100 may provide a visual symbol output to induce movement of the wireless power receiver 2100, as illustrated in FIG. 21, or using text commands, voice commands, vibrations, LEDs, etc.

Figure 22:
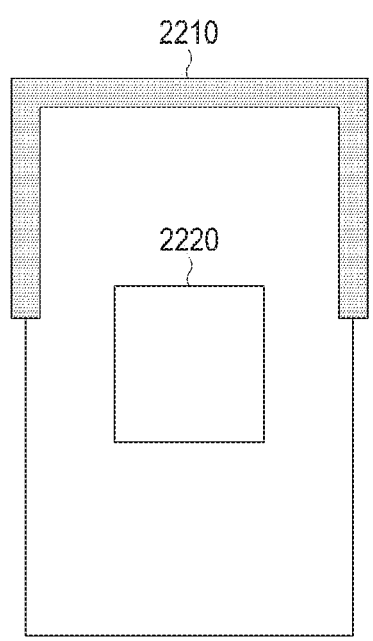
FIG. 22 illustrates a second conductive pattern of a wireless power receiver according to an embodiment of the present disclosure.

FIG. 22 illustrates a second conductive pattern of the wireless power receiver according to an embodiment of the present disclosure.

Referring to FIG. 22, the wireless power receiver includes a first conductive pattern 2220 and a second conductive pattern 2210. The first conductive pattern 2220 may be for wireless power reception and the second conductive pattern 2210 may be, for example, for NFC communication.

The second conductive pattern 2210, which is connected to a communication circuit, may be formed in a pattern connected along the upper side of the housing of the wireless power receiver. The wireless power receiver may then determine an alignment state of the wireless power receiver with respect to the wireless power transmitter while wirelessly receiving power, at least partially based on a current or a voltage of a signal output from the second conductive pattern 2210.

According to various embodiments of the present disclosure, a method of operating an electronic device may include: an operation of wirelessly receiving power from an external electronic device through a first conductive pattern by an electronic device including the first conductive pattern connected to a wireless charging circuit, a second conductive pattern connected to a communication circuit, and a user interface; an operation of detecting a signal output from the second conductive pattern by the electronic device while the power is received; and an operation of providing an output through the user interface at least partially based on the detected signal by the electronic device.

According to various embodiments of the present disclosure, the method may further include an operation of detecting a voltage or a current of a signal from a third conductive pattern electrically connected to another communication circuit, and the operation of providing of the output through the user interface may include an operation of providing the output through the user interface at least partially based on the voltage or the current of at least one of the signal from the second conductive pattern and the signal from the third conductive pattern.

According to various embodiments of the present disclosure, the output may be configured to indicate an alignment state between the electronic device and the external electronic device or an alignment state between the first conductive pattern and a fourth conductive pattern of the external electronic device.

According to various embodiments of the present disclosure, the output may be configured to indicate a relative position of the electronic device with respect to the external electronic device or a relative position of the first conductive pattern with respect to the fourth conductive pattern.

According to various embodiments of the present disclosure, the output may be configured to induce movement of the electronic device and may include a movement direction.

According to various embodiments of the present disclosure, the method may further include an operation of determining an amount of power supplied to the battery based on the detected voltage or current.

According to various embodiments of the present disclosure, the operation of providing the output through the user interface may include: an operation of reading a table including a relation between information related to the signal from the second conductive pattern and a position of the electronic device; and an operation of providing the output through the user interface at least partially based on the detected voltage or current and the stored table.

According to various embodiments of the present disclosure, a method of operating an electronic device may include: an operation of wirelessly receiving power transmitted from an external electronic device through a first conductive pattern by an electronic device including first and second conductive patterns; an operation of detecting a signal output from the second conductive pattern including a first part and a second part to which different voltages are applied by the power; and an operation of determining whether the first conductive pattern is aligned with a wireless charging device of the external electronic device by using the detected signal.

According to various embodiments of the present disclosure, the operation of determining whether the first conductive pattern is aligned with the wireless charging device of the external electronic device by using the detected signal may include an operation of reading a table including a relation between information related to the signal from the second conductive pattern and a position of the electronic device; and an operation of determining a relative position of the electronic device with respect to the external electronic device at least partially based on the information related to the signal from the second conductive pattern and the pre-stored table.

According to various embodiments of the present disclosure, the operation of determining whether the first conductive pattern is aligned with the wireless charging device of the external electronic device by using the detected signal may include an operation of determining whether the determined position of the electronic device is within a selected range; and an operation of determining an alignment state based on a result of the determination.

According to various embodiments of the present disclosure, the method may further include an operation of determining that the alignment state is good when the position of the electronic device is within the selected range based on the result of the determination.

According to various embodiments of the present disclosure, the method may further include an operation of determining that the alignment state is bad when the position of the electronic device is not within the selected range based on the result of the determination; and an operation of making a control to display an output of inducing movement to make the position of the electronic device be within the selected range.

Each of the components of the electronic device described above may be implemented by one or more components and the name of the corresponding component may vary depending on a type of the electronic device. The electronic device may include at least one of the above-described elements. Some of the above-described elements may be omitted from the electronic device, or the electronic device may further include additional elements. Further, some of the components of the electronic device may be combined to form a single entity, and thus, may equivalently execute functions of the corresponding elements prior to the combination.

At least some of the devices (e.g., modules or functions thereof) or the method (e.g., operations) of the present disclosure may be implemented by a command stored in a computer-readable storage medium in a programming module. When the command is executed by one or more processors (e.g., the processor 120), the one or more processors may execute a function corresponding to the command. For example, the computer-readable storage medium may be the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), or a flash memory), etc.

In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, a storage medium storing instructions is provided. The instructions are configured to instruct one or more processors to perform one or more operations when executed by the one or more processors. The one or more operations may include an operation of wirelessly receiving power from a wireless power transmitter through a first conductive pattern; an operation of detecting a signal output from a second conductive pattern connected to a communication circuit while receiving the power; and an operation of providing an output through a user interface at least partially based on a voltage or a current of the detected signal.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An electronic device comprising:
   a communication circuit;
   a battery;
   a first conductive pattern electrically connected to the battery and configured to wirelessly receive power;
   a second conductive pattern electrically connected to the communication circuit;
   a processor; and
   a memory that stores instructions, which when executed, instruct the processor to receive power from an external device through the first conductive pattern, to detect a voltage or a current of a signal output from the second conductive pattern while receiving the power, to provide an output regarding an alignment state between the electronic device and the external device that is at least partially based on the detected voltage or current of the signal output from the second conductive pattern,
   wherein a part of the first conductive pattern and a part of the second conductive pattern are spaced apart from each other by a first distance,
   wherein another part of the first conductive pattern and another part of the second conductive pattern are spaced apart from each other by a second distance, which is greater than the first distance,
   wherein the first distance is a shortest distance between the part of the first conductive pattern and the part of the second conductive pattern, and
   wherein the second distance is a shortest distance between the another part of the first conductive pattern and the another part of the second conductive pattern.

2. The electronic device of claim 1, wherein the second conductive pattern comprises an asymmetrical coil.

3. The electronic device of claim 1, wherein the memory stores additional instructions, which when executed, instruct the processor to determine a positon of the electronic device relative to the external device based on a potential difference generated between a first part and a second part of a coil of the second conductive pattern, the first part having a first width and a second part having a second width, which is wider than the first width for generating the potential difference.

4. The electronic device of claim 1, further comprising:
   another communication circuit; and
   a third conductive pattern electrically connected to the another communication circuit.

5. The electronic device of claim 4, wherein the memory stores additional instructions, which when executed, instruct the processor to detect a voltage or a current of a signal from the third conductive pattern while receiving the power, and to provide the output, at least partially based on the voltage or the current of at least one of the signal from the second conductive pattern and the signal from the third conductive pattern.

6. The electronic device of claim 5, wherein the output indicates an alignment state between the electronic device and the external device or an alignment state between the first conductive pattern and a fourth conductive pattern of the external device.

7. The electronic device of claim 6, wherein the output further indicates a relative position of the electronic device with respect to the external device or a relative position of the first conductive pattern with respect to the fourth conductive pattern.

8. The electronic device of claim 6, wherein the output induces movement of the electronic device and includes a movement direction.

9. The electronic device of claim 1, wherein the instructions, when executed, instruct the processor to determine an amount of power supplied to the battery, based on the detected voltage or current of the signal output from the second conductive pattern.

10. The electronic device of claim 1, further comprising at least one of a display, a speaker, a vibration device, and a light emitting device.

11. The electronic device of claim 1, wherein the instructions, when executed, instruct the processor to provide the output, at least partially based on the detected voltage or current of the signal output from the second conductive pattern and a stored table.

12. The electronic device of claim 11, wherein the memory stores the table, and
wherein the table includes a relation between information related to the signal from the second conductive pattern and a position of the external device.

13. An electronic device comprising:
a first conductive pattern configured to wirelessly receive power transmitted from an external device;
a second conductive pattern including a first part and a second part, wherein different voltages are applied to each of the first part and the second part by the power transmitted from the external device;
a processor; and
a memory configured to store instructions, which when executed, instruct the processor to receive a signal output from the second conductive pattern while receiving the power from the external device through the first conductive pattern, and to determine whether the first conductive pattern is aligned with the external device,
wherein a part of the first conductive pattern and a part of the second conductive pattern are spaced apart from each other by a first distance,
wherein another part of the first conductive pattern and another part of the second conductive pattern are spaced apart from each other by a second distance, which is greater than the first distance,
wherein the first distance is a shortest distance between the part of the first conductive pattern and the part of the second conductive pattern, and
wherein the second distance is a shortest distance between the another part of the first conductive pattern and the another part of the second conductive pattern.

14. The electronic device of claim 13, wherein the signal output from the second conductive pattern indicates information related to a potential difference between the first part and the second part.

15. The electronic device of claim 13, wherein the memory stores a table including a relation between information related to the signal output from the second conductive pattern and a position of the electronic device.

16. The electronic device of claim 15, wherein the instructions, when executed, instruct the processor to determine the position of the electronic device, at least partially based on the information related to the signal from the second conductive pattern and the table.

17. The electronic device of claim 16, wherein the instructions, when executed, instruct the processor to determine whether the determined position of the electronic device is within a selected range, and to determine an alignment state between the electronic device and the external device, at least partially based on a result of the determination.

18. The electronic device of claim 17, wherein the instructions, when executed, instruct the processor to determine the alignment state as good, when the position of the electronic device is within the selected range, based on the result of the determination.

19. The electronic device of claim 17, wherein the instructions, when executed, instruct the processor to determine the alignment state as bad, when the position of the electronic device is not within the selected range, and to display an output for inducing movement of the electronic device to be within the selected range.

20. The electronic device of claim 13, wherein an electrical characteristic of the first part and an electrical characteristic of the second part are different from each other.

21. The electronic device of claim 13, wherein a shortest distance of the first part with respect to the first conductive pattern and a shortest distance of the second part with respect to the first conductive pattern are different from each other.

22. A method of operating an electronic device, the method comprising:
wirelessly receiving, by the electronic device, power from an external device through a first conductive pattern connected to a communication circuit;
detecting a signal output from a second conductive pattern of the electronic device, while receiving the power; and
providing an output regarding an alignment state between the electronic device and the external device, at least partially based on the detected signal output from the second conductive pattern,
wherein a part of the first conductive pattern and a part of the second conductive pattern are spaced apart from each other by a first distance,
wherein another part of the first conductive pattern and another part of the second conductive pattern are spaced apart from each other by a second distance, which is greater than the first distance,
wherein the first distance is a shortest distance between the part of the first conductive pattern and the part of the second conductive pattern, and
wherein the second distance is a shortest distance between the another part of the first conductive pattern and the another part of the second conductive pattern.

23. The method of claim 22, further comprising detecting a voltage or a current of a signal output from a third conductive pattern connected to another communication circuit,
wherein providing the output comprises providing the output, at least partially based on the signal output from the second conductive pattern and the voltage or the current of the signal output from the third conductive pattern.

24. The method of claim 23, wherein the output indicates an alignment state between the electronic device and the external device or an alignment state between the first conductive pattern and a fourth conductive pattern of the external device.

25. The method of claim 24, wherein the output further indicates a relative position of the electronic device with respect to the external device or a relative position of the first conductive pattern with respect to the fourth conductive pattern.

26. The method of claim 24, wherein the output induces movement of the electronic device and includes a movement direction.

27. The method of claim 23, further comprising determining an amount of power supplied to a battery, based on the detected voltage or current of the signal output from the third conductive pattern.

28. The method of claim 22, wherein providing the output comprises:
reading a table including a relation between information related to the detected signal output from the second conductive pattern and a position of the electronic device; and
providing the output, at least partially based on the detected signal output from the second conductive pattern and the stored table.

29. A method of operating an electronic device, the method comprising:
wirelessly receiving, by the electronic device, power transmitted from an external device through a first conductive pattern;
detecting a signal output from a second conductive pattern including a first part having a first width and a second part to which different voltages are applied by the power transmitted from the electronic device; and
determining whether the first conductive pattern is aligned with the external device, based on the detected signal output from the second conductive pattern,
wherein a part of the first conductive pattern and a part of the second conductive pattern are spaced apart from each other by a first distance, and
wherein another part of the first conductive pattern and another part of the second conductive pattern are spaced apart from each other by a second distance, which is greater than the first distance,
wherein the first distance is a shortest distance between the part of the first conductive pattern and the part of the second conductive pattern, and
wherein the second distance is a shortest distance between the another part of the first conductive pattern and the another part of the second conductive pattern.

30. The method of claim 29, wherein determining whether the first conductive pattern is aligned with the external device comprises:
reading a table including a relation between information related to the signal output from the second conductive pattern and a position of the electronic device; and
determining a relative position of the electronic device with respect to the external device, based on the information related to the signal output from the second conductive pattern and the table.

31. The method of claim 30, wherein determining whether the first conductive pattern is aligned with the external device further comprises:
determining whether the determined relative position of the electronic device is within a selected range; and
determining an alignment state, based on whether the determined relative position of the electronic device is within the selected range.

32. The method of claim 31, further comprising determining that the alignment state is good, when the position of the electronic device is within the selected range.

33. The method of claim 31, further comprising:
determining that the alignment state is bad, when the position of the electronic device is not within the selected range; and
providing an output for inducing movement of the electronic device to be within the selected range.

34. A method of operating an electronic device, the method comprising:
wirelessly receiving, by the electronic device, power from an external device through a first conductive pattern connected to a communication circuit;
detecting a first voltage or current of a first signal output from a second conductive pattern of the electronic device, while receiving the power;
detecting a second voltage or current of a second signal output from a third conductive pattern connected to another communication circuit; and
providing an output regarding an alignment state between the electronic device and the external device, at least partially based on at least one of the first voltage or current of the first signal output from the second conductive pattern and the second voltage or current of the second signal output from the third conductive pattern,
wherein a part of the first conductive pattern and a part of the second conductive pattern are spaced apart from each other by a first distance,
wherein another part of the first conductive pattern and another part of the second conductive pattern are spaced apart from each other by a second distance, which is greater than the first distance,
wherein the first distance is a shortest distance between the part of the first conductive pattern and the part of the second conductive pattern, and
wherein the second distance is a shortest distance between the another part of the first conductive pattern and the another part of the second conductive pattern.

* * * * *